(12) United States Patent  (10) Patent No.: US 7,298,248 B2
Finley et al.  (45) Date of Patent: Nov. 20, 2007

(54) COMMUNICATION SYSTEM FOR VEHICLES

(75) Inventors: Peggy Finley, Barrington Hills, IL (US); Howard Dittmer, Lake Bluff, IL (US); Peter Hefner, Highland Park, IL (US); Glen Adrian Thompson, Chicago, IL (US)

(73) Assignee: K40 Electronics, Elgin, IL (US)

( * ) Notice: Subject to any disclaimer, the term of this patent is extended or adjusted under 35 U.S.C. 154(b) by 200 days.

(21) Appl. No.: 11/183,390

(22) Filed: Jul. 18, 2005

(65) Prior Publication Data

US 2006/0012468 A1  Jan. 19, 2006

Related U.S. Application Data

(60) Provisional application No. 60/589,192, filed on Jul. 19, 2004.

(51) Int. Cl.
*B60Q 1/00* (2006.01)
(52) U.S. Cl. .......................................... 340/438; 342/20
(58) Field of Classification Search ................ 340/438, 340/933, 936; 342/5, 20, 27, 42, 51, 59, 342/70
See application file for complete search history.

(56) References Cited

U.S. PATENT DOCUMENTS

| | | | |
|---|---|---|---|
| 4,791,420 A * | 12/1988 | Baba | 342/20 |
| 5,001,777 A | 3/1991 | Liautaud | |
| 5,083,129 A | 1/1992 | Valentine et al. | |
| 5,146,226 A | 9/1992 | Valentine et al. | |
| 5,151,701 A | 9/1992 | Valentine et al. | |
| 5,206,500 A | 4/1993 | Decker et al. | |
| 5,206,651 A | 4/1993 | Valentine et al. | |
| D338,841 S | 8/1993 | Davis et al. | |
| 5,250,951 A | 10/1993 | Valentine et al. | |
| 5,268,689 A | 12/1993 | Ono et al. | |
| 5,300,932 A | 4/1994 | Valentine et al. | |
| 5,347,120 A | 9/1994 | Decker et al. | |
| 5,365,055 A | 11/1994 | Decker et al. | |
| 5,684,488 A | 11/1997 | Liautaud et al. | |
| 6,249,218 B1 | 6/2001 | Blair | |
| 6,252,544 B1 | 6/2001 | Hoftberg | |
| 6,400,304 B1 * | 6/2002 | Chubbs, III | 342/20 |
| 6,429,812 B1 | 8/2002 | Hoftberg | |
| 6,505,101 B1 | 1/2003 | Brill | |
| 6,529,153 B1 * | 3/2003 | Dijkstra | 342/20 |
| 6,549,145 B2 | 4/2003 | Hsu et al. | |
| 6,563,418 B1 * | 5/2003 | Moon | 370/475 |
| 6,567,035 B1 * | 5/2003 | Elliott | 342/20 |
| 6,662,106 B2 * | 12/2003 | Evans | 701/210 |
| 6,895,324 B2 * | 5/2005 | Straub | 342/20 |
| 6,933,837 B2 * | 8/2005 | Gunderson et al. | 340/436 |
| 6,939,155 B2 * | 9/2005 | Postrel | 439/297 |

* cited by examiner

*Primary Examiner*—John Tweel, Jr.
(74) *Attorney, Agent, or Firm*—Olson & Hierl, Ltd.

(57) ABSTRACT

A communication system for a vehicle traveling over a road surface is provided with at least one detector for sensing speed detection signals impinging on the vehicle, to monitor the speed of the vehicle or a nearby vehicle. A radiofrequency transmitter communicates the detector output to a receiver adjacent the passenger compartment of the vehicle. The receiver controls one or more annunciators to output one or more annunciator indications to the system user. The radiofrequency transmitter in one embodiment directs transmissions along a ground skip path, reflecting information over the road surface so as to enter the receiver located in or near a passenger compartment of the vehicle. A wireless control unit provides indication of system operating status and allows a user to input commands to the system.

20 Claims, 72 Drawing Sheets

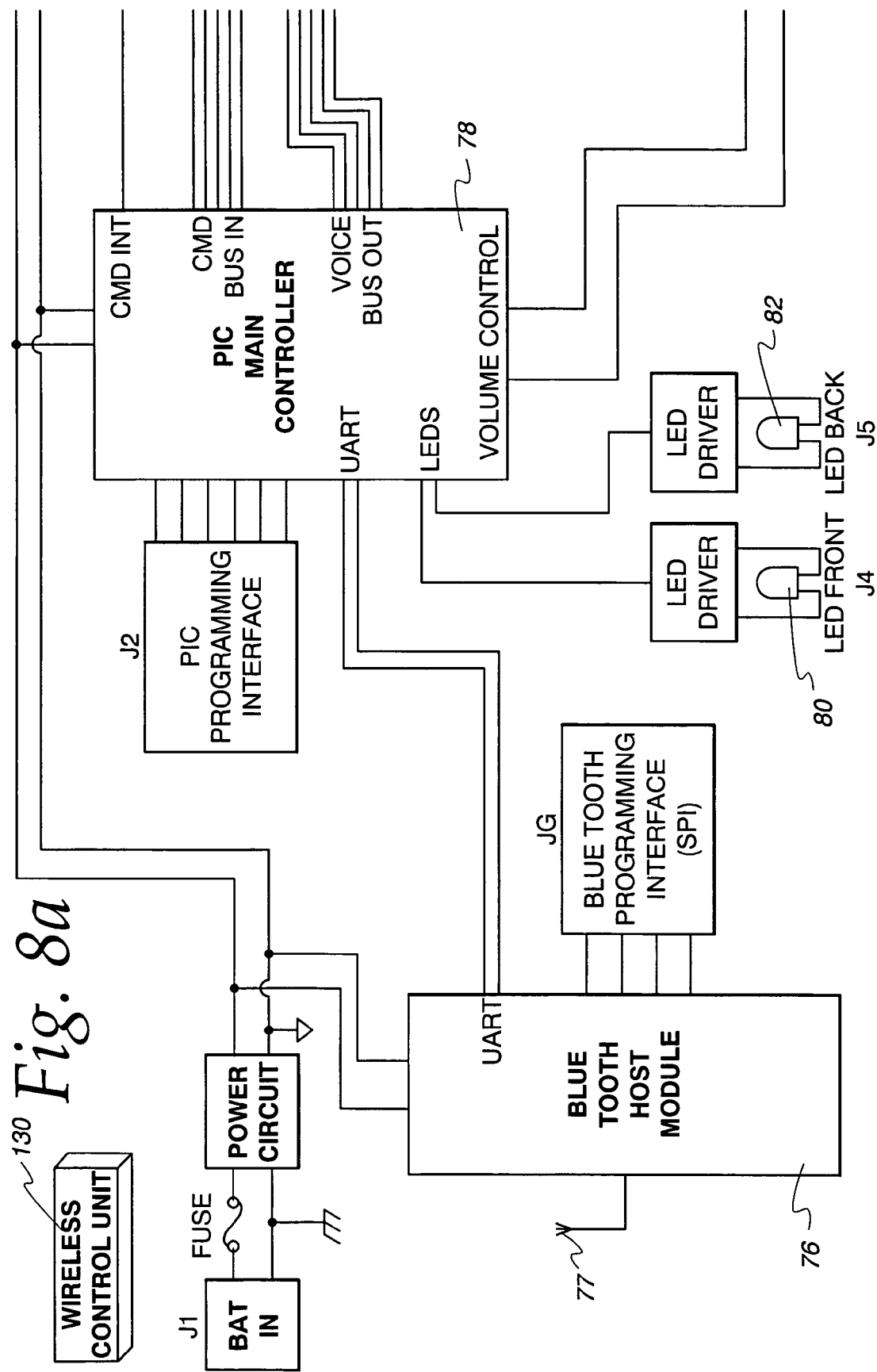

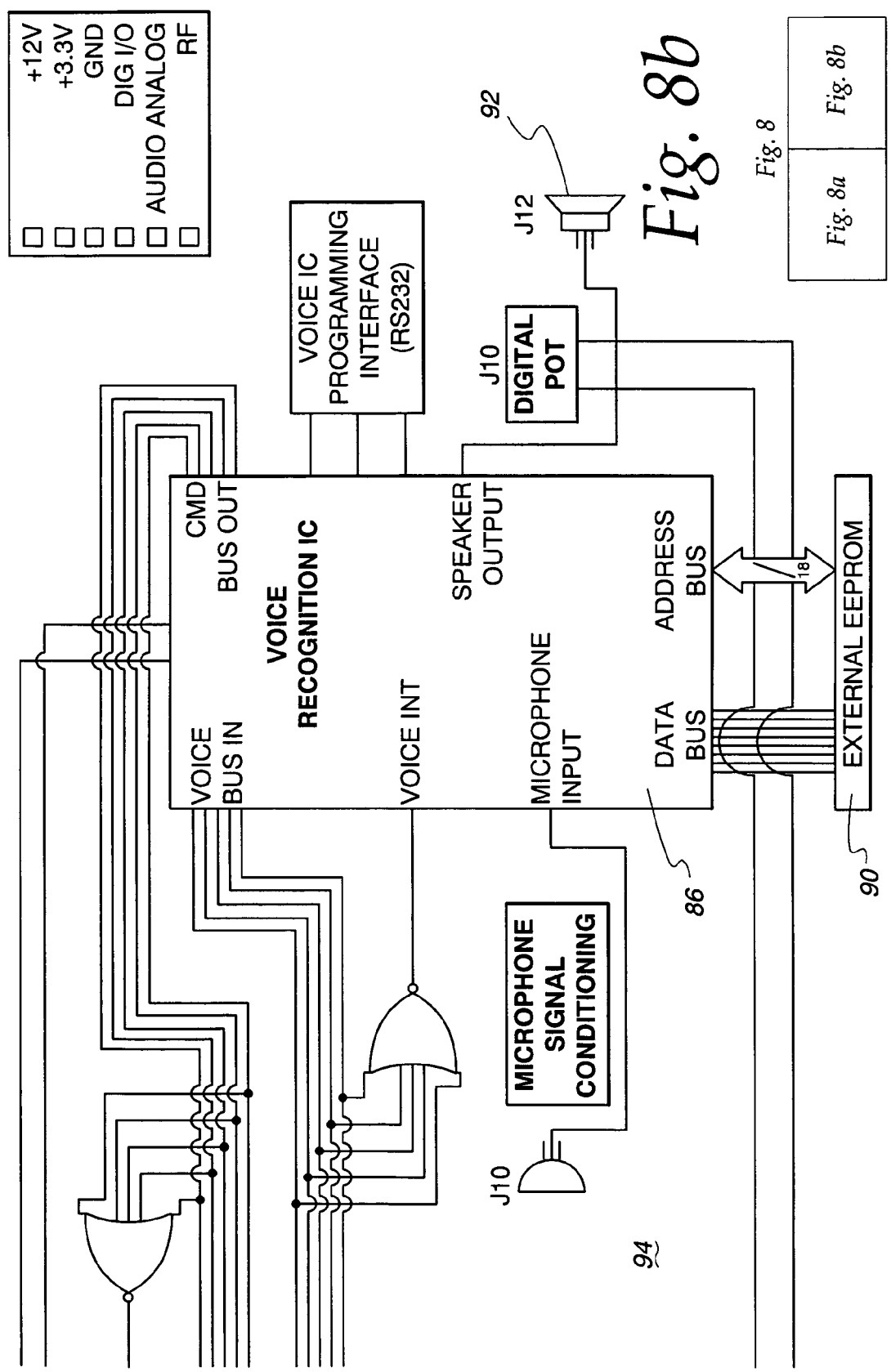

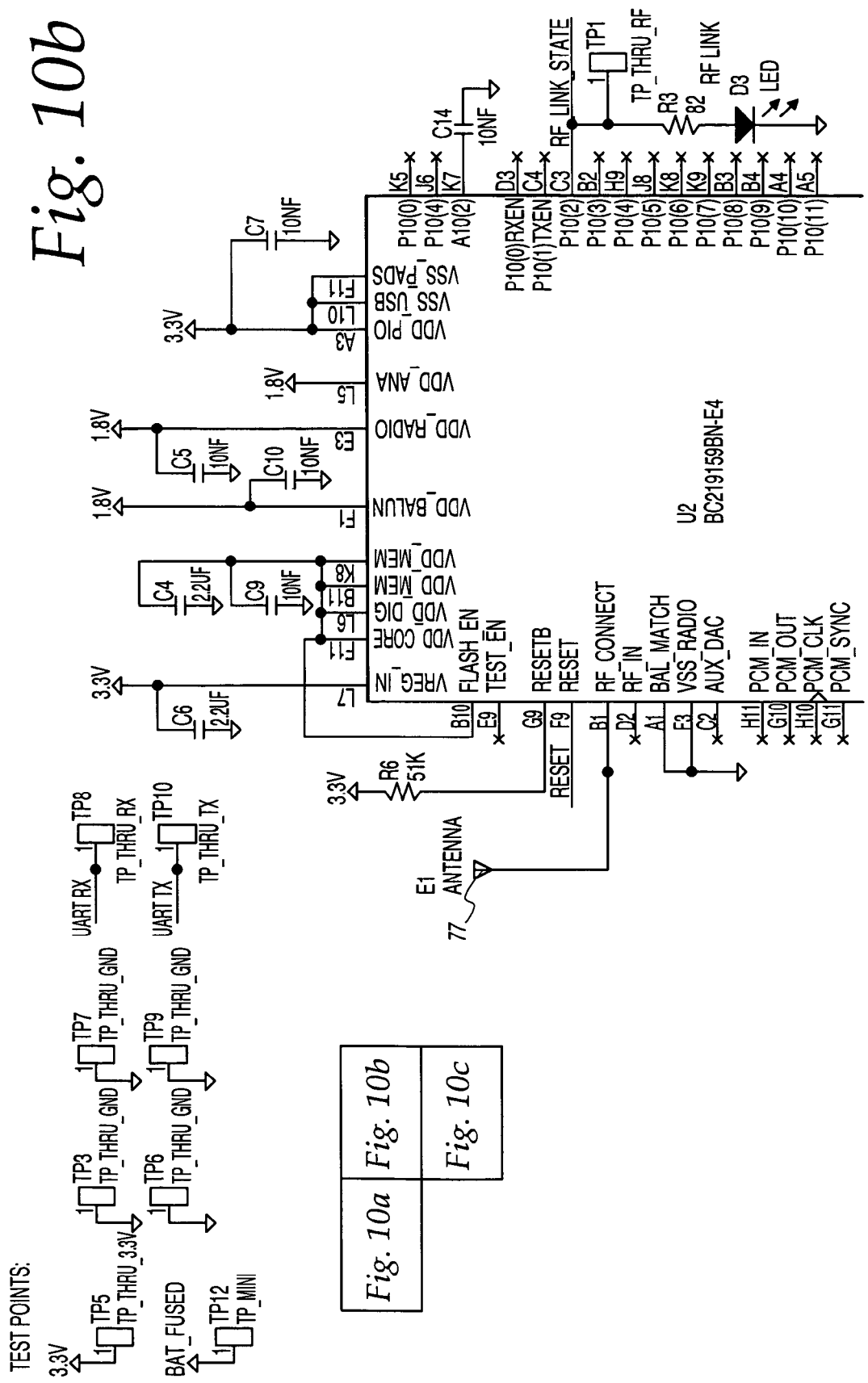

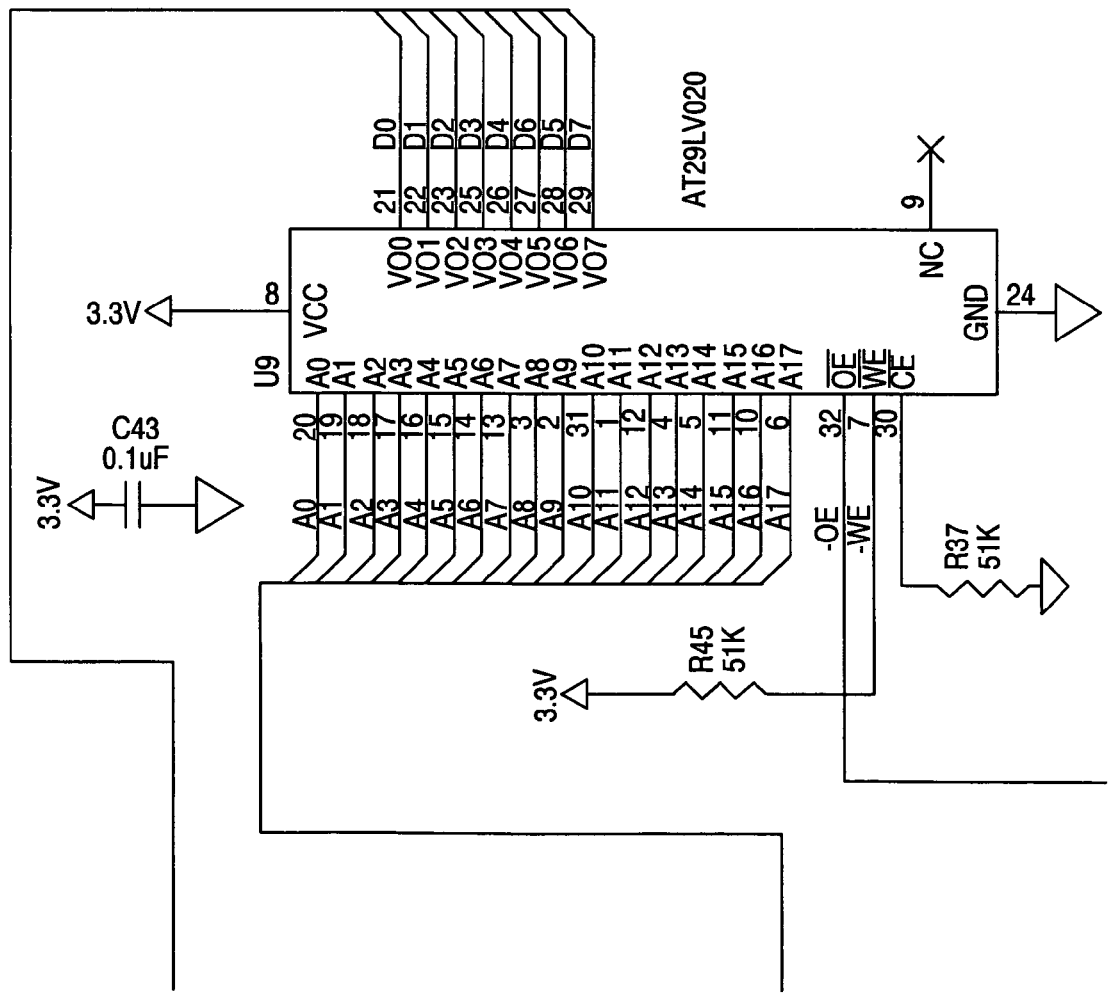

HOST BLUETOOTH START-UP AND INITIALIZATION

HOST BLUETOOTH
WIRELESS COMMUNICATION LINK

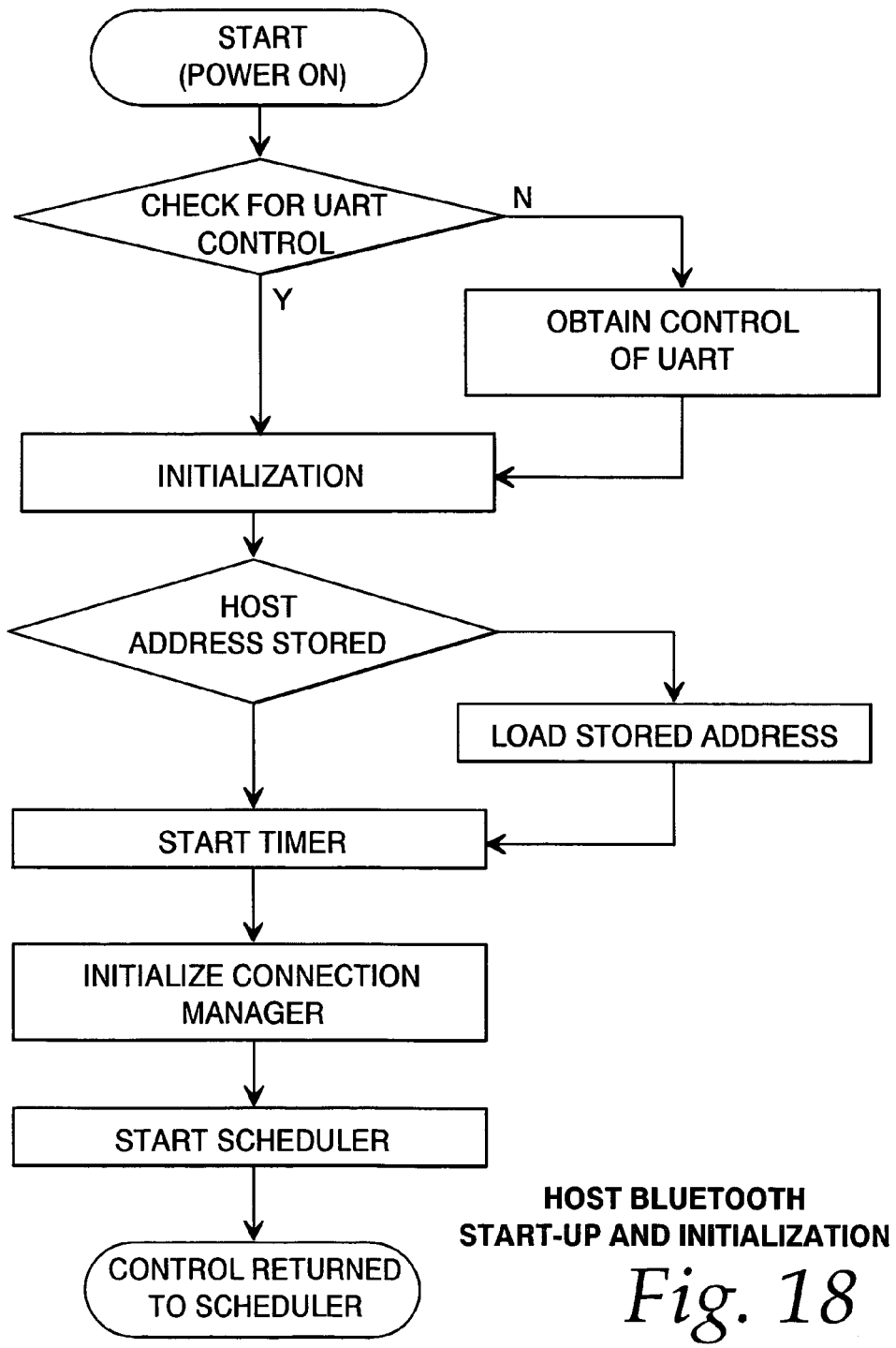
Fig. 18 — HOST BLUETOOTH START-UP AND INITIALIZATION

HOST BLUETOOTH
WIRELESS COMMUNICATION LINK

START-UP & MAIN PROCESSING LOOP

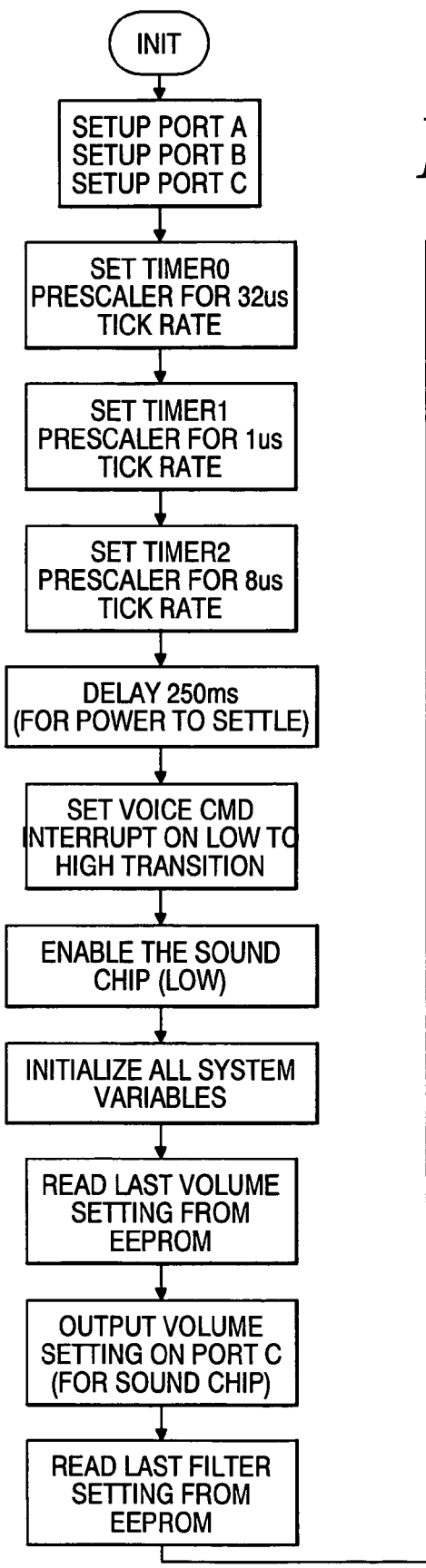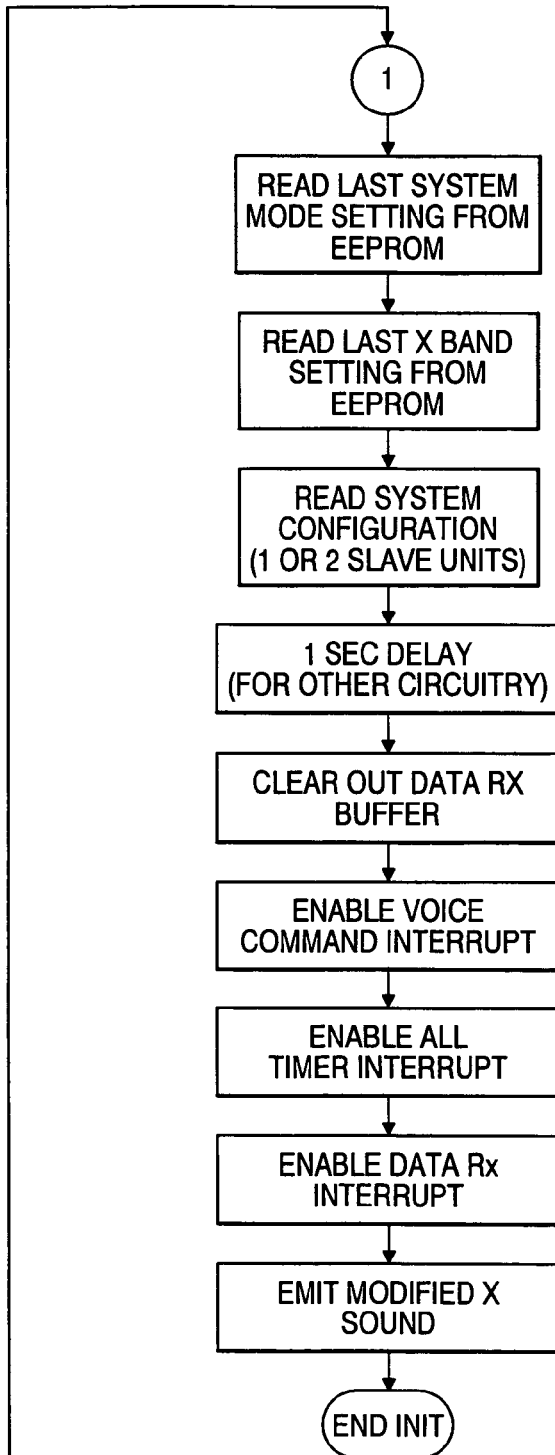
Fig. 21

INCOMING VOICE COMMAND PROCESSING (CON'T)

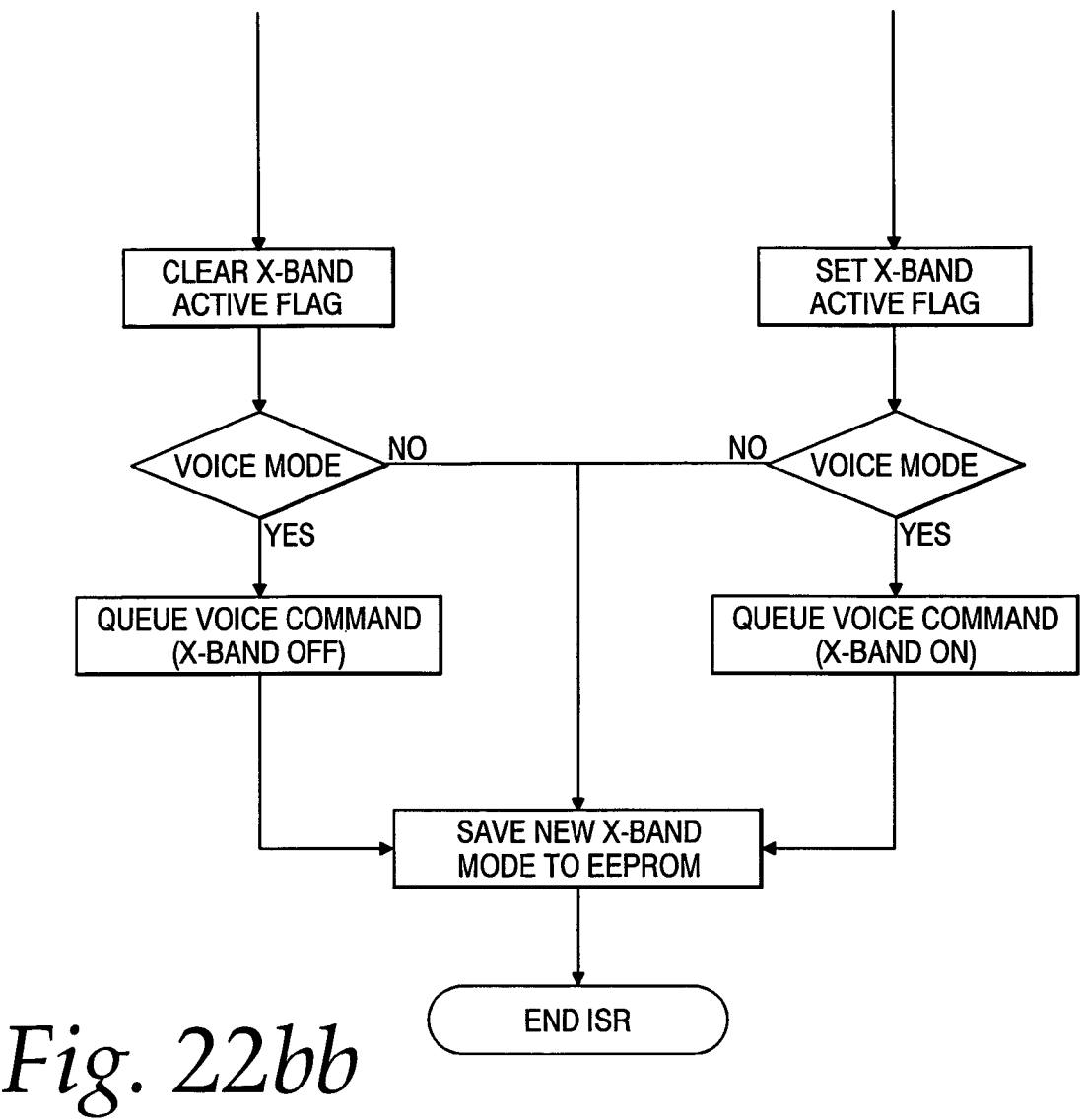
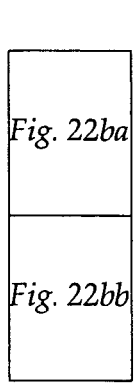
Fig. 22bb

FRONT REMOTE ALERT ROUTINE

REAR REMOTE ALERT ROUTINE

GENERAL SYSTEM TIMING ROUTINE

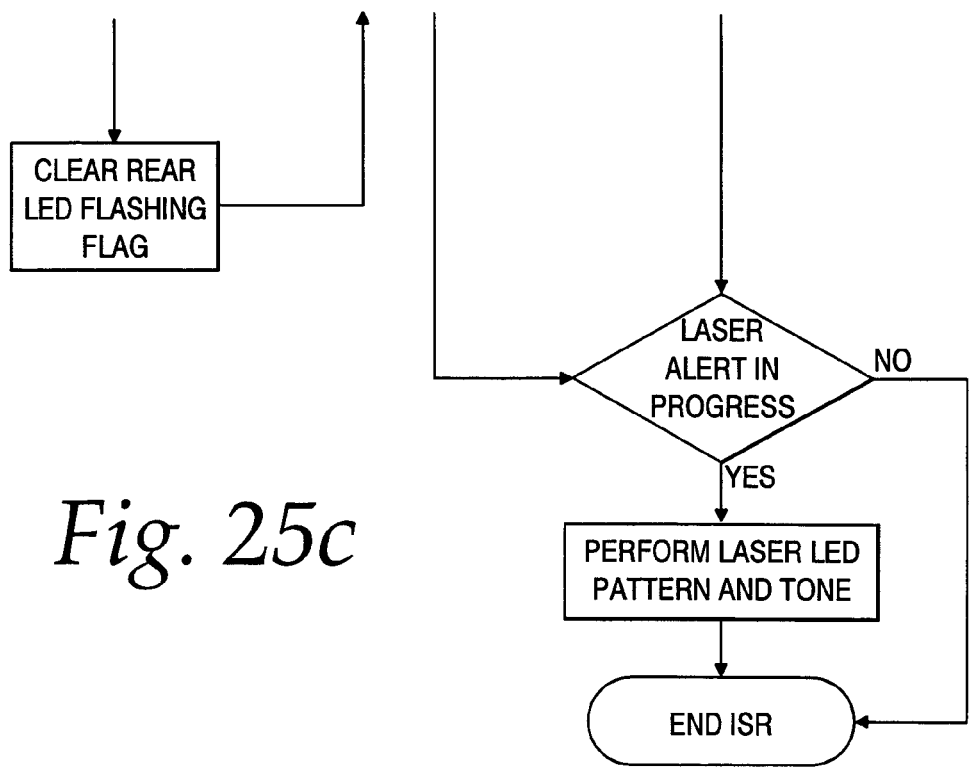
*Fig. 25c*
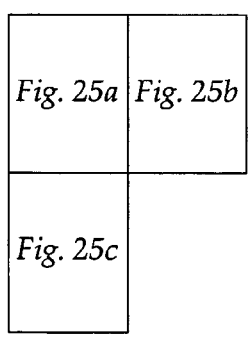

REMOTE DATA PROCESSING ROUTINE

REAR REMOTE DATA PROCESSING ROUTINE

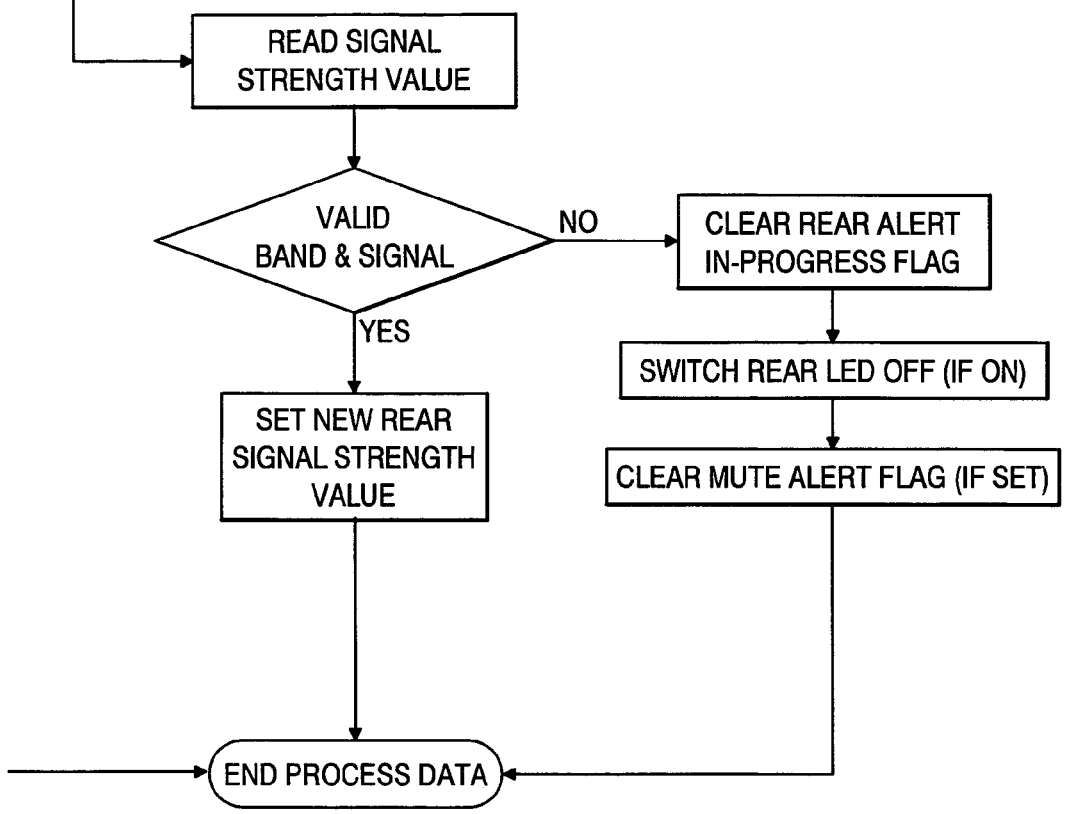
Fig. 27cd
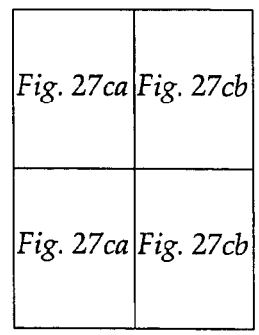

K40 SLAVE CONTROLLER - SOFTWARE FLOW DIAGRAM

REMOTE PIC RADAR POLLING AND PROCESSING

REMOTE PIC RADAR POLLING AND PROCESSING

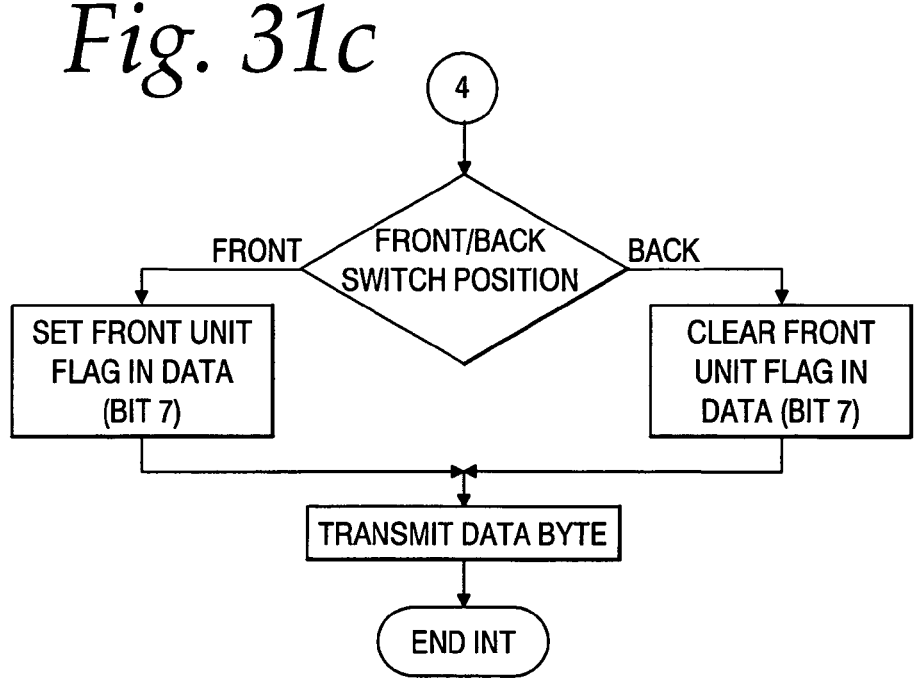
*Fig. 31c*
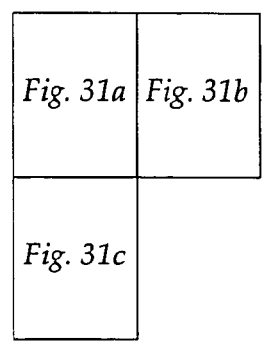

Fig. 33a
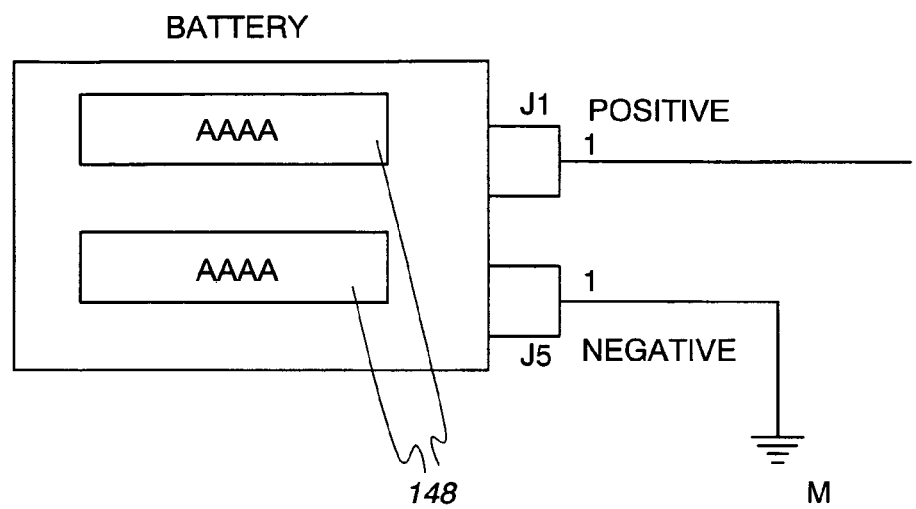
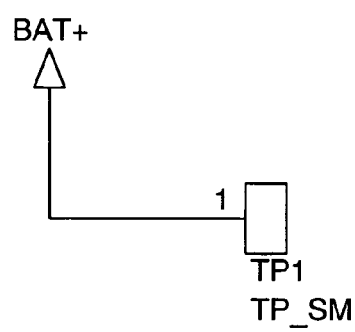
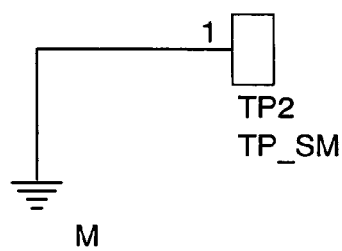
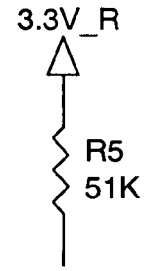

Fig. 33b
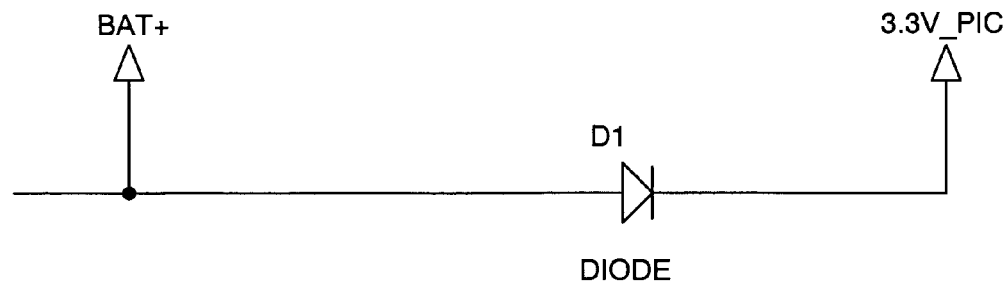
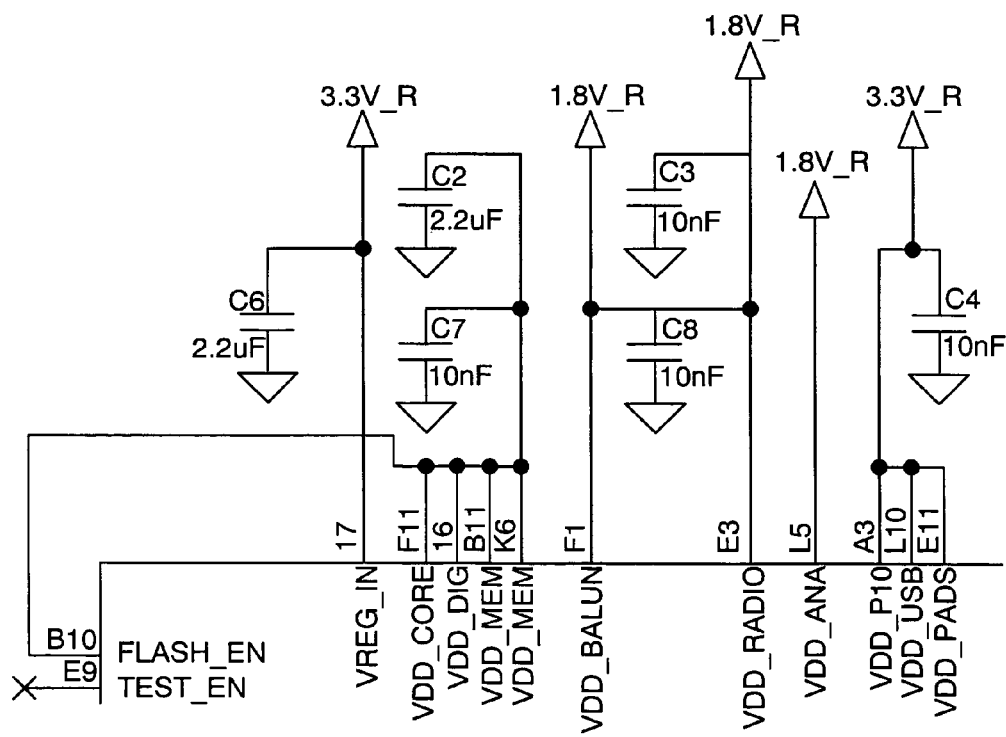

Fig. 33c
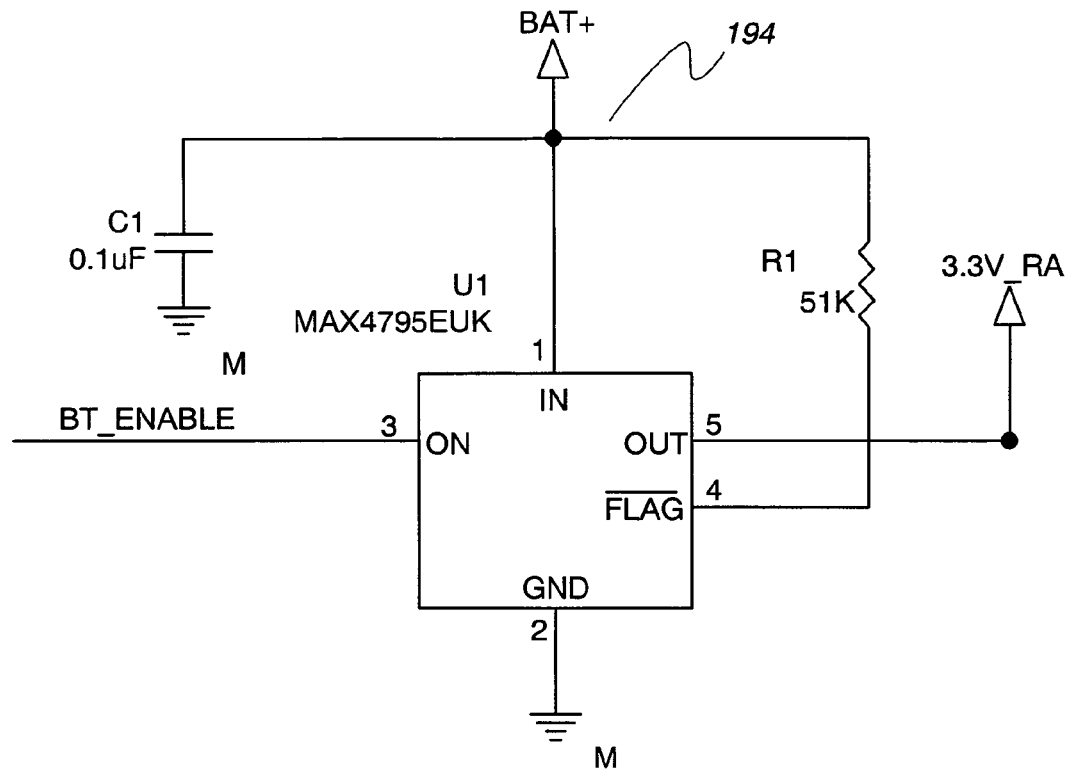
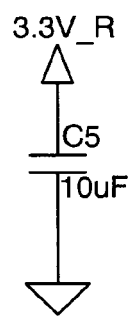
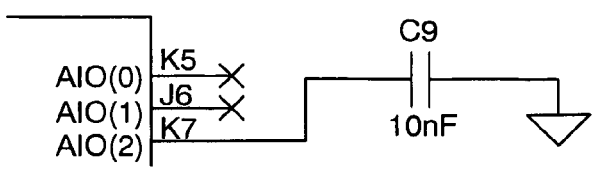

COMMUNICATION SYSTEM FOR VEHICLES

CROSS-REFERENCE TO RELATED APPLICATIONS

This application claims the benefit of U.S. Provisional Application Ser. No. 60/589,192 filed Jul. 19, 2004 which is incorporated by reference herein in its entirety.

FIELD OF THE INVENTION

The present invention pertains to communication systems for use with moving vehicles and in particular to moving vehicles undergoing speed detection utilizing an external probing signal.

DESCRIPTION OF THE RELATED ART

With increasing miniaturization of electronics, vehicles are being provided with an ever widening array of information systems. Mapping and position detecting systems, for example, provide the motorist with important data which must be continuously updated. Detection systems have long been popular with motorists to provide an electronic early-warning of nearby speed detection units. Such systems provide either proximity sensing for surrounding speed detection activity or detection of probing signals directed to the motorist's vehicle. Today, speed detection systems monitor traffic from both radar emitting and laser emitting probing systems of the type used by various law-enforcement agencies to sense and gauge the speed of passing motor vehicles. Traditionally, the range of the typical radar-sensing device exceeds that of most probing devices, thus providing an early warning to motorists of the presence of probing activities. Typically, the warning is early enough to provide a motorist ample time to monitor and adjust vehicle speed, if necessary, before entering the effective operating range of a probing site.

In typical speed detection systems, an antenna and receiver is mounted at the front most portion of the vehicle, the location most likely targeted by probing signals. Electronic processing of the signals is required before being presented to the motorist at a location within the passenger compartment adjacent the driver's position. Electronic circuitry for processing the received signals and providing the motorist with an indication of various aspects of speed detecting activity can be located at the front end of the vehicle, in the engine compartment or in the passenger compartment. It has been necessary to run wiring from the antenna/receiver to the various components and ultimately to a destination adjacent the driver's position. Routing of wiring is costly, especially so if great care is taken to avoid cluttering the appearance of the motor vehicle. Appearance problems are aggravated in ever increasing ways by the growing number of aftermarket onboard vehicular electronic systems being offered today. As wiring is secreted deeper and deeper within the vehicle so as to remain out of sight, there is a possibility that pinch points and other types of wiring-degrading situations will be encountered, compromising the functional integrity of the installed system. Accordingly, labor and other installation costs for speed detection and other onboard systems which must communicate throughout the length of the vehicle is becoming increasingly costly, even to the point of approaching or perhaps exceeding the cost of the system electronics and hardware.

SUMMARY OF THE INVENTION

It is an object of the present invention to provide communication systems which extend throughout substantial portions of a vehicle's length. More specifically, it is an object of the present invention to provide communication systems which extend from the front end of the vehicle, through the engine compartment and firewall to the passenger compartment, to a location in or under the dash adjacent the driver's seat.

Further, it has been found important in providing improved detection of speed sensing activity, that antennas and signal receivers be located at both the front end and rear end of the vehicle. Accordingly, communication signals for the systems must travel throughout the length of the vehicle, being presented to the motorist adjacent the driver's seat. While the placement of special wiring to the rear end of a front engine vehicle may be somewhat less complicated than wiring extended through the engine compartment, great care must still be taken if unsightly alteration of the vehicle is to be avoided. Accordingly, another object of the present invention is to provide communications systems extending from either the front or the rear end of the vehicle without requiring dedicated additional wiring. More particularly, it is an object of the present invention to provide wireless communications systems or to adapt existing wiring runs extending from the front end and/or rear end of the vehicle to a position adjacent the driver's seat.

In one embodiment of a communication system is provided for a vehicle traveling over a road surface and having a front end, a forward compartment, a passenger compartment, a wall dividing the forward compartment and the passenger compartment, and a rear end. A detector is provided at the front end for sensing speed detection signals impinging on said vehicle, to monitor the speed of said vehicle or a nearby vehicle and to generate an output signal in response thereto. A radio frequency transmitter is provided adjacent the front end for receiving said detector output signal and for transmitting a transmit signal indicative of said speed detection signals in response thereto directed toward said road surface so as to be deflected toward the passenger compartment. A receiver is provided adjacent said wall, either in said front compartment or in said passenger compartment, for receiving said transmit signal from the road surface and for outputting an annunciator signal in response thereto. An annunciator is provided in the passenger compartment, coupled to said receiver to receive said annunciator signal and for outputting an annunciator indication in response thereto.

In another embodiment, a communication system is provided for a vehicle traveling over a road surface and having a front end, a forward compartment, a passenger compartment, a wall dividing the forward compartment and the passenger compartment, and a rear end. A detector is provided at the front end for sensing speed detection signals impinging on said vehicle, to monitor the speed of said vehicle or a nearby vehicle and to generate an output signal in response thereto. A radio frequency transmitter is provided adjacent the front end for receiving said detector output signal and for transmitting a transmit signal indicative of said speed detection signals in response thereto. A receiver is provided adjacent said wall, either in said front compartment or in said passenger compartment, for receiving said transmit signal and for outputting an annunciator signal in response thereto. An annunciator is provided in said passenger compartment, coupled to said receiver to receive said annunciator signal and for outputting an annunciator indication in response thereto.

In a further embodiment, a communication system is provided for a vehicle traveling over a road surface and having a front end, a forward compartment, a passenger compartment, a wall dividing the forward compartment and the passenger compartment, a rear end and wiring from the front and rear ends to the passenger compartment carrying signals unrelated to monitoring of the speed of the vehicle. A detector is provided at the front end for sensing speed detection signals impinging on said vehicle, to monitor the speed of said vehicle or a nearby vehicle and to generate an output signal in response thereto. A radio frequency injector is provided adjacent the front end for receiving said detector output signal and for injecting a transmit signal indicative of said speed detection signals in response thereto on said wiring for delivery to said passenger compartment. A receiver is operatively associated with said wiring for receiving said transmit signal and for outputting an annunciator signal in response thereto. An annunciator is provided in said passenger compartment, coupled to said receiver to receive said annunciator signal and for outputting an annunciator indication in response thereto.

BRIEF DESCRIPTION OF THE DRAWINGS

In the drawings:

FIGS. 8a and 8b together comprise a schematic block diagram of the control unit portion of the communications system;

FIGS. 10a-10c together comprise an electrical schematic diagram of the control unit of FIGS. 8a and 8b;

FIG. 19 is a schematic flow diagram of a remote Bluetooth wireless communication line routine;

FIG. 21 is a schematic flow diagram of a host PIC initialization routine;

FIGS. 25a-25e together comprise a schematic flow diagram of a general system timing routine;

FIGS. 31a-31c together comprise a schematic flow diagram of PIC interrupt service routines for low power and normal operation modes;

FIGS. 33a-33i together comprise an electrical schematic diagram of the wireless control unit;

DESCRIPTION OF THE PREFERRED EMBODIMENTS

Figure 1:
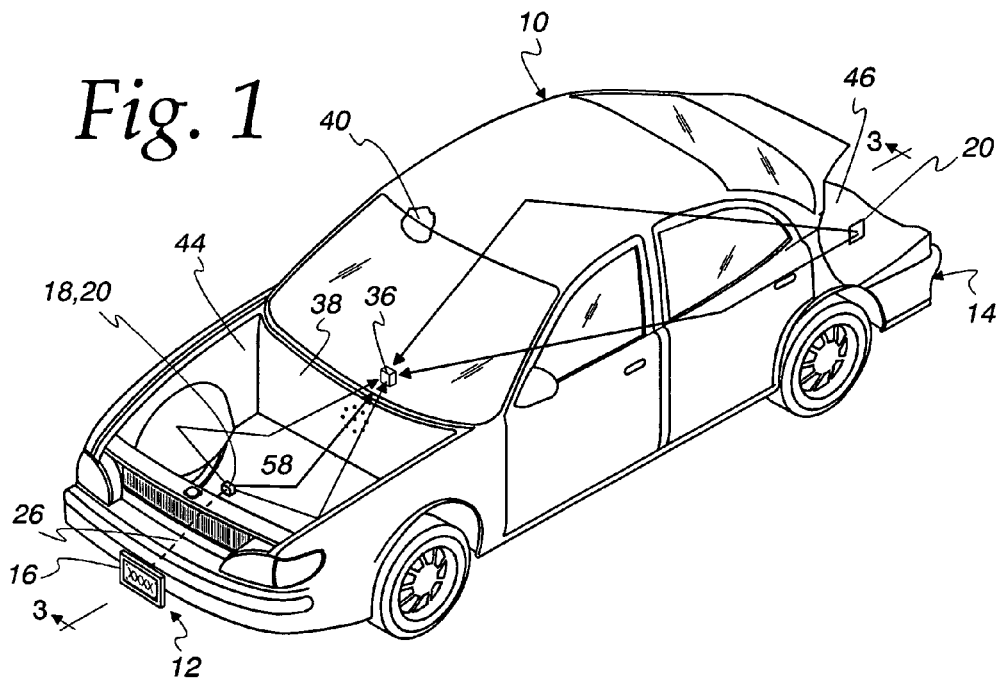
FIG. 1 is a perspective view of a vehicle incorporating a communications system according to principles of the present invention.

As will be seen herein, the present invention is concerned with providing an early warning to a motorist of various surveillance and probing signals directed to the user's vehicle. While such detection systems can be quite simple, the more desirable systems sense a variety of different types of probing signals coming from different directions. The present invention is particularly directed to warning systems which are built into the vehicle in a manner so as to be inconspicuous as possible. The present invention is concerned with eliminating additional wiring as may be required for a detecting system. As will be seen herein, the present invention contemplates wireless communication to throughout the vehicle and alternatively, adapting existing wiring not intended for use with detecting systems, which is nonetheless provided by the vehicle manufacturer. Accordingly, the communications systems according to principles of the present invention can be embodied in a variety of forms.

Referring now to the drawings and initially to FIGS. 1-4, a motor vehicle 10 has a front end 12 and a rear end 14. As is customary, the vehicle 10 is provided with bumpers at the front end and rear end and a license plate frame assembly 16 mounted to the front bumper is visible in the figures. Law enforcement officers and other people engaged in surveillance activities are typically taught to target the license plate when probing the vehicle. In the preferred embodiment, the license plate assembly 16 includes a laser detector and defuser module commercially available from the assignee of the present invention. In the preferred embodiment, a detector 18 for radar radiation is also provided and is located in a forward part of the vehicle, usually separate from the laser detector 16. An additional detector is optionally installed at the rear of the vehicle.

Figure 14:
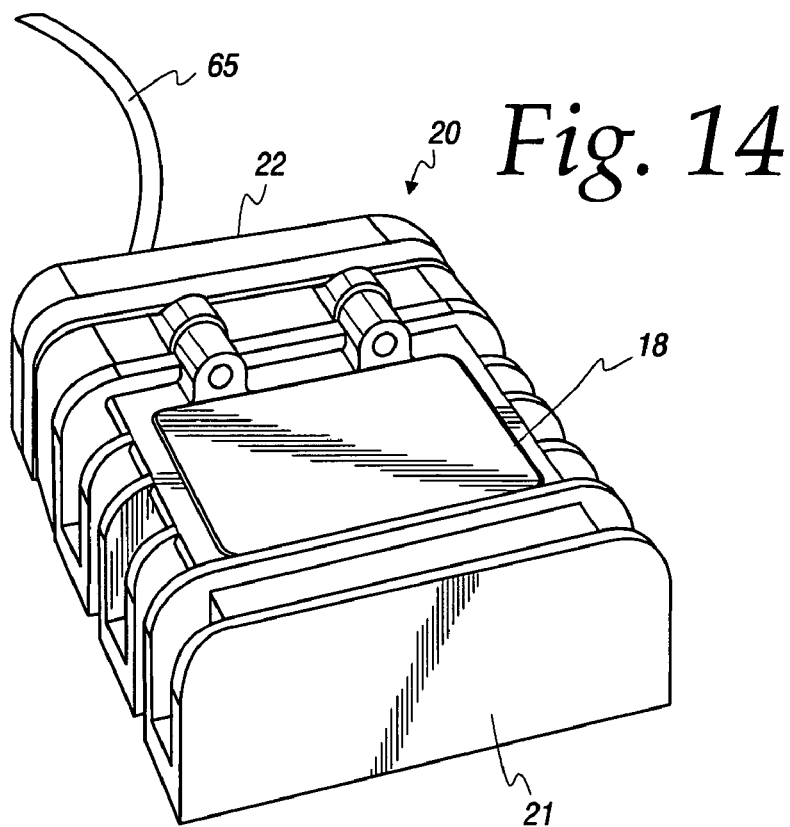
FIG. 14 is a perspective view of the remote unit from one end thereof.
Figure 15:
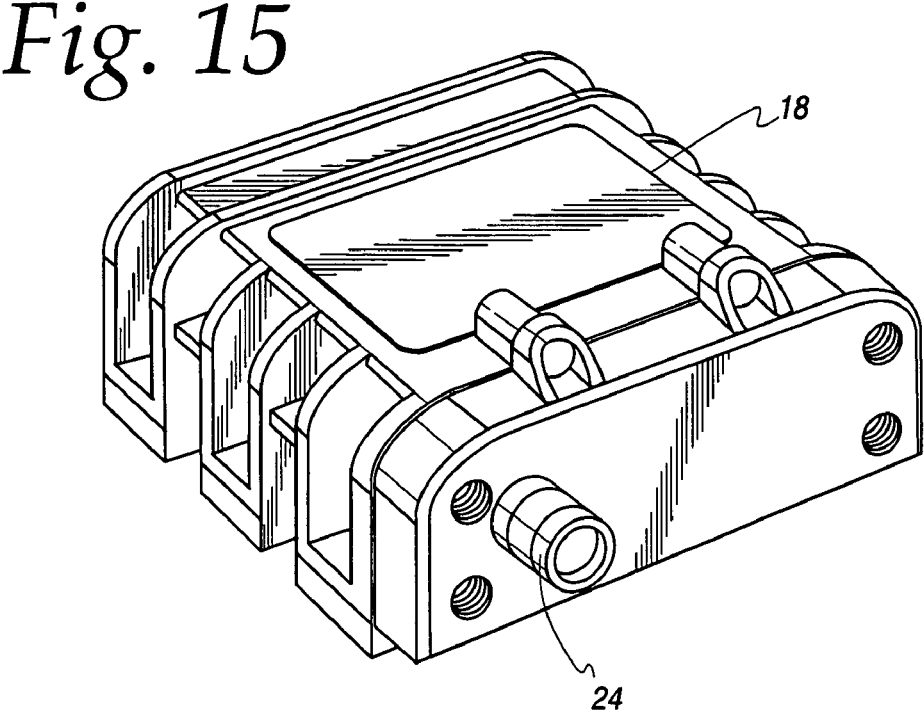
FIG. 15 is a perspective view of the remote unit from an opposite end thereof shown with the communication module omitted.

Referring to FIGS. 14 and 15, the radar detector 18 comprises a portion of a remote unit generally indicated at 20. In FIG. 14, the front face 21 of the radar detector 18 contains a radar receiving antenna, not visible in the figure. At the opposed end of remote unit 20 an interface or communication block 22 transmits radar detection signals to a control unit in or near the passenger compartment or cockpit. Referring to FIG. 15, (which does not show block 22) a connector 24 provides local power to the radar detector 18. One feature of the present invention is that the communication block 22 is retrofitted to existing radar detector units 18, without requiring modification to the radar detector unit.

As mentioned, the license plate assembly 16 is typically chosen as a target for laser probing of the vehicle. The license plate is also typically chosen as a target point for radar probing signals although the radiation beam of the radar probing signals is typically much wider than that for laser probing signals. Also, the radar signals directed to adjacent vehicles and reflections from nearby objects may be sensed by the radar detector in vehicle 10, thus providing useful information to the driver, in addition to radar probing signals directed specifically at vehicle 10.

Figure 4:
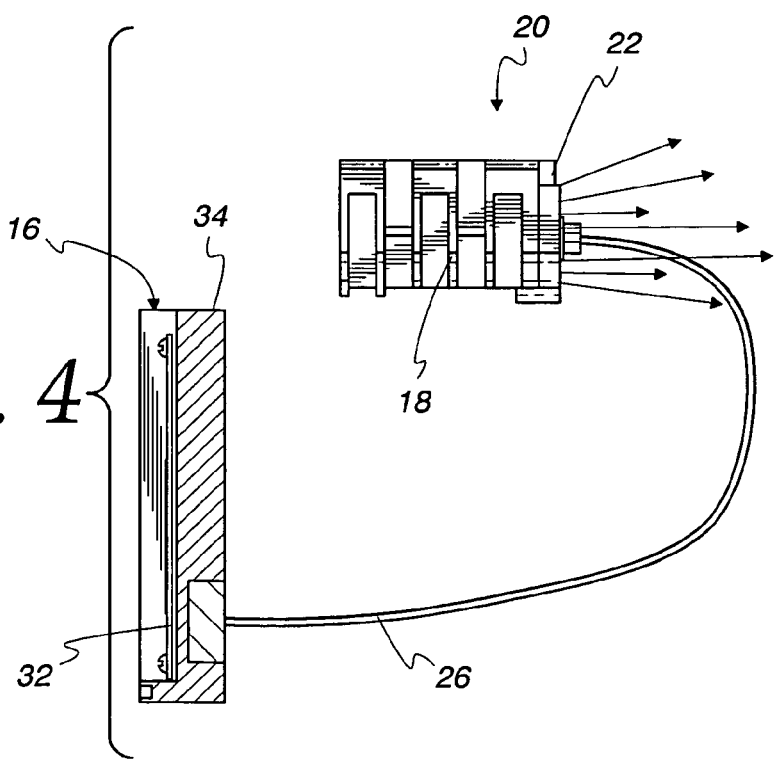
FIG. 4 shows the front portion of FIG. 3, taken on an enlarged scale.
Figure 5:
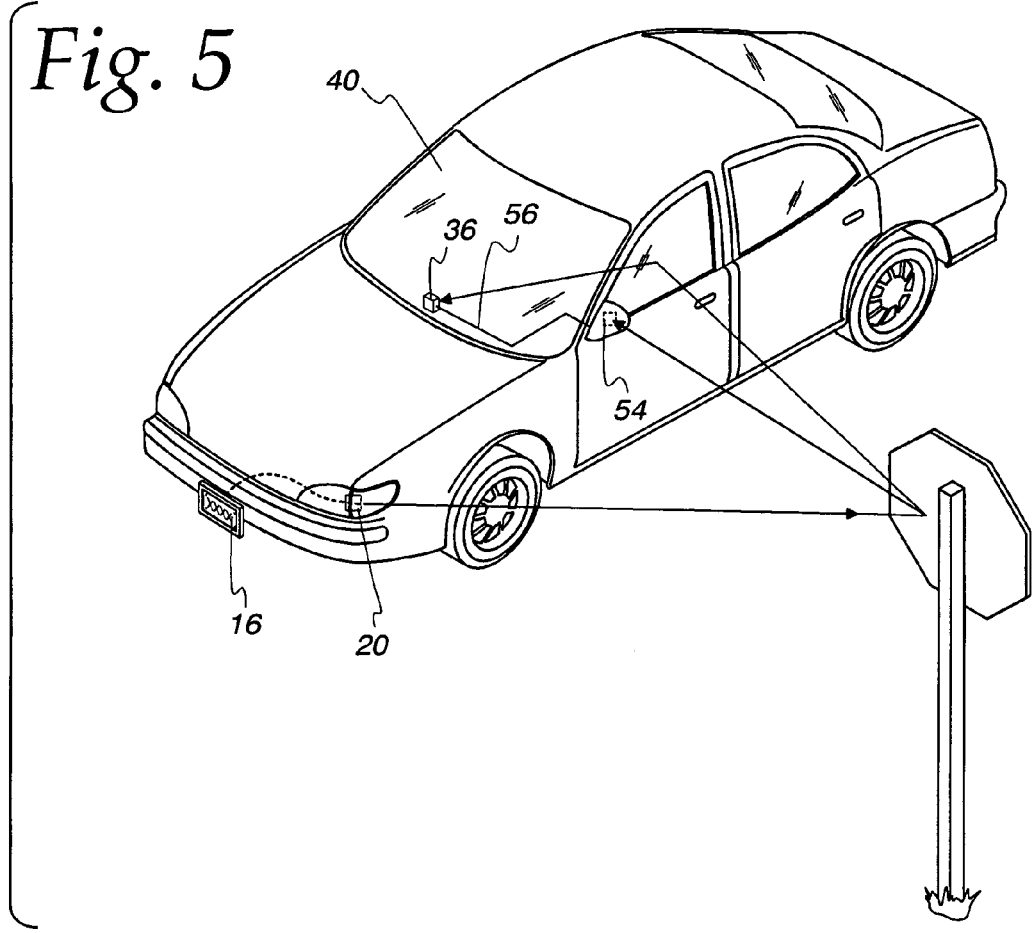
FIG. 5 is a perspective view of a vehicle having an alternative communications system according to principles of the present invention.
Figure 6:
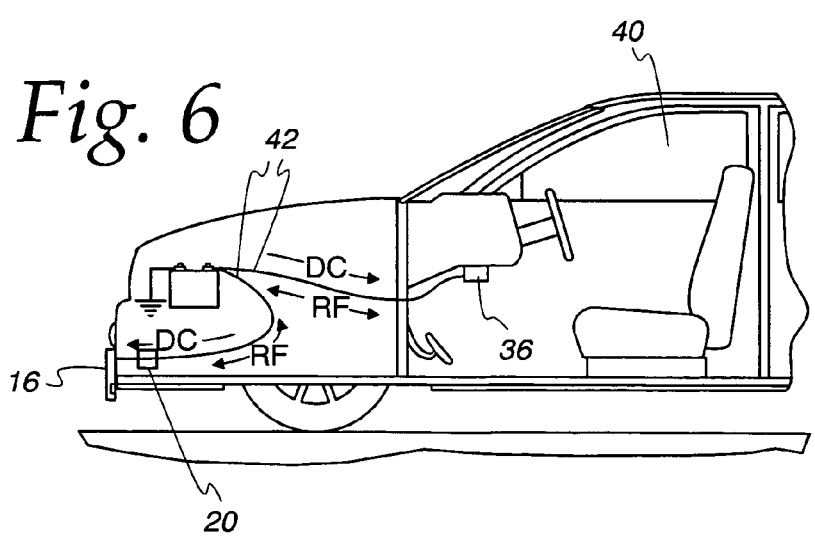
FIG. 6 is a fragmentary cross-sectional view of a vehicle having an alternative communications system according to principles of the present invention.

Referring to FIG. 4, laser probing signals typically have a much smaller beam limited generally to the area of the license plate 32. Frame work 34 surrounding the license plate contains active circuitry that responds to laser radiation and which emits a laser detecting signal carried on cable 26, which is received on remote unit 20. In FIGS. 1-5, laser and radar detection signals are wirelessly transmitted to a receiver or control unit 36 located either outside the firewall 38 (FIG. 2) or behind firewall 38 within the passenger compartment 40 (see FIGS. 1, 3 and 5). In FIG. 6, laser and radar detection signals are impressed on existing power wiring 42 such as that installed by the vehicle manufacturer, and which is not intended for use with a detection system.

As shown in FIGS. 1-3 and 6, the laser and radar detection signals are passed through a forward compartment 44 of vehicle 10, located in front of passenger compartment 40. With reference to FIG. 1, vehicle 10 also includes a rear compartment 46 and a second remote unit 20 passes detector signals through rear compartment 46 to control module 36 located in the passenger compartment. The rear remote unit 20 is usually limited to reception of radar signals only. Thus, in the embodiment illustrated in FIG. 1, vehicle 10 is said to be provided with forward and rearward looking radar detection capability. The communication system according to principles of the present invention conducts detecting signals from various sources over various paths to the receiver or control unit 36 which advises the driver of surveillance and probing activity, preferably via one or more annunciators. It should be noted that communication systems according to principles of the present invention work equally well for front engine, mid engine and rear engine vehicles. For purposes of explanation herein, it will be assumed that vehicle 10 is a front engine vehicle and that front compartment 44 contains the usual engine components, while compartment 46 at the rear of the vehicle comprises a conventional trunk space.

Referring again to FIGS. 14 and 15, remote unit 20 includes communication block 22. Other relative orientations of the radar receiving antenna and radio frequency transmitting antenna are possible. For example, in FIG. 5 the radio frequency transmitting antenna is transmitted in a sideways direction to bounce off of nearby objects so as to enter the passenger compartment 40 from the side. If desired, a radio receiver 54 can be located at the side of the vehicle for connection to control unit 36 with a relatively short wiring run 56. Preferably though, the wireless communication path provided by the communication system accordingly to principles of the present invention traverses generally longitudinal paths from the front and rear of the vehicle to the passenger compartment or a firewall located adjacent a front or rear compartment.

Figure 2:
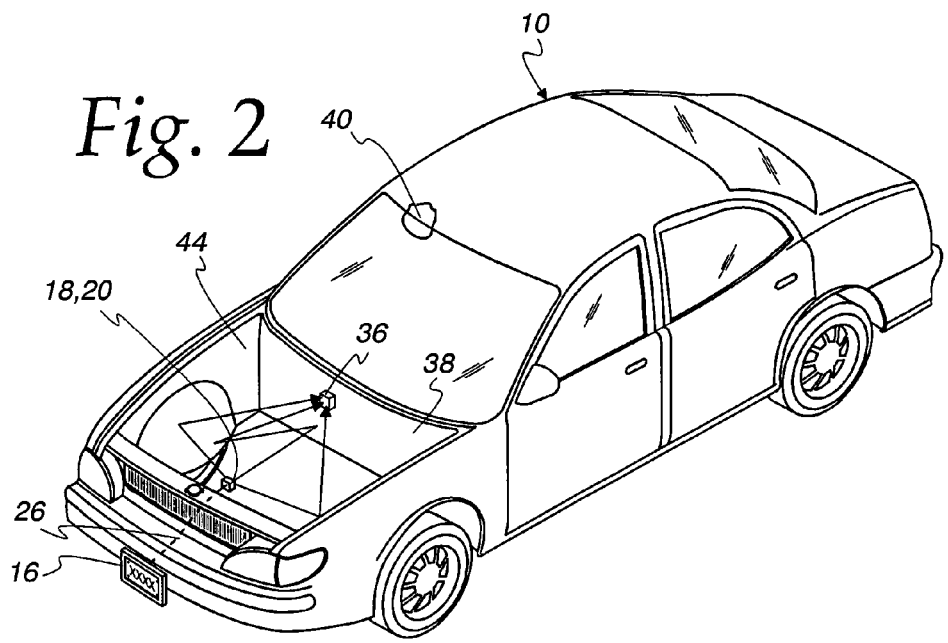
FIG. 2 is a perspective view similar to FIG. 1, but where communication paths are contained within a vehicle body.
Figure 3:
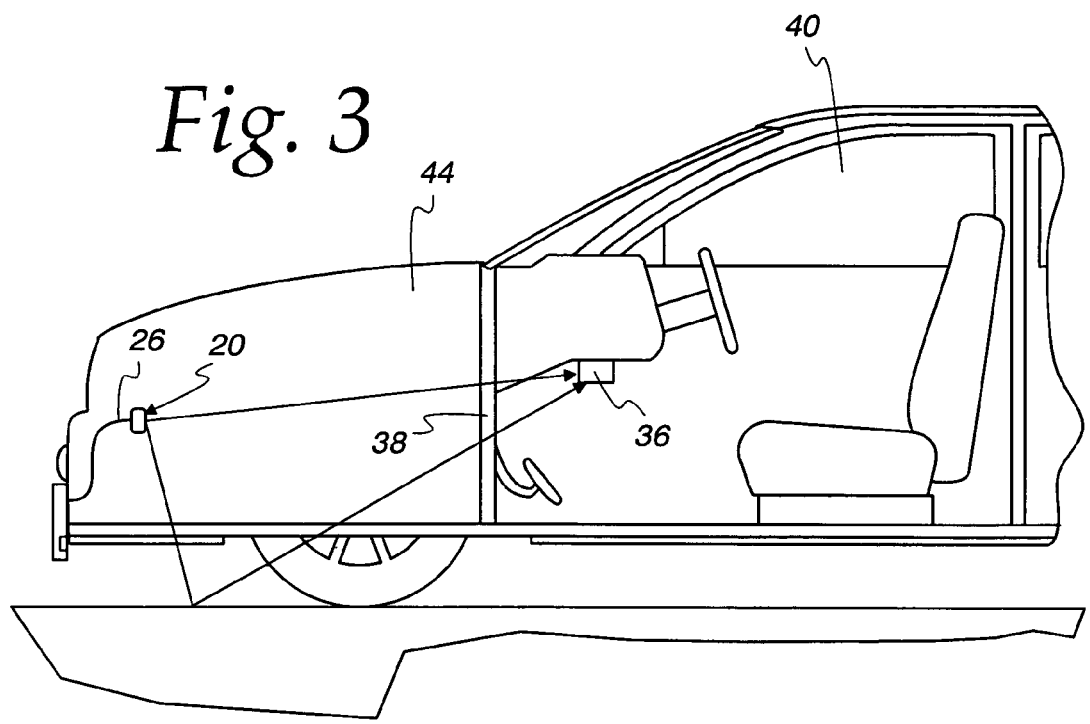
FIG. 3 is a cross-sectional view taking along the line 3-3 of FIG. 1.

Referring briefly to FIGS. 1 and 2, the wireless communication paths are shown in the engine compartment 44. As indicated, the communications paths of the radio frequency signals emitted from the remote unit 20 are reflected within the engine compartment, eventually passing to the control unit 36. In FIG. 1, one signal path 58 is reflected from the ground so as to be received at control unit 36. This ground skip path comprises one of the paths of radiation emitted from remote unit 20 (and subsequently detected in a receiver). In FIG. 2, it is assumed that no ground skip signal is present and that radiation of the wireless signal from remote unit 20 to control unit 36 is contained within vehicle 10. In the arrangement of FIG. 2, additional signals otherwise provided by ground skip paths are unavailable for improved detection capability by wireless receivers located in control unit 36. In FIG. 2, control unit 36 is located within the forward compartment 44 and is attached to firewall 38 or another convenient mounting site. In FIG. 1, control unit 36 which receives the wireless signals is located behind firewall 38, and passenger compartment 40.

As will be appreciated by those skilled in the art, the firewalls of conventional vehicles are perforated with passageways for equipment and wiring and radio frequency signals can conveniently travel through these firewall openings (in addition to the ground skip paths, previously mentioned). If signal attenuation at the control unit 36 is excessive, the control unit can be mounted in the forward compartment, as shown in FIG. 2, and relatively short wiring can pass through the firewall to visual and audible annunciators located within the passenger compartment. In the preferred embodiment, the radio frequency link between remote unit 20 and control unit 36 operates on a frequency approved for use by the Federal Communications Commission. Preferably, the radio link uses a 2.4 GHz carrier frequency although other carrier frequencies such as possible future frequencies in the unlicensed spectrum in the 450 MHz and 900 MHz bands could be used as well. In the present invention, a cost effective conventional interface is employed to ensure orderly and reliable transmission of data bits between remote units 20 and control unit 36. It is generally preferred that the Bluetooth radio interface standard is employed, to accommodate optional features such as the wireless control unit to be described herein, and to take advantage of future integration opportunities with other motor vehicle devices. The invention contemplates other popular interfaces such as Wi-Fi, CDMA, TDMA, TDD, FDD and analog, for example.

One problem to be dealt with in a practical wireless link is a situation where two radio frequency signals or vectors arrive at the control unit at the same time. For example, one vector could bounce over the ground surface while another vector could bounce from surfaces of the vehicle. The Bluetooth interface standard preferred in the present embodiment has provision for distinguishing one simultaneous vector from another using a predetermined timing assignment. Once a vector is received with sufficient strength to be reliably demodulated, other vectors with the same time stamp are ignored. The ability to have additional vectors traveling along ground skip paths provides a substantial advantage in system operation and reliability. Also, wireless reception in the control unit 36 can be processed such that an incoming signal is considered to be reliable only when multiple vectors carrying that signal are considered to be reliable. In this latter instance, the ability to receive the additional vectors traveling over ground skip paths can provide a substantial operating advantage.

Depending upon the path preferences within vehicle 10, the antenna for transmitting radio frequency information from remote unit 20 can be tailored to prefer one communication path over another to avoid unusually strong attenuation circumstances which may arise due to vehicle construction. With the present invention, different communication blocks can be provided with the radar detector module at the time of installation, to customize the communication system for a particular vehicle.

Before proceeding to a more detailed explanation of the wireless embodiments of communications according to principles of the present invention, attention will be directed to FIG. 6 where existing vehicle wiring is adapted to provide a communication system for detection devices. In FIG. 6, a remote unit 20 is connected to internal wiring 42 of the vehicle provided by the vehicle manufacturer, for delivering direct current power, for example. Radio frequency detection signals from the remote unit(s) 20 are impressed on the wiring which typically carries a direct current power signal. The radio frequency data is virtually identical to the radio frequency data in a wireless embodiment. Conventional equipment such as that provided by Cambridge Silicon Radio, Zeero or TI can be employed for this purpose.

Figure 7:
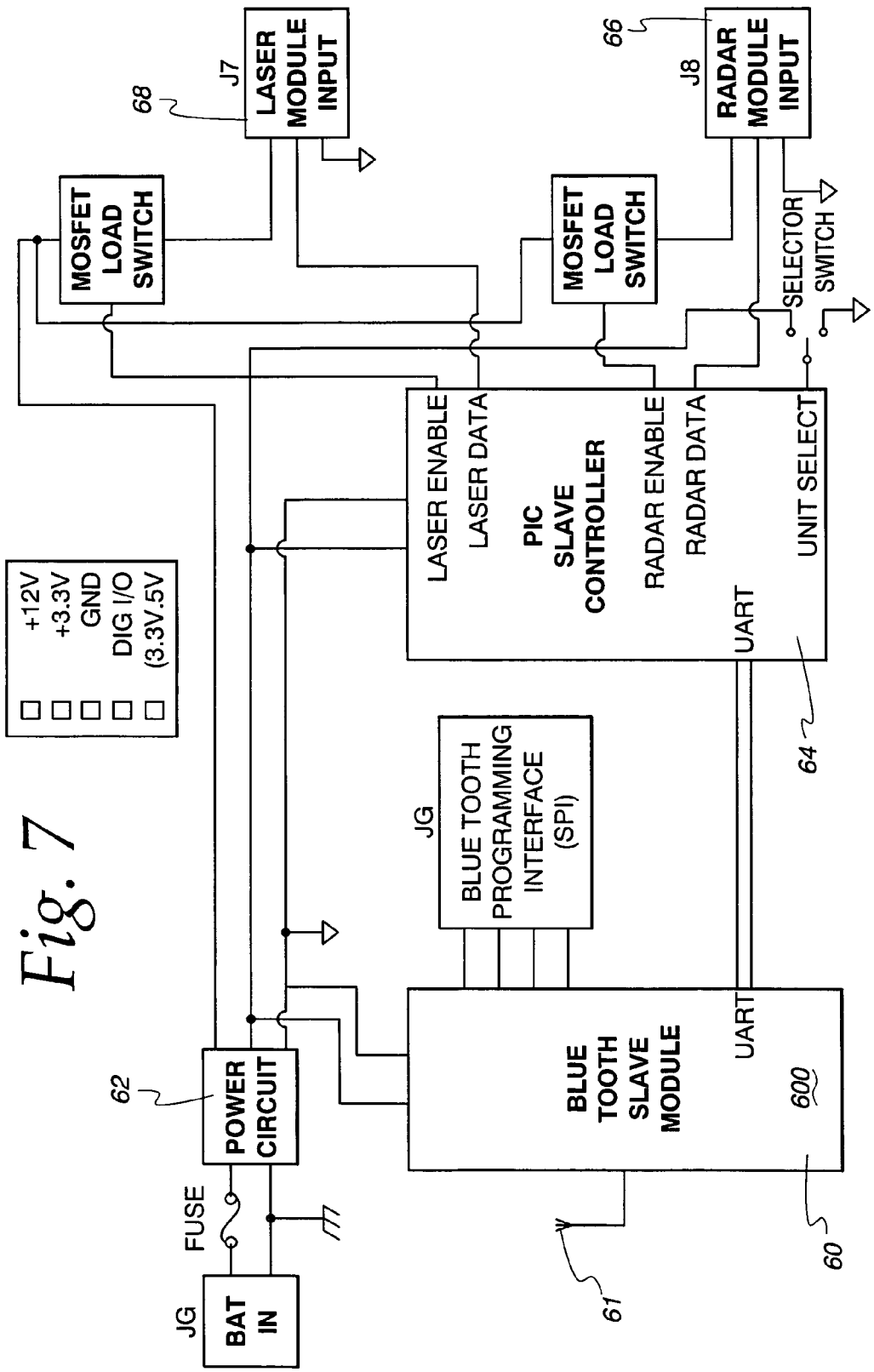
FIG. 7 is a schematic block diagram of the remote unit portion of the communications system.

Referring now to FIG. 7, the remote unit 20 will be described in greater detail. Component 60 contains the radio interface protocols. The choice of protocols is independent and Bluetooth is selected for illustration because of its cable replacement use. The electronics component 60 obtains the electrical power necessary to operate by using power circuit 62 of conventional construction. The power circuit 62 is connected to a DC voltage source of 12 volt potential, capable of delivering a minimum current of 100 milliamperes. The connection is made through an external wire cable 65 shown in FIG. 14 which enters the internal components through communication block 22. A controller is used to collect the output of the radar module 18 as indicated at 66 in FIG. 7. The controller 66 preferably comprises a micro controller, catalog number PIC16F627-04I/SS, available from Microchip Technology located at Chandler, Ariz. Other types of controllers or microprocessors could be employed, as desired. The controller is chosen so as to accommodate the inputs 66 of the radar module and inputs 68 of the laser module. The radar and optionally laser detector signals are analyzed and sent along using one of the radio interfaces and vector paths between remote unit 20 and control unit 36 as indicated in the Figures. The software necessary to run the communication system of remote unit 20 is loaded through an interface using SPI techniques.

The control unit 36 uses the circuit depicted in block form in FIG. 8 (shown divided between FIGS. 8a and 8b for clarity). The radar detector data transmitted from remote unit 20 is received at host module 76, via antenna 77. The antenna 77 is internal to the body of the control unit and preferably comprises a surface mount component on the printed circuit board of the wireless control unit 36 so as to maintain a clean profile and to allow installation in the largest population of different vehicle configurations. Information received at host module 76 is passed along to a main control unit 78, a micro controller, catalog number PIC16LF873A-I/SS from Microchip. The main control unit 78 processes received information and alerts the driver of the vehicle 10 by activating an appropriate light emitting diode 80 or 82. In addition, a voice alert code is sent to an optional voice recognition unit 86. The voice recognition unit 86, when employed, preferably comprises a conventional voice recognition integrated circuit commercially available as part number RSC-4128 commercially available from the Sensory Company located at Santa Clara, Calif. The voice recognition unit 86 uses the code given by main control unit 78 to access a preprogrammed sound file and external EEProm 90 so as to play the appropriate message at speaker 92. In the preferred embodiment, commands are given to the control system 36 by the driver, using vocal directives. Other input techniques known in the art, can also be used. In an optional control unit voice recognition capabilities are provided by voice recognition unit 86, using microphone 94. The voice commands delivered to the voice recognition unit 86 by the microphone are processed and matched according to values stored in the external memory unit 90. If desired, the voice recognition unit can be omitted, for example, in favor of a wireless remote control unit 130 to be described later, herein.

Figure 9A:
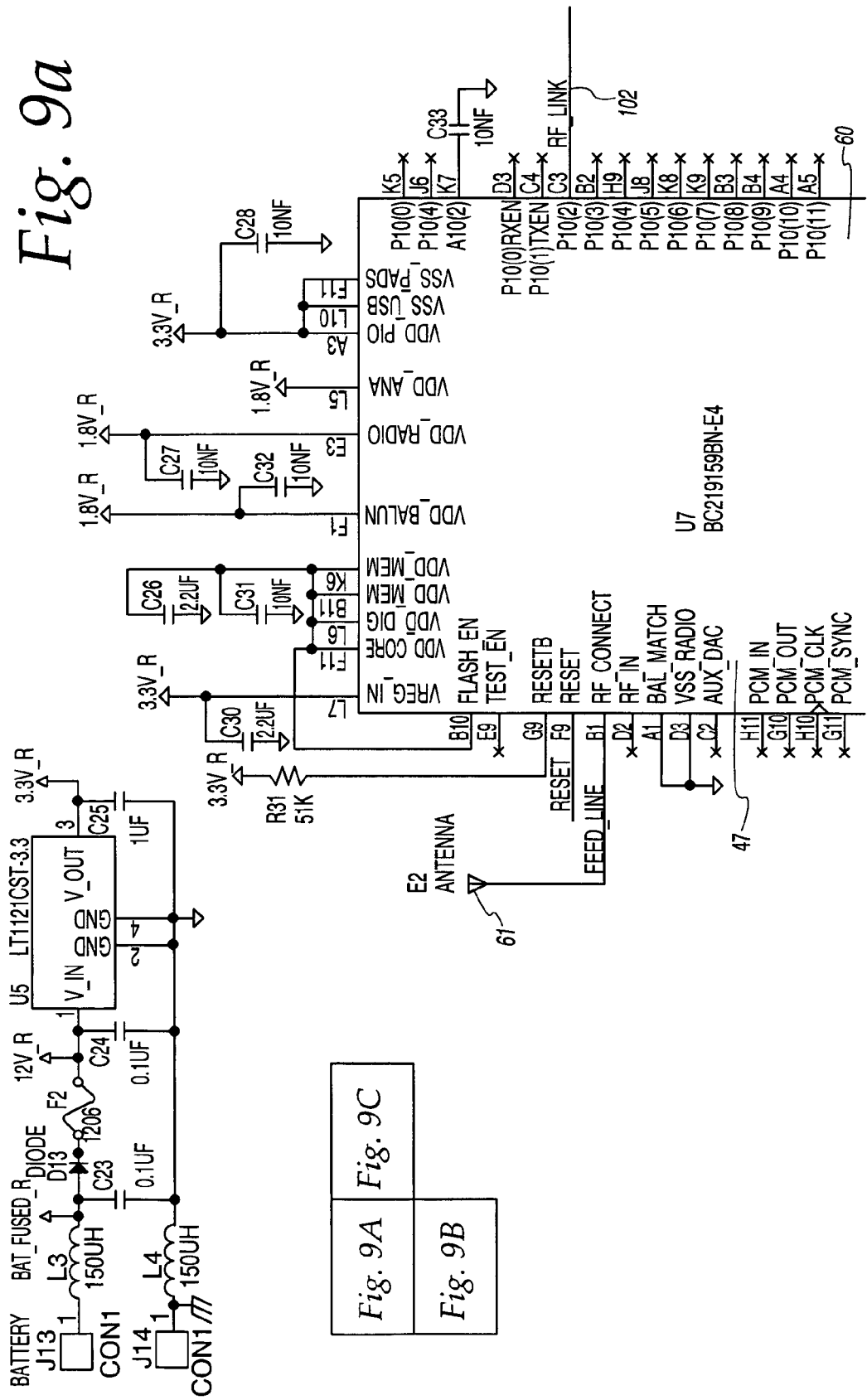
FIGS. 9a-9c together comprise an electrical schematic diagram of the control unit of FIG. 7.
Figure 9B:
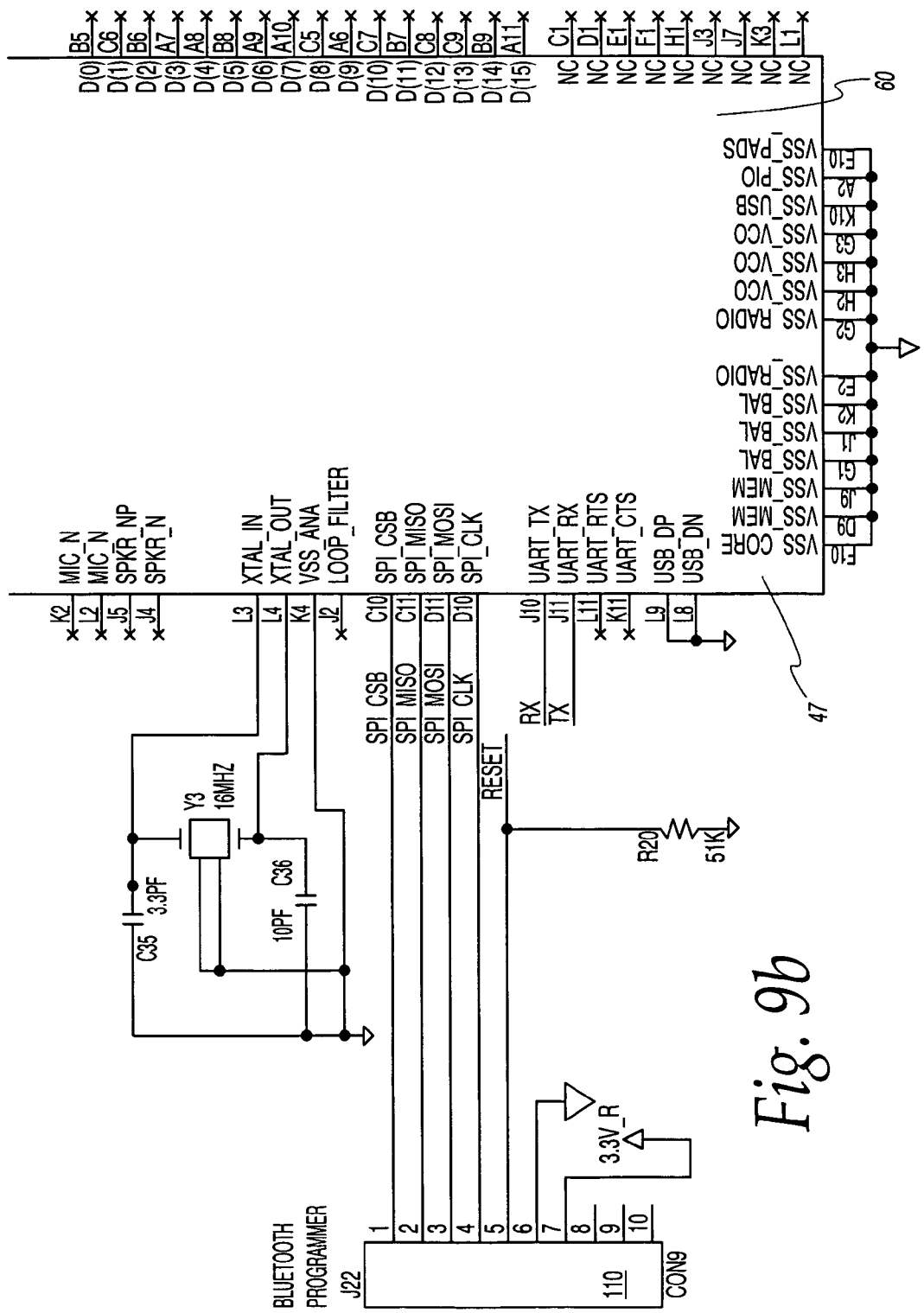
Figure 9C:
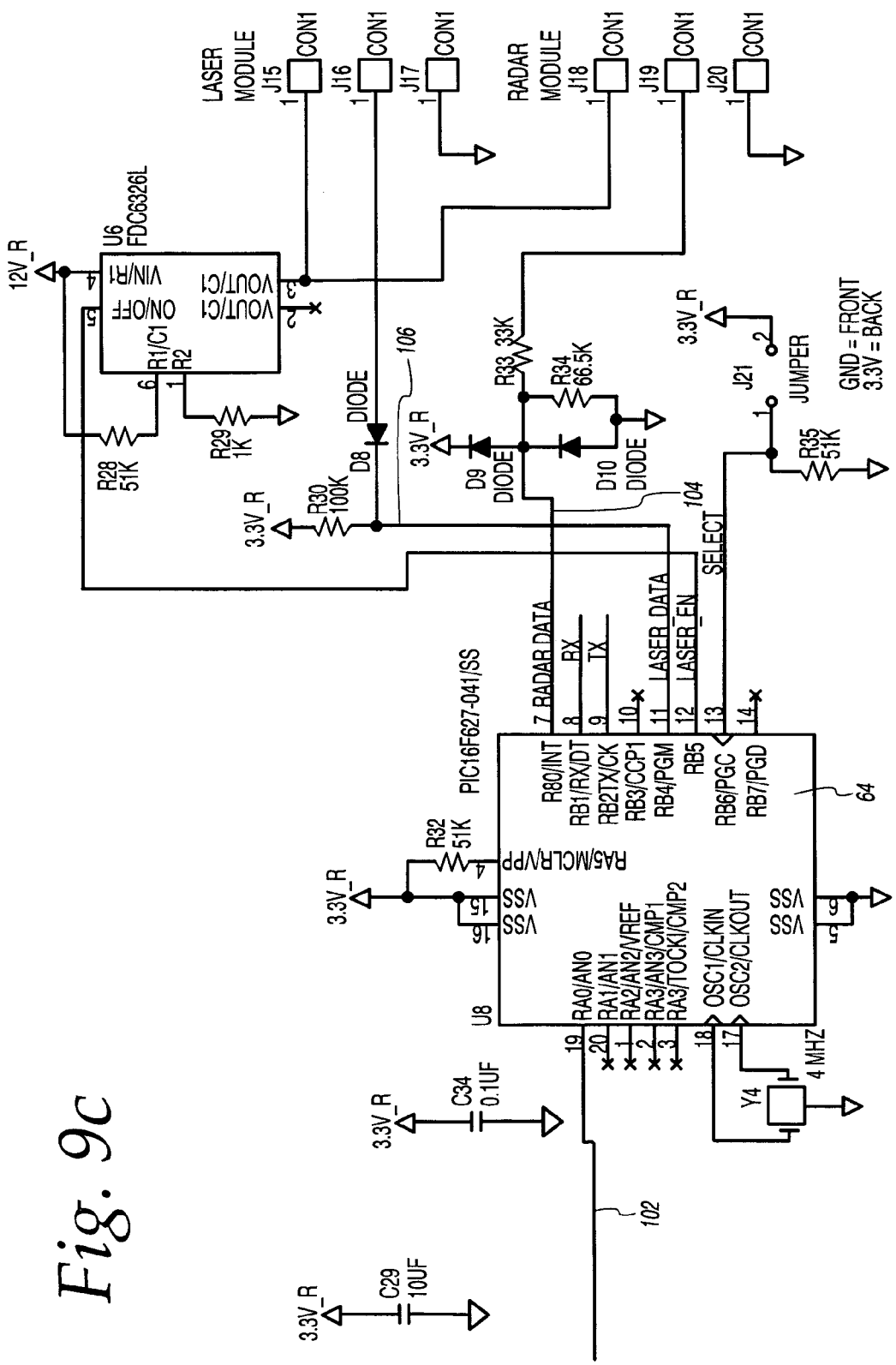
Figure 13:
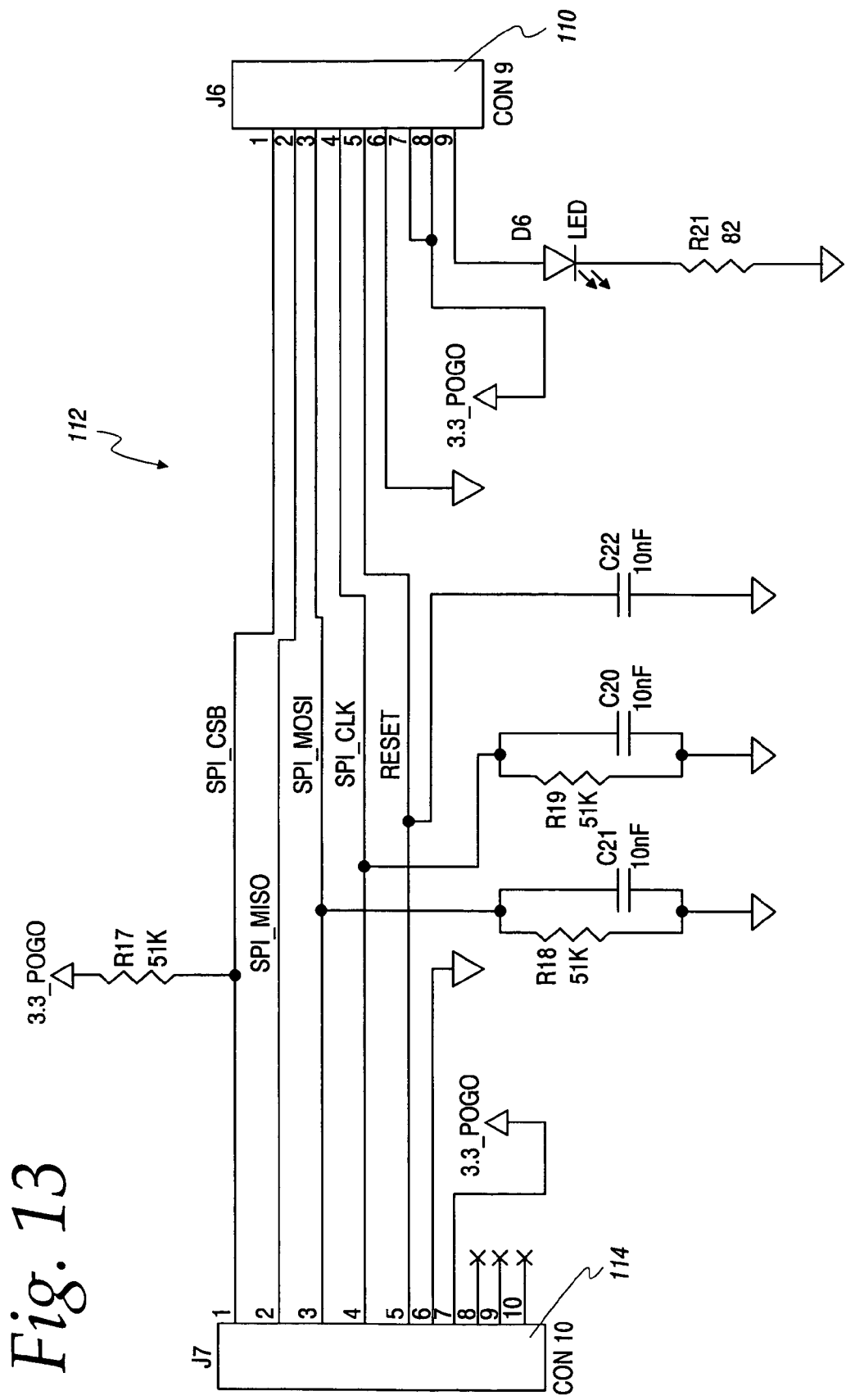
FIG. 13 is an electrical schematic diagram of a programming interface between the remote and controlled units.

More detailed electronic schematic diagrams for the remote and control units are given in FIGS. 9a-9c, 10a-10c, 11a-11d, 12a-12d and 13. For example, module 60 of FIG. 7 which delivers data to transmitting antenna 61 is indicated in the electrical schematic diagram of FIGS. 9a-9c as module U7 which preferably comprises a Bluetooth radio module, catalog number BC219159DN-E4 available from CSR located in Cambridge, UK. The PIC controller 66 in FIG. 7 is shown in FIGS. 9a-9c is commercially available as part no. PIC 16F627-041/SS from Microchip Technology of Chandler, Ariz. Data outputted from unit U7 is transmitted via RF link 102 from controller 66. Output signals are sent by control unit 66 in response to radar data signals on line 104 and laser data signals on line 106 coupled to the radar detector module 18 and laser detector module 16 respectively of FIG. 1, for example. Referring now to FIGS. 9a-9c, a connector 110 (see FIG. 9b) is provided for Bluetooth programming, using the interface circuit 112 shown in FIG. 13 which couples connector 110 to a connector 114 of FIGS. 10a-10c.

Figure 10A:
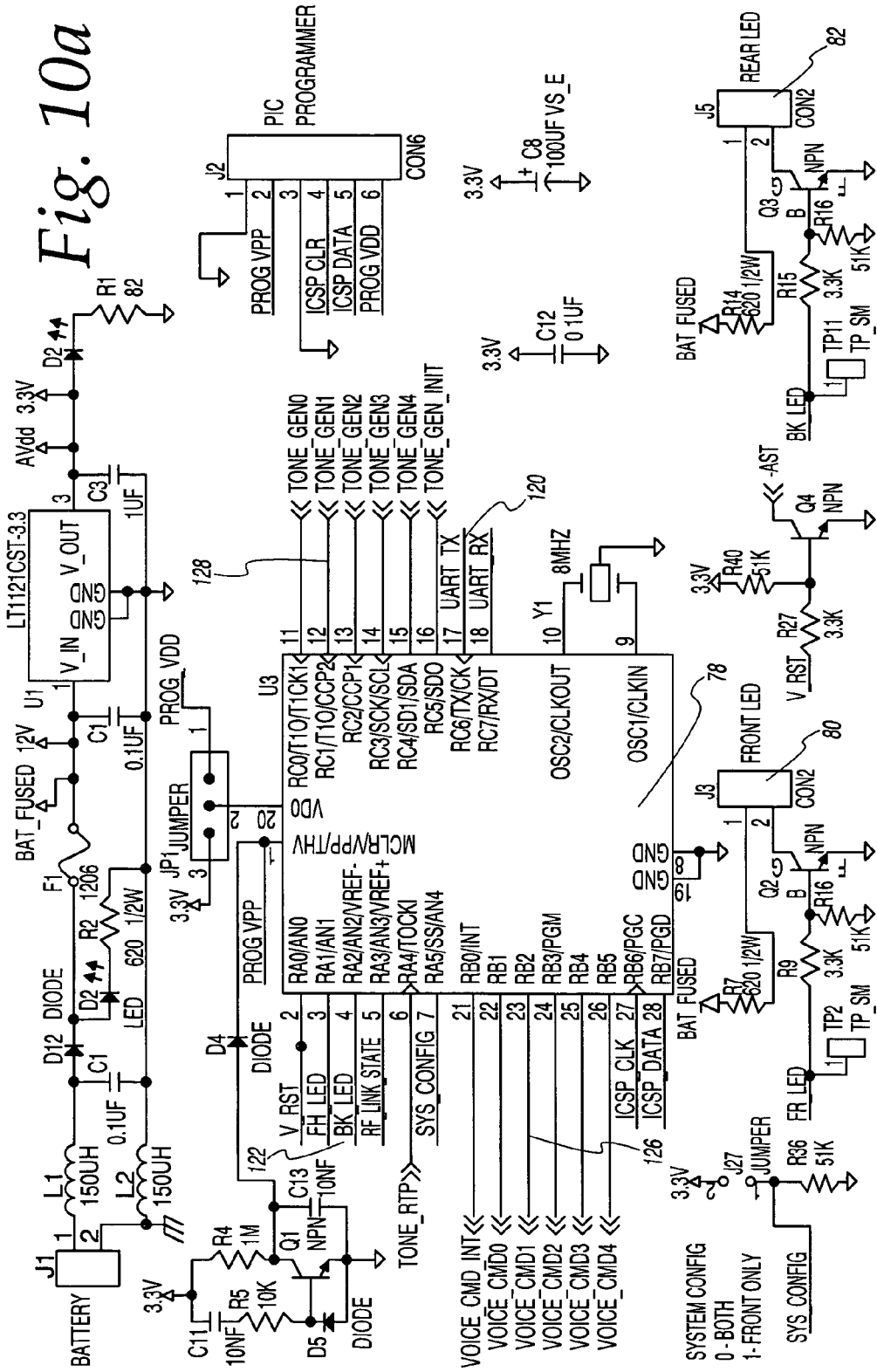
Figure 10C:
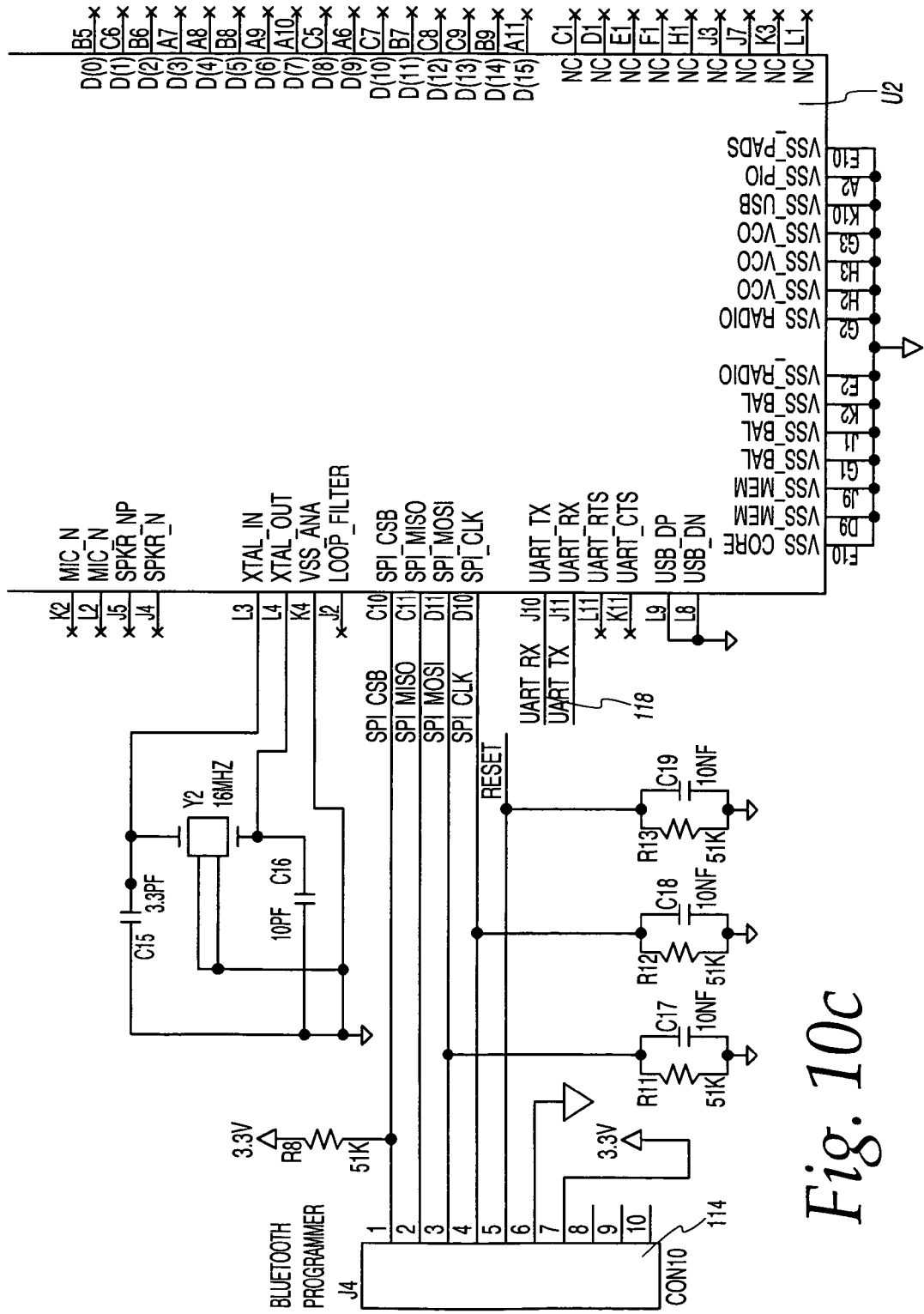
Figure 11A:
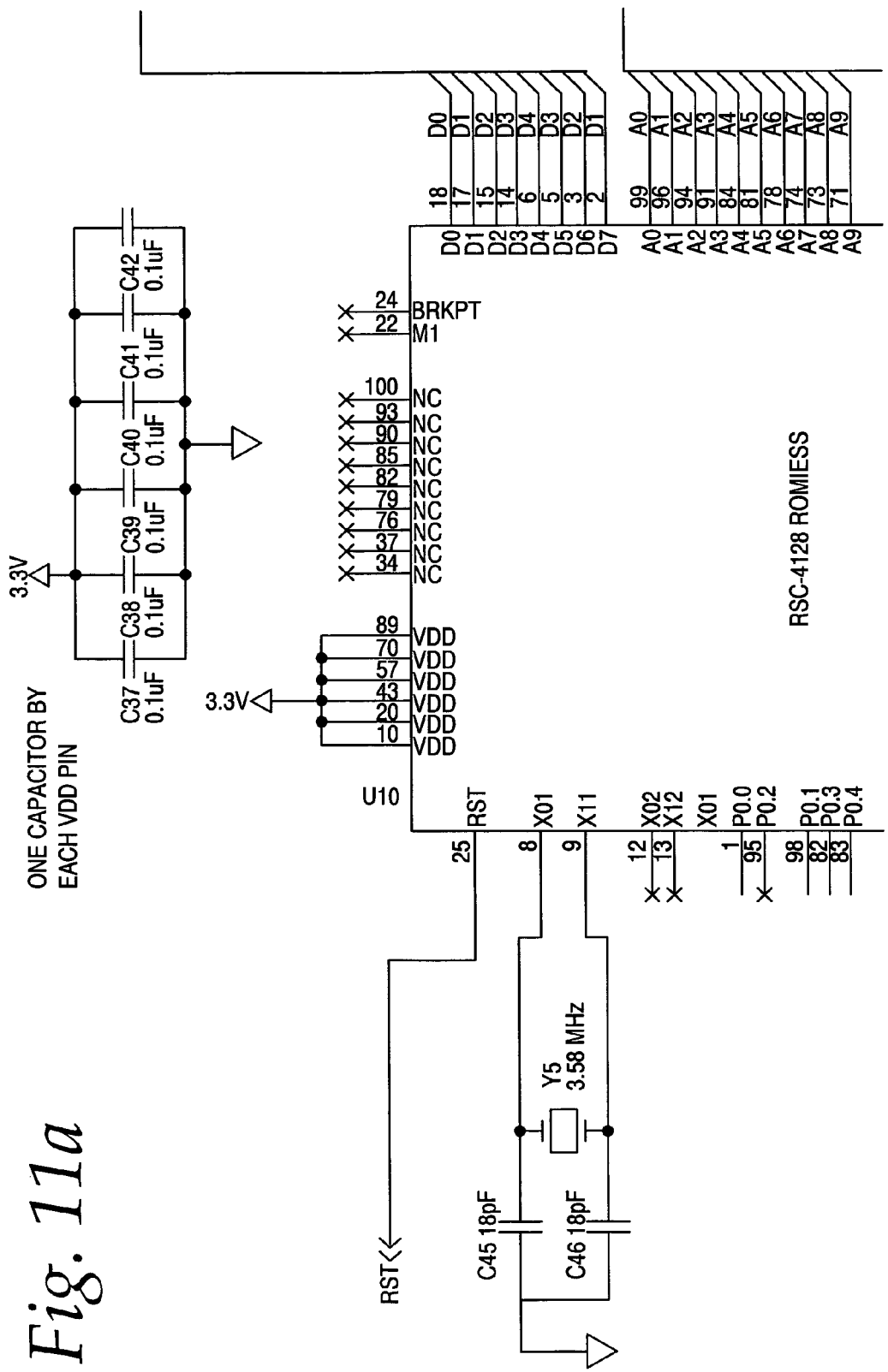
FIGS. 11a-11c together comprise an electrical schematic diagram of the voice input portion of the control unit of FIG. 10.
Figure 11C:
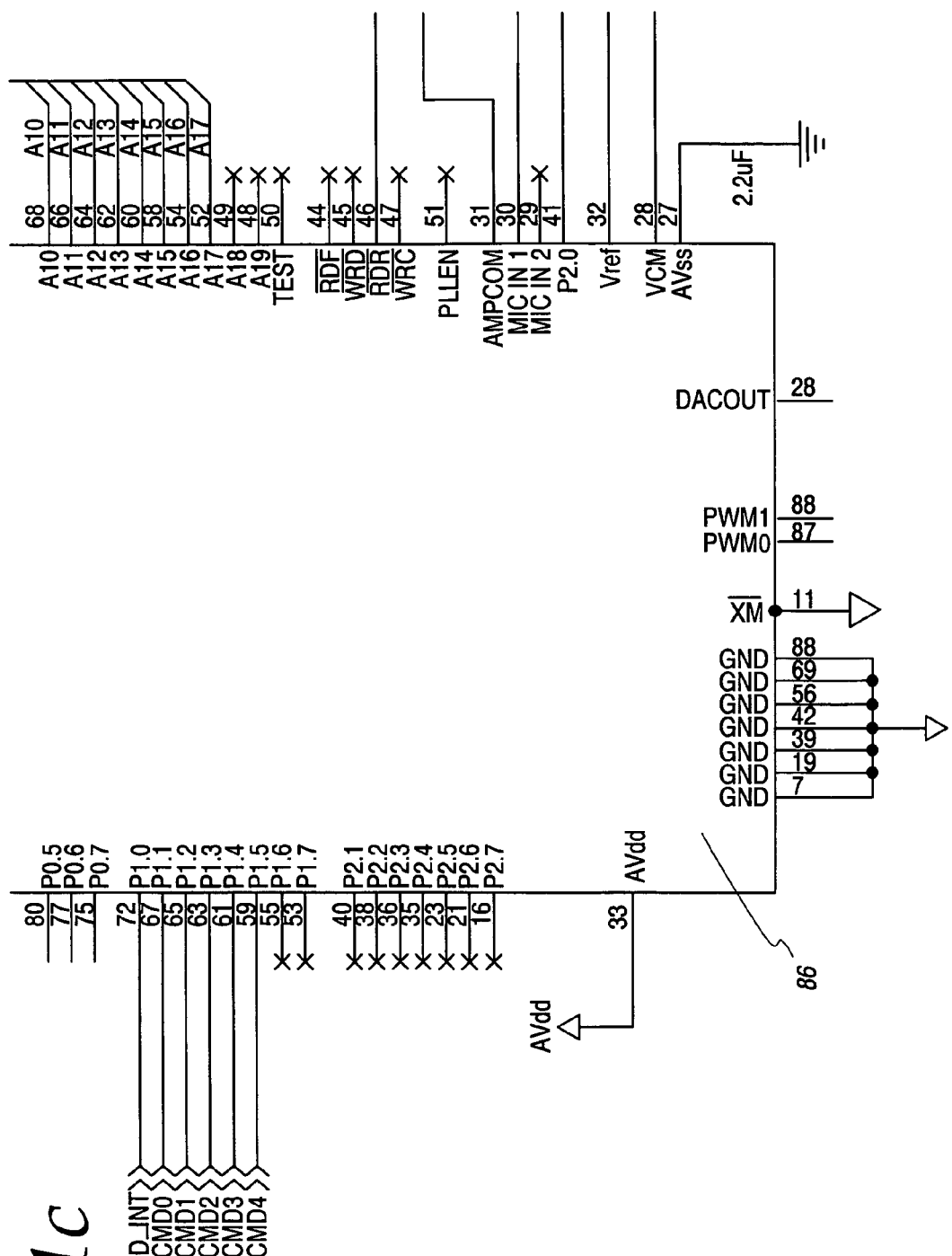
Figure 11D:
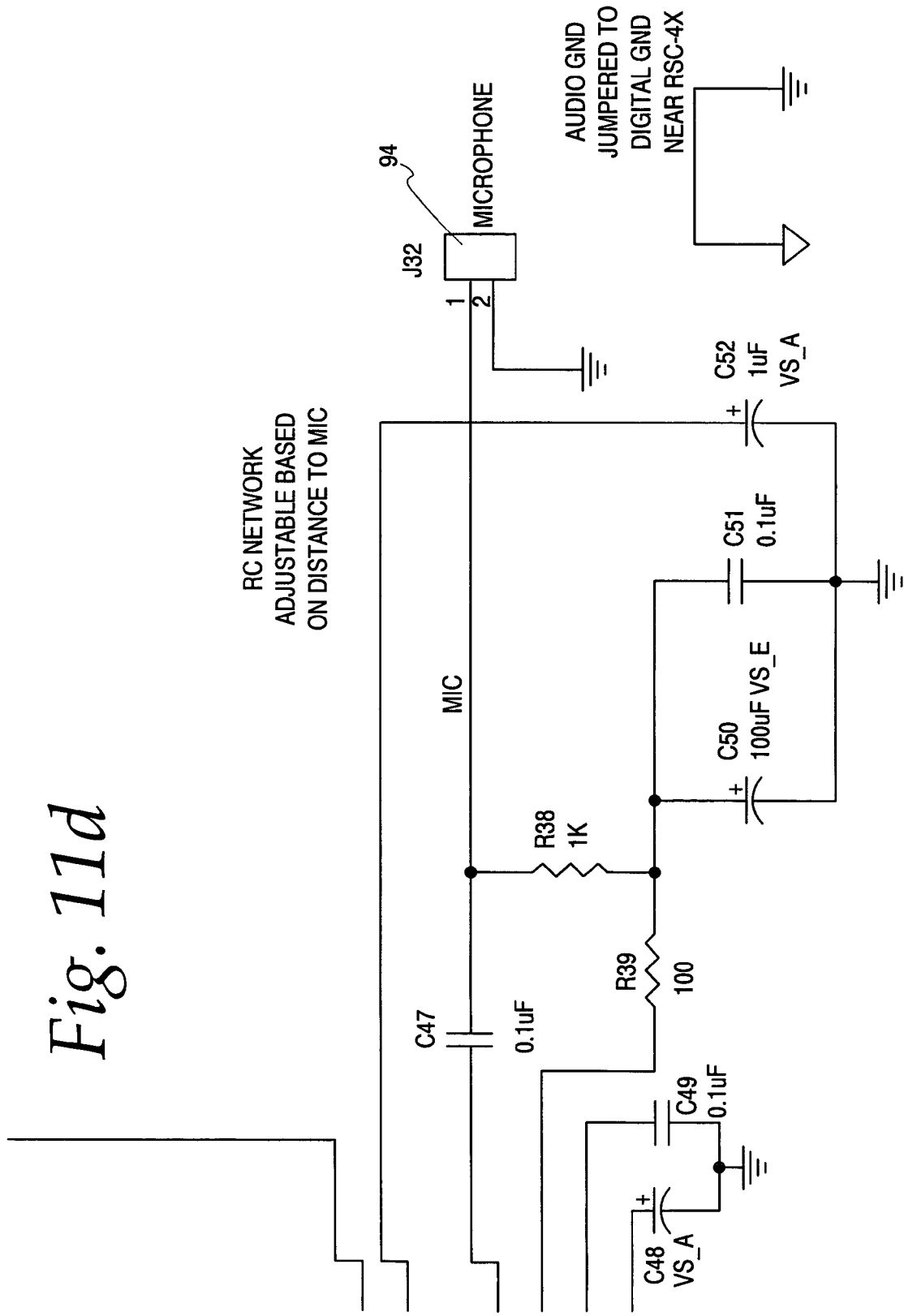
Figure 12A:
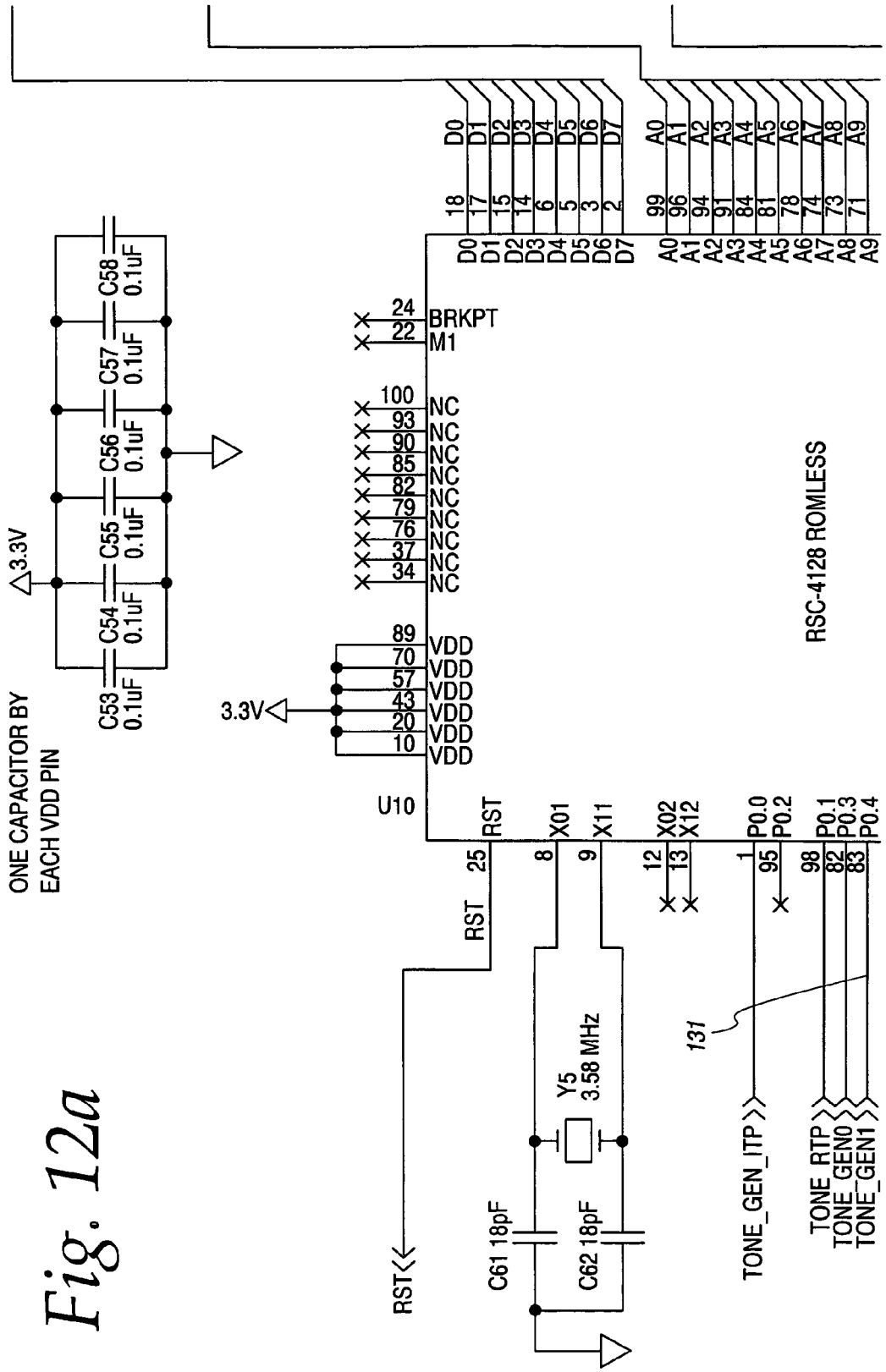
FIGS. 12a-12d together comprise an electrical schematic diagram of the voice output portion of the control unit of FIG. 10.
Figure 12B:
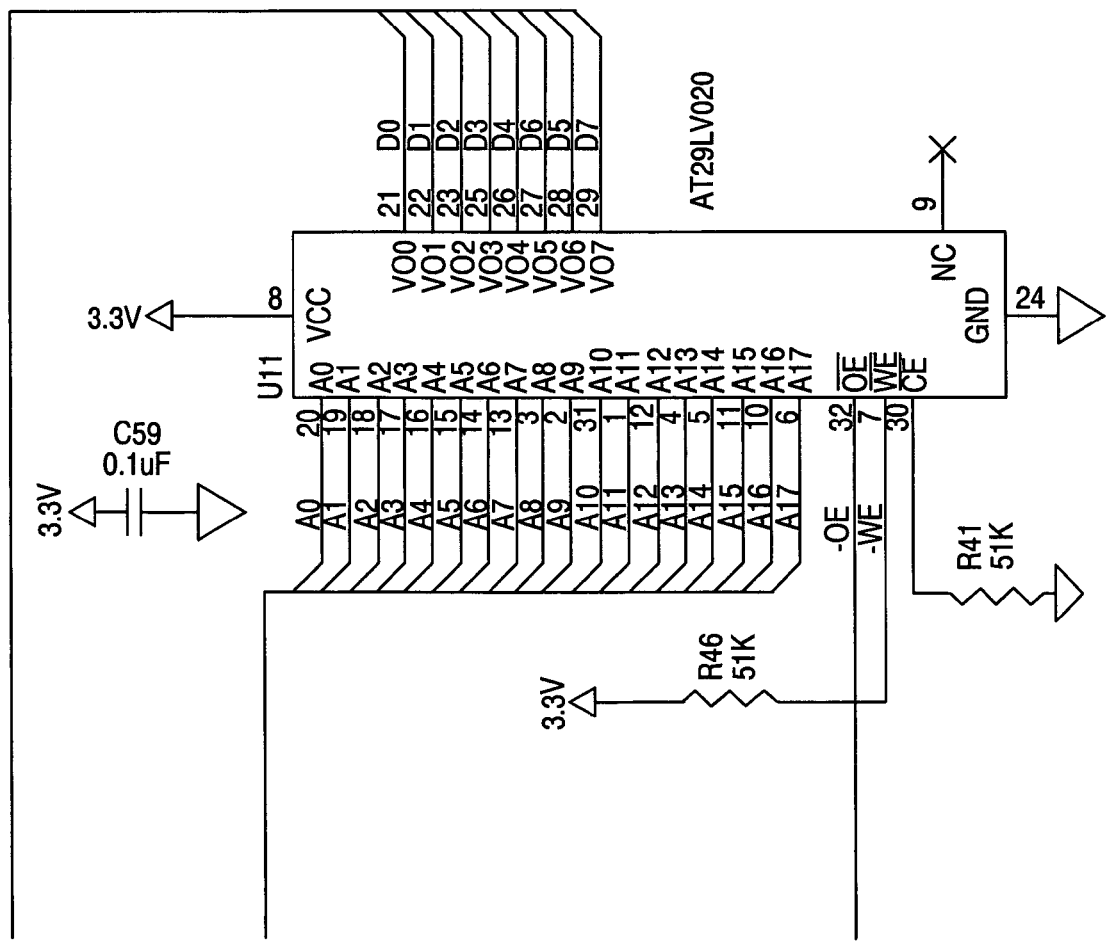
Figure 12C:
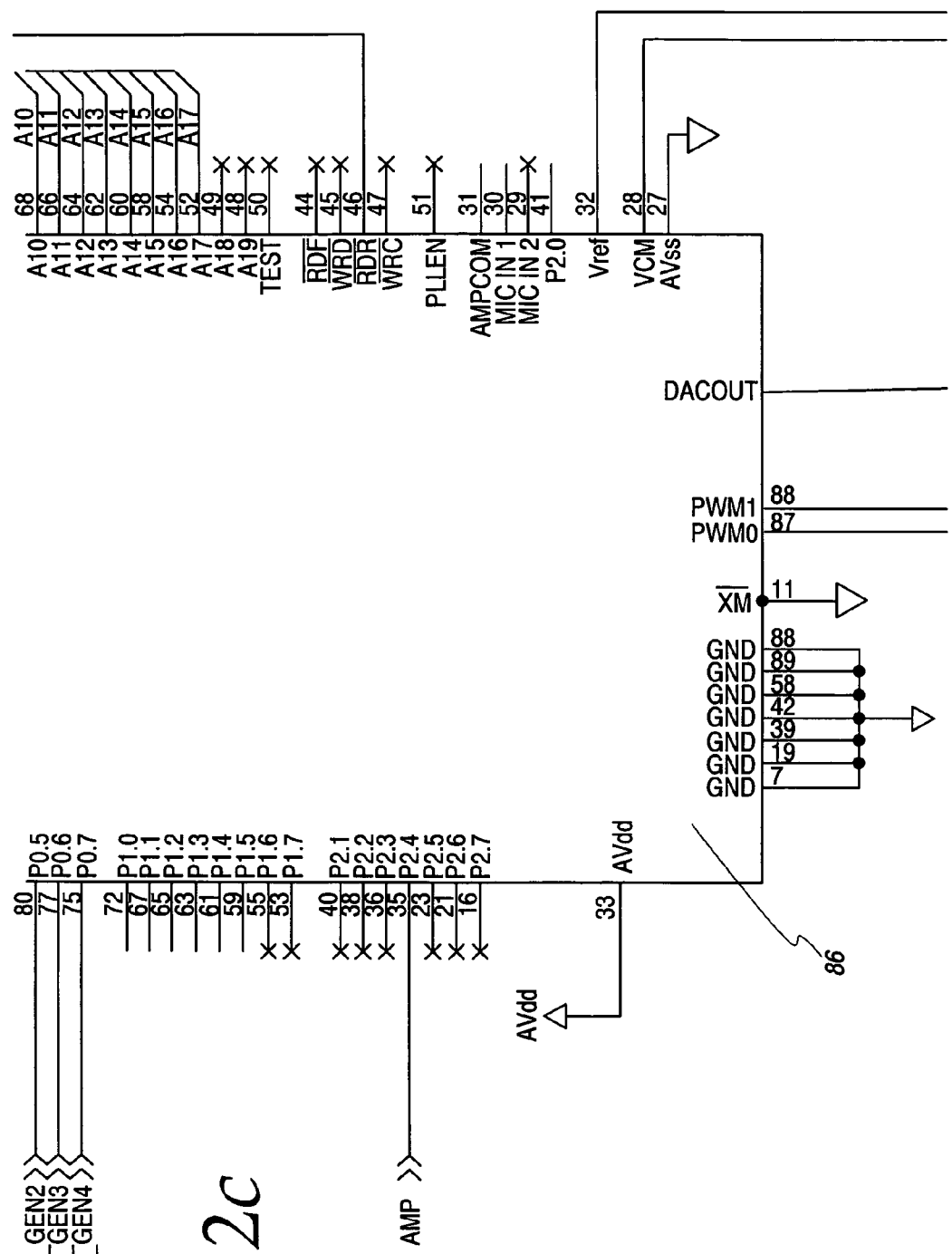
Figure 12D:
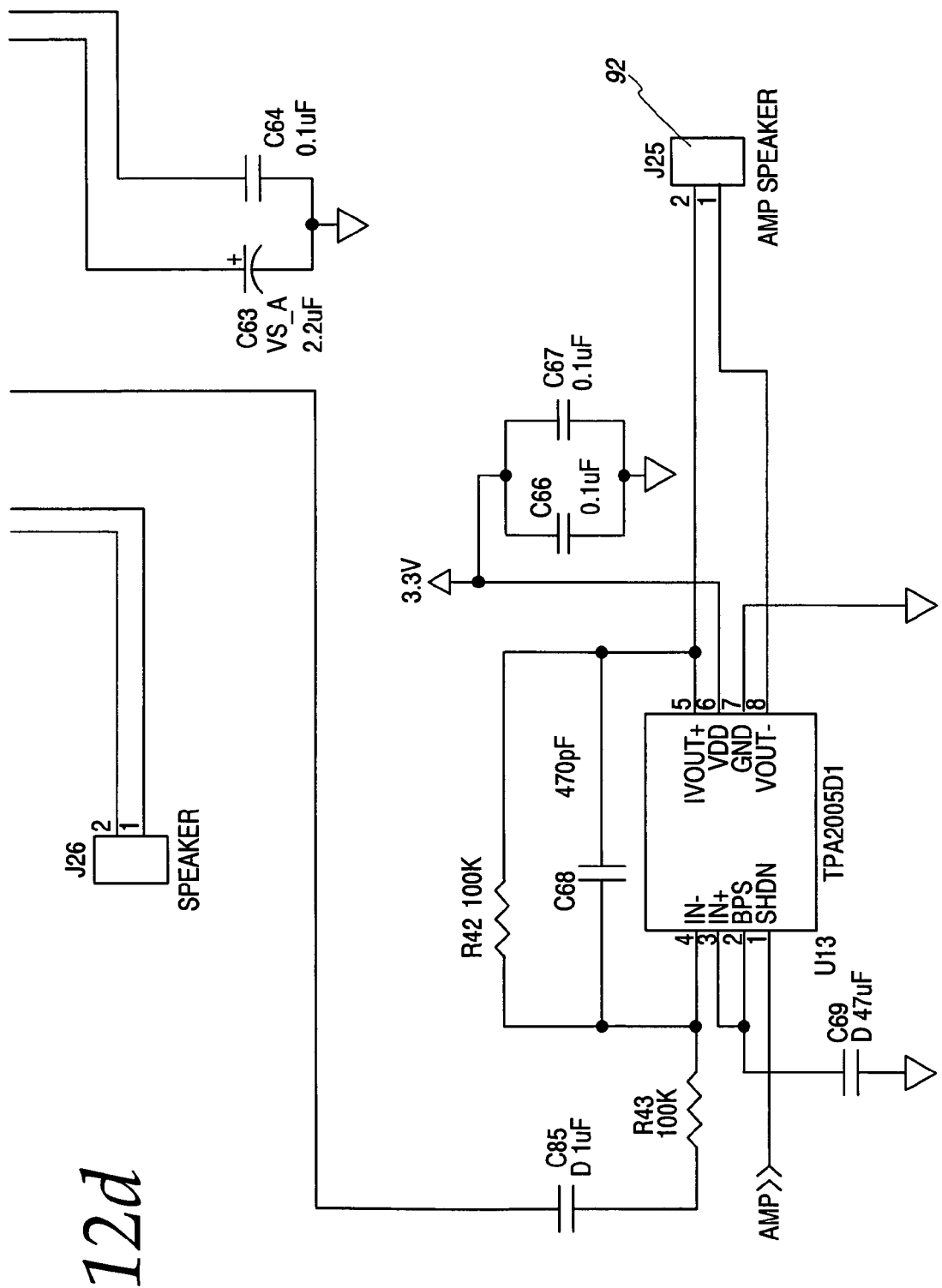

Referring now to the electrical schematic diagram of FIGS. 10a-10c, connector 114 is coupled to Bluetooth host module U2, which is identical to module 76 of FIGS. 8a, 8b. Bluetooth module U2 is coupled through UART Universal Asynchronous Receiver/Transmitter coupling 118. This coupling is in turn terminated at terminals 120 of the PIC main controller 78 also shown in FIG. 10c. Output lines 122 from controller 78 energize light emitting diodes 80, 82. Voice commands from optional voice recognition unit 86 in FIG. 11c are received at input lines 126 of controller 78 as shown in FIG. 10a. Tones generated by controller 78 are outputted on lines 128 as shown in FIG. 10a so as to be received at input lines 131 in FIG. 12a. This tone generator data is processed and sent to speaker 92 in FIG. 12d. In the electrical schematic diagrams of FIGS. 11a-11d and 12a-12d, the same voice recognition unit 86 preferably comprises a voice processor chip, catalog number RSC-4128 Romless available from Sensory Inc. of Santa Clara.

The various control modules and voice recognition units must be programmed to function as described herein. Flowchart diagrams are given for the devices of various portions of the communication system in FIGS. 16; 17a, b; 18; 19a, b; 20a-c; 21; 22aa, ab, ba, bb; 23-24; 25a-c; 26; 27aa-ad, ba, bb, and ca-cd; 28a, b; 29; 30; and 31a-c.

Figure 16:
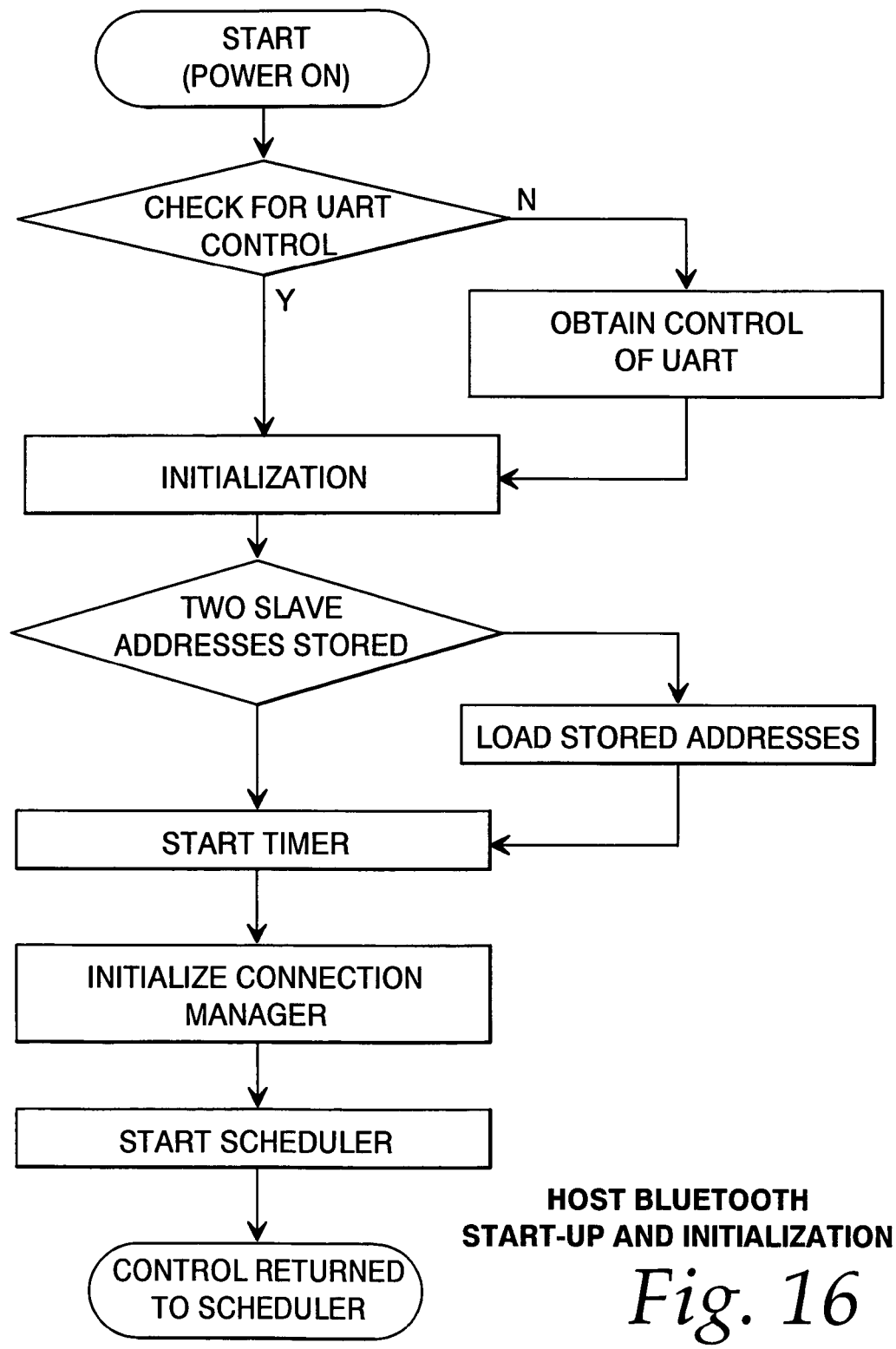
FIG. 16 is a schematic flow diagram of a host Bluetooth start-up and initialization routine.

FIG. 16 is a schematic flow diagram of a host Bluetooth start-up and initialization routine. The code for this routine is stored in U2, reference number 92, see FIG. 12d.

Figure 17A:
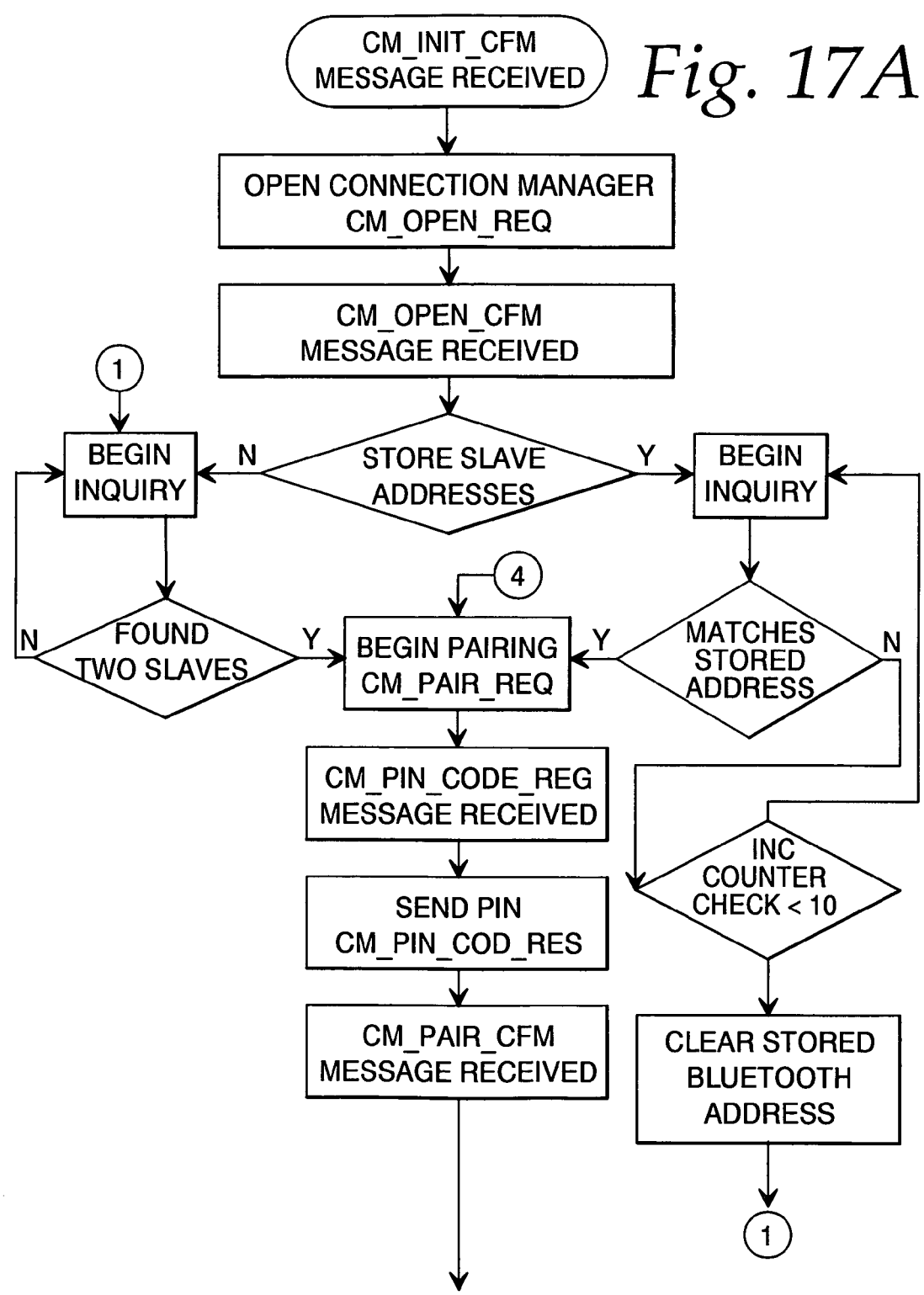
FIGS. 17A-17B together comprise a schematic flow diagram of a host Bluetooth wireless communications link routine.
Figure 17B:
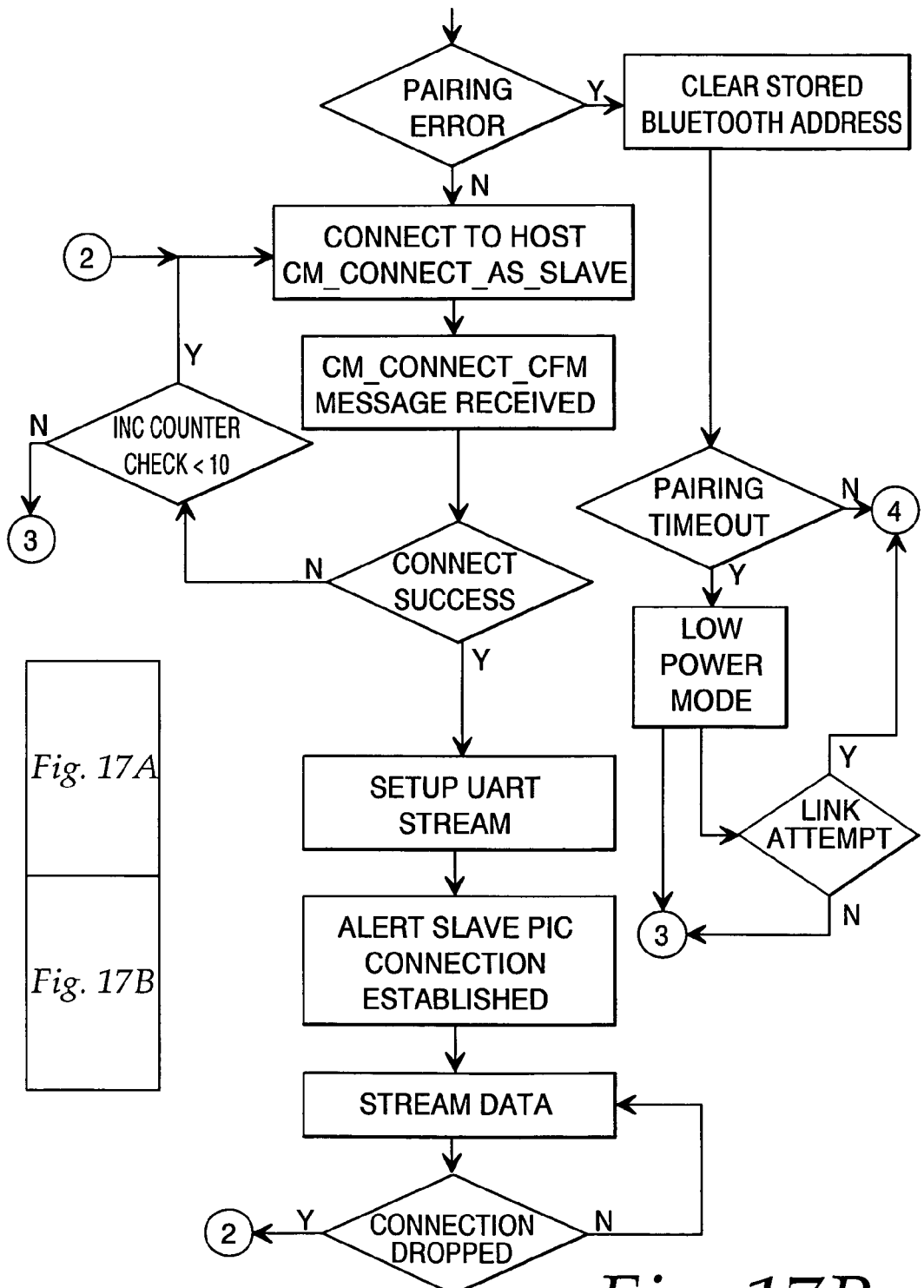

FIGS. 17a, b together comprise a schematic flow diagram of a host Bluetooth wireless communications link routine. The code for this routine is stored in U2, reference number 92, see FIG. 12d.

FIG. 18 is a schematic flow diagram of a remote Bluetooth start-up and initialization routine. The code for this routine is stored in U7, reference number 47, see FIG. 9b.

Figure 19A:
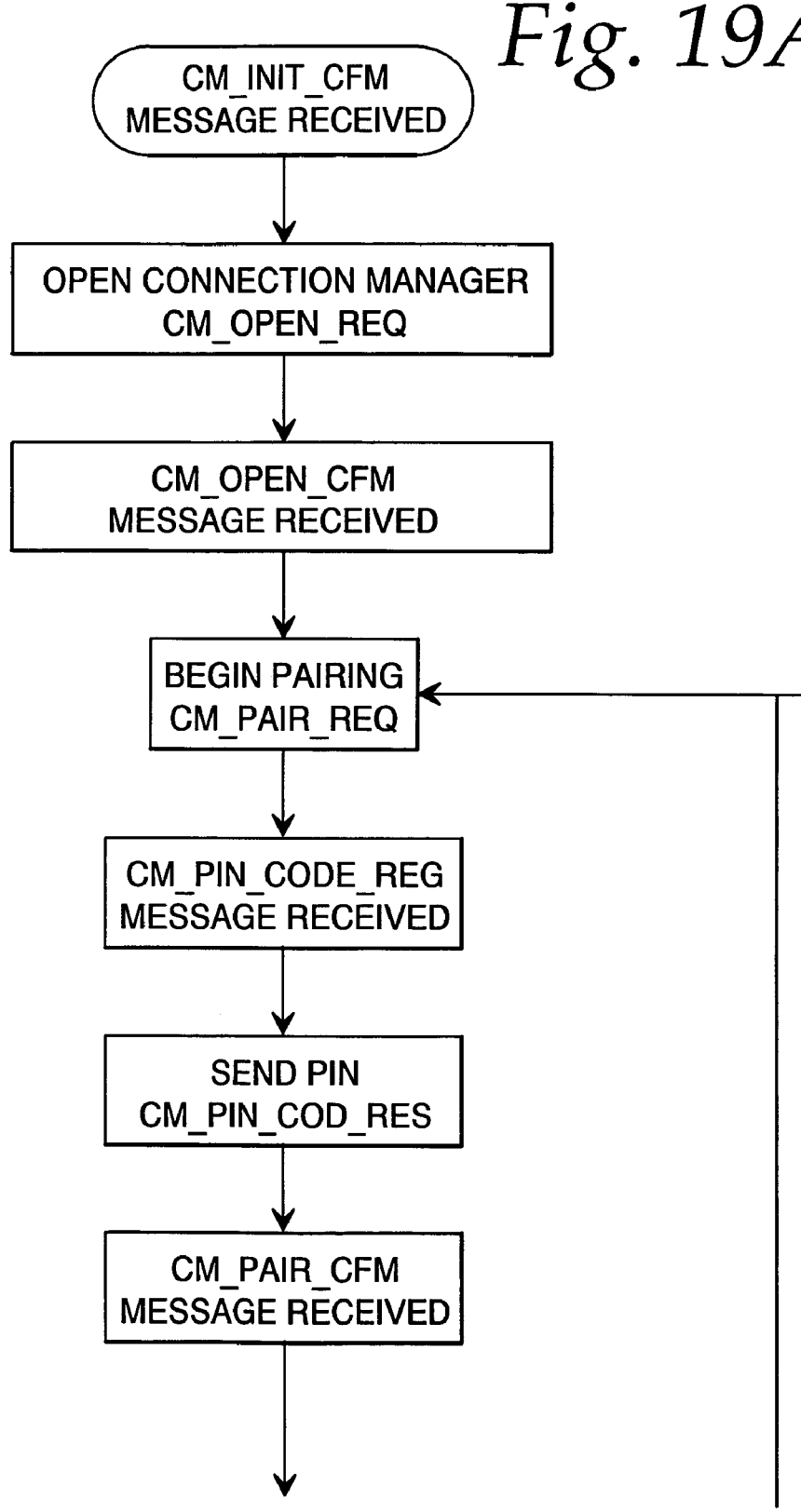
FIGS. 19A-19B together comprise a schematic flow diagram of a remote Bluetooth wireless communication line routine.
Figure 19B:
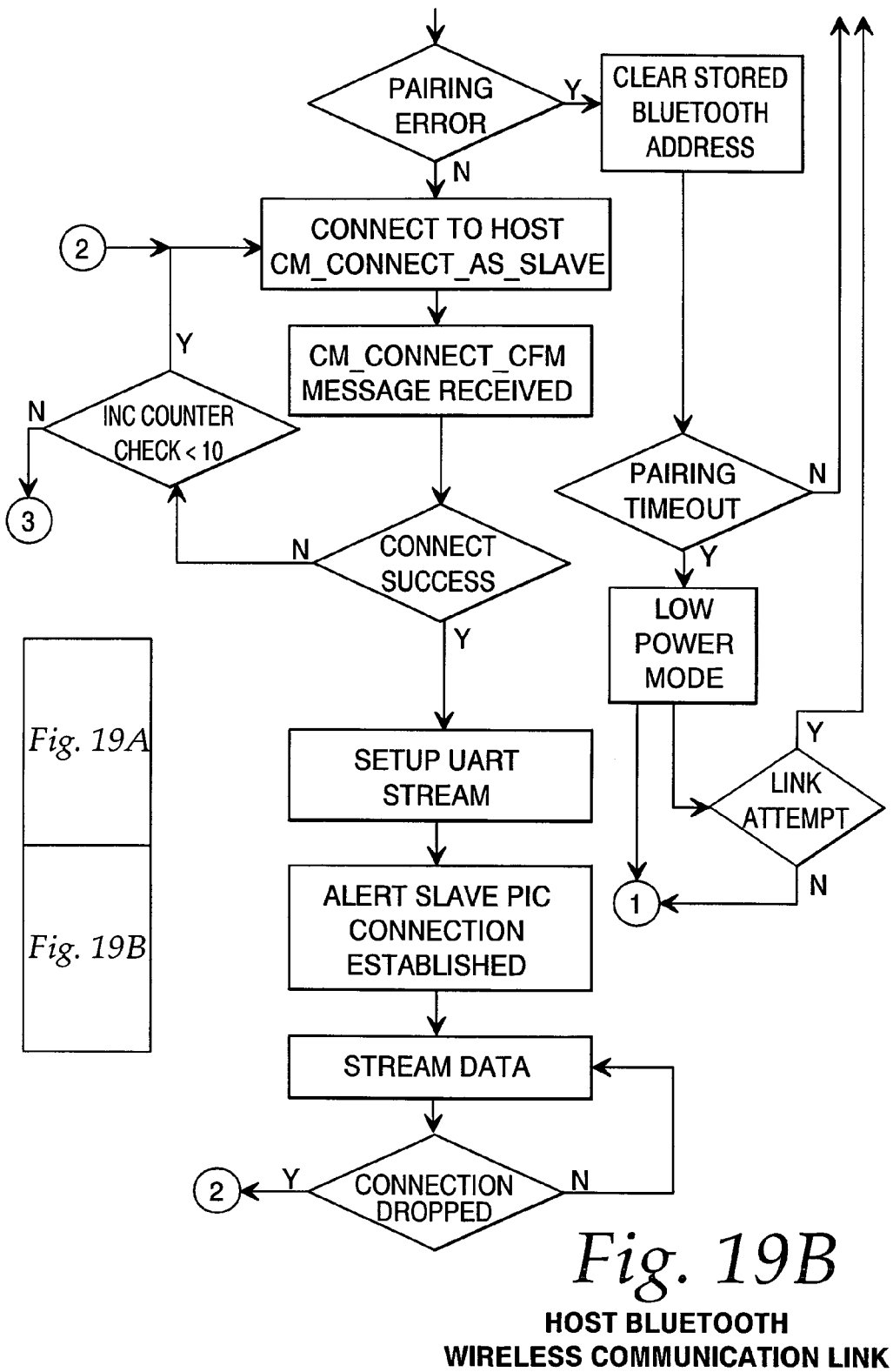

FIGS. 19a, b together comprise a schematic flow diagram of a remote Bluetooth wireless communication link routine. The code for this routine is stored in U7, reference number 47, see FIG. 9b.

Figure 20A:
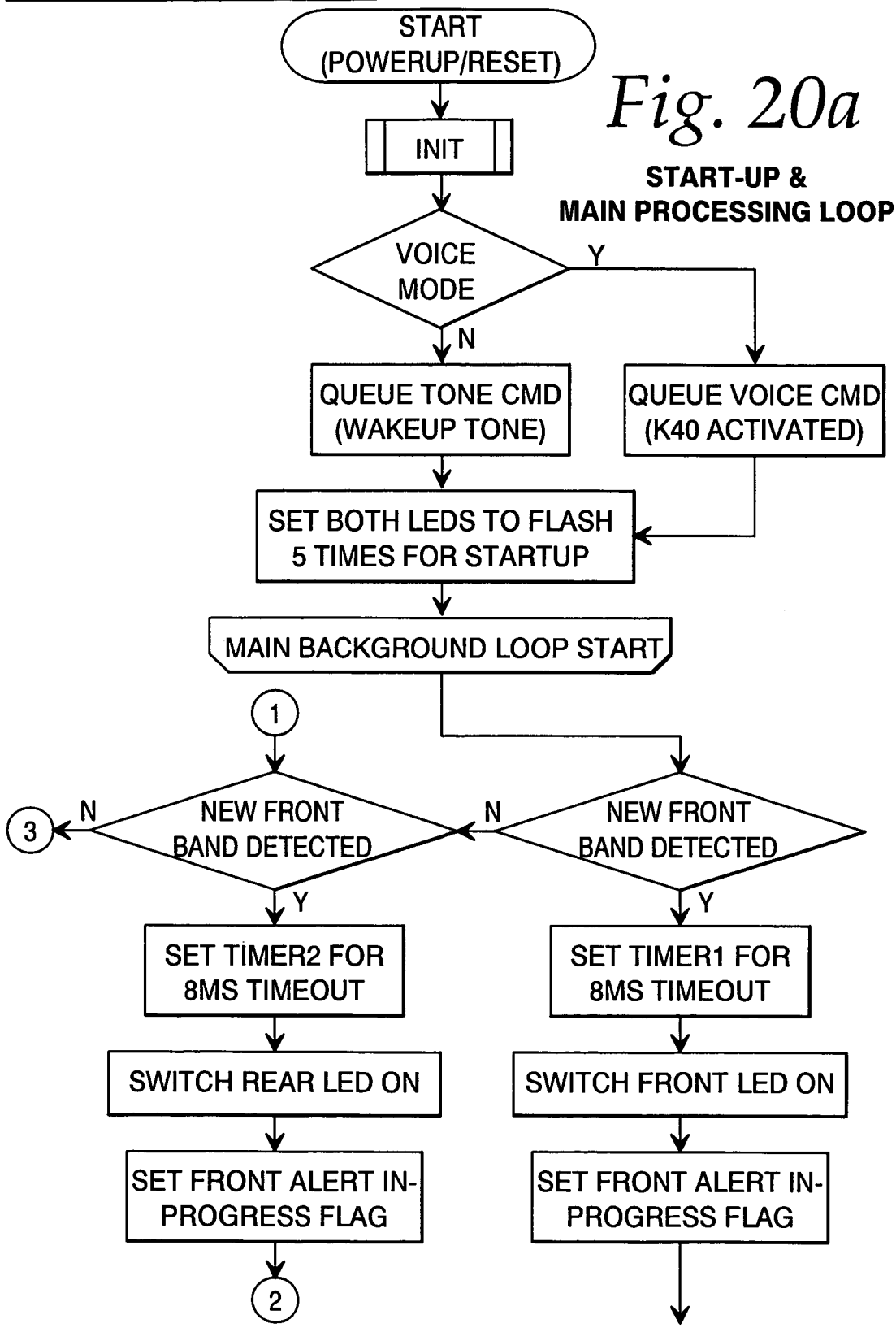
FIG. 20a-20c together comprise a schematic flow diagram of a start-up main processing loop routine.
Figure 20B:
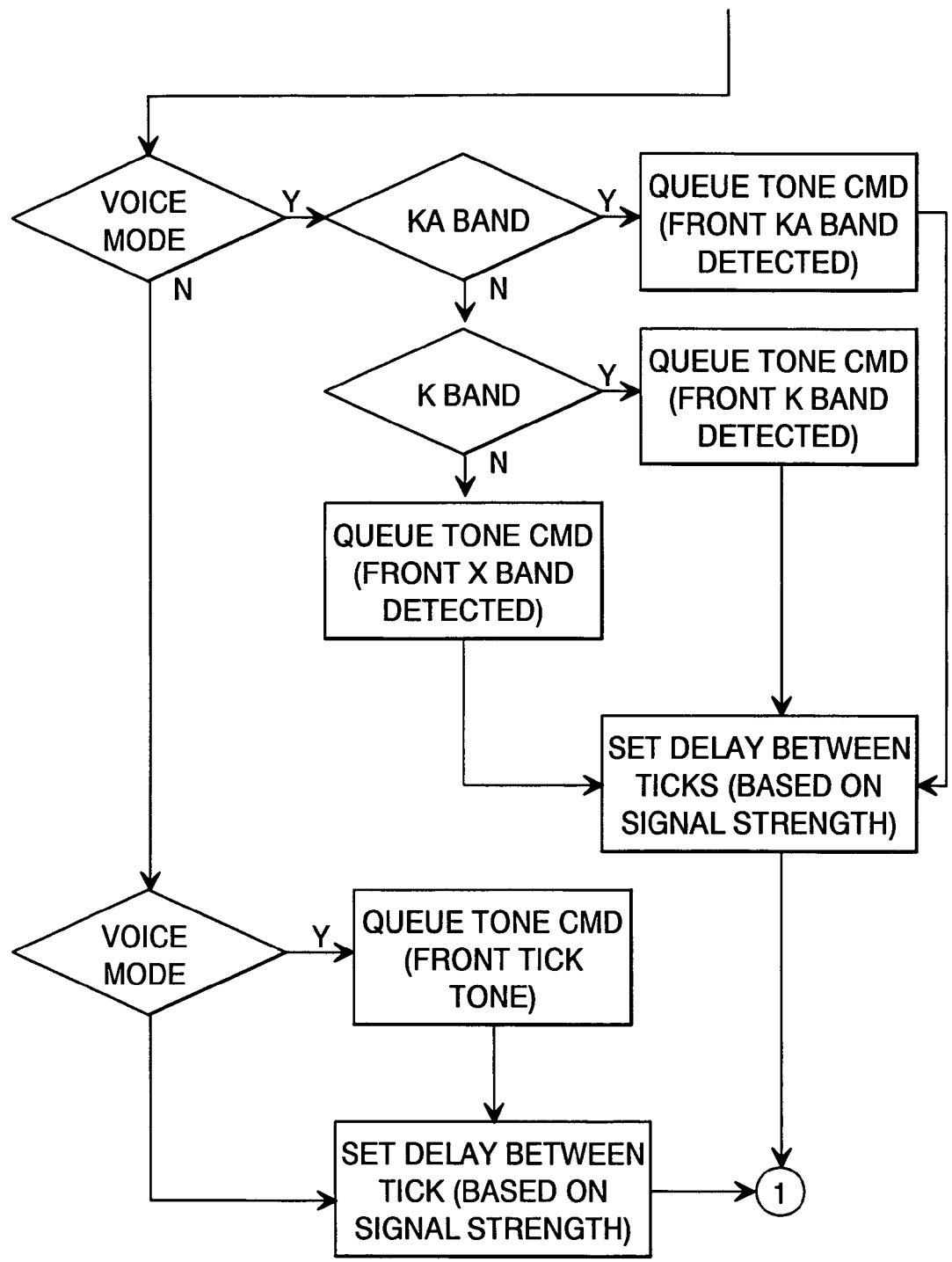
Figure 20C:
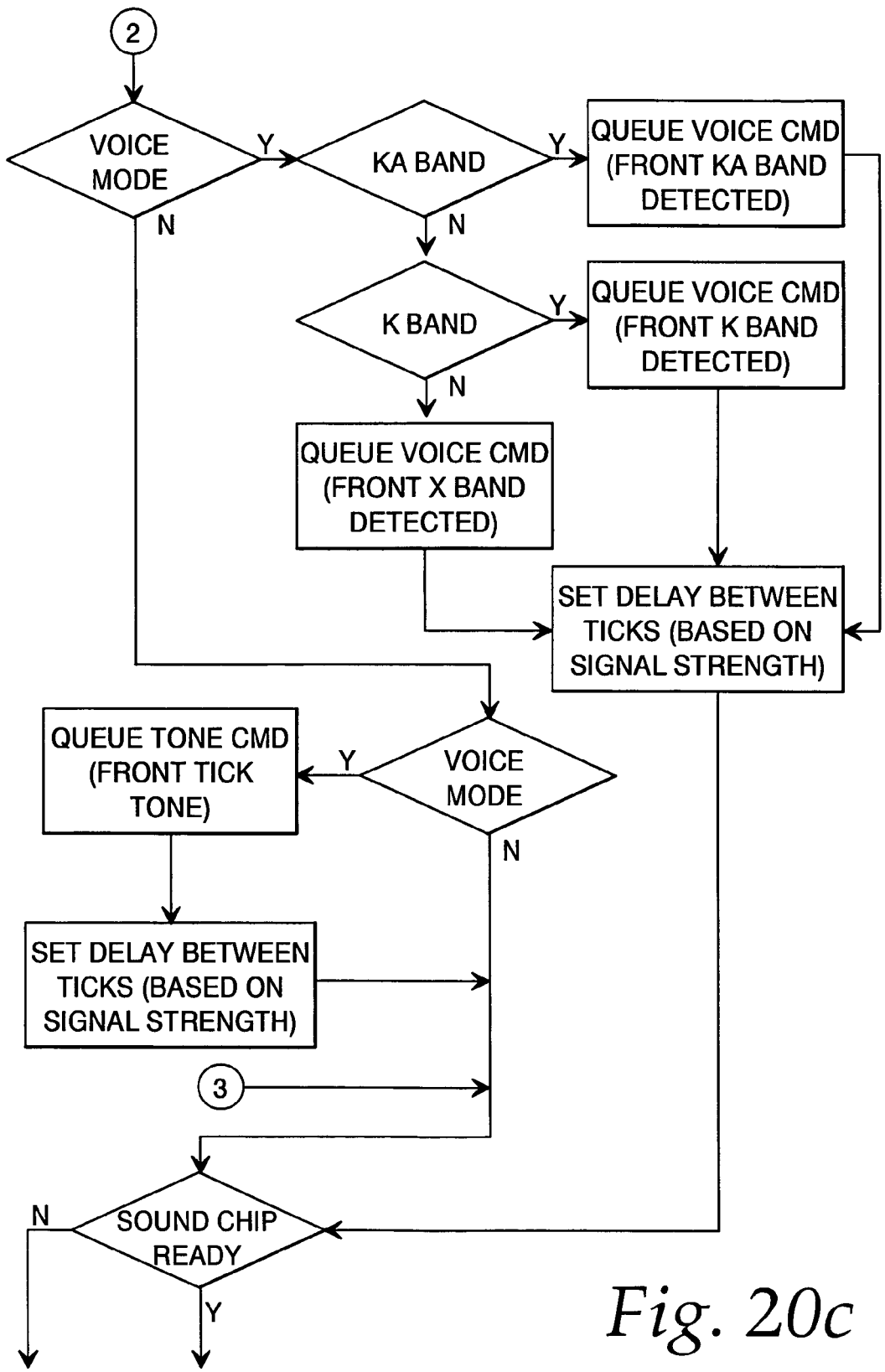
Figure 20D:
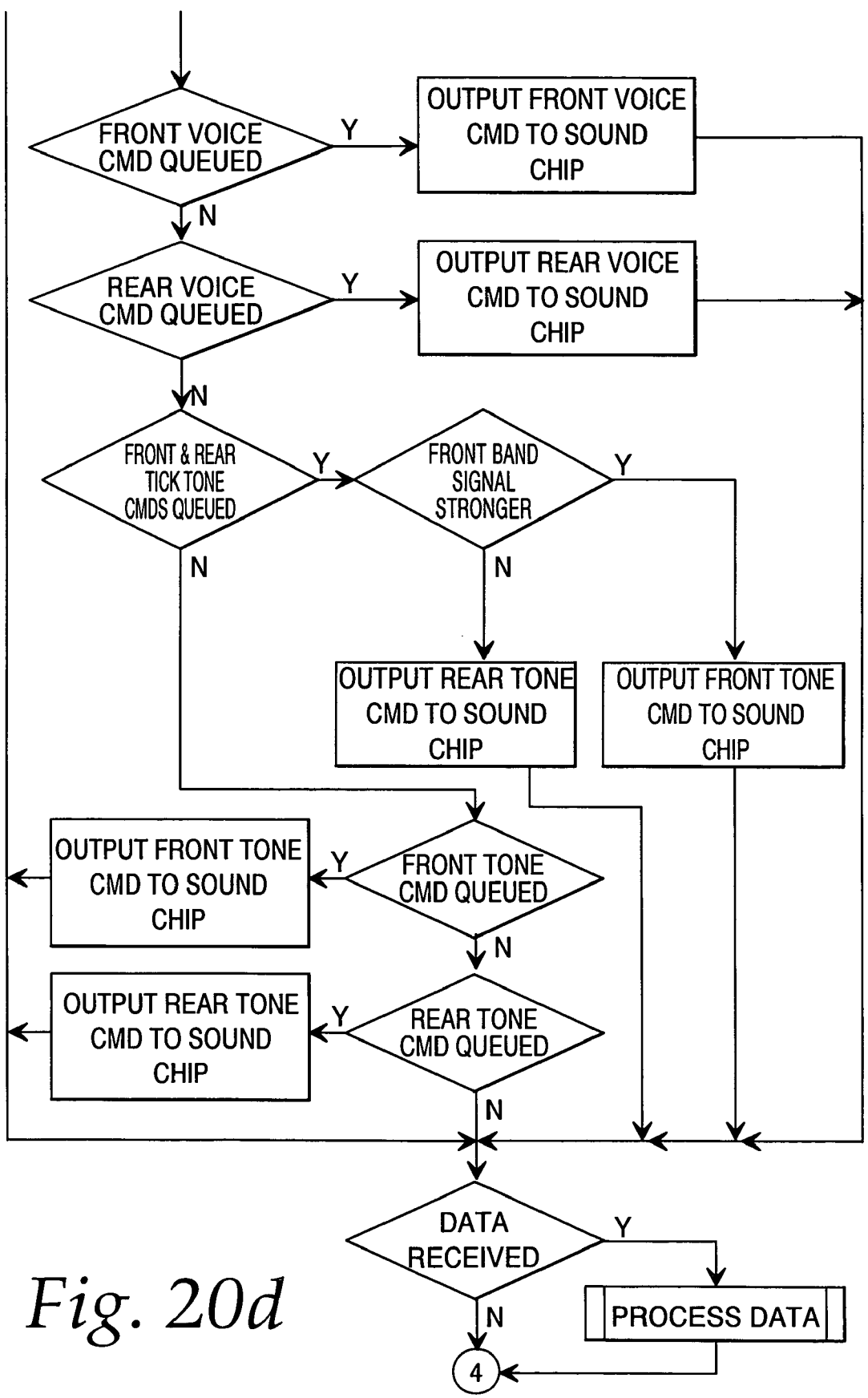
Figures 20A, 20B, 20C, 20D, 20E:
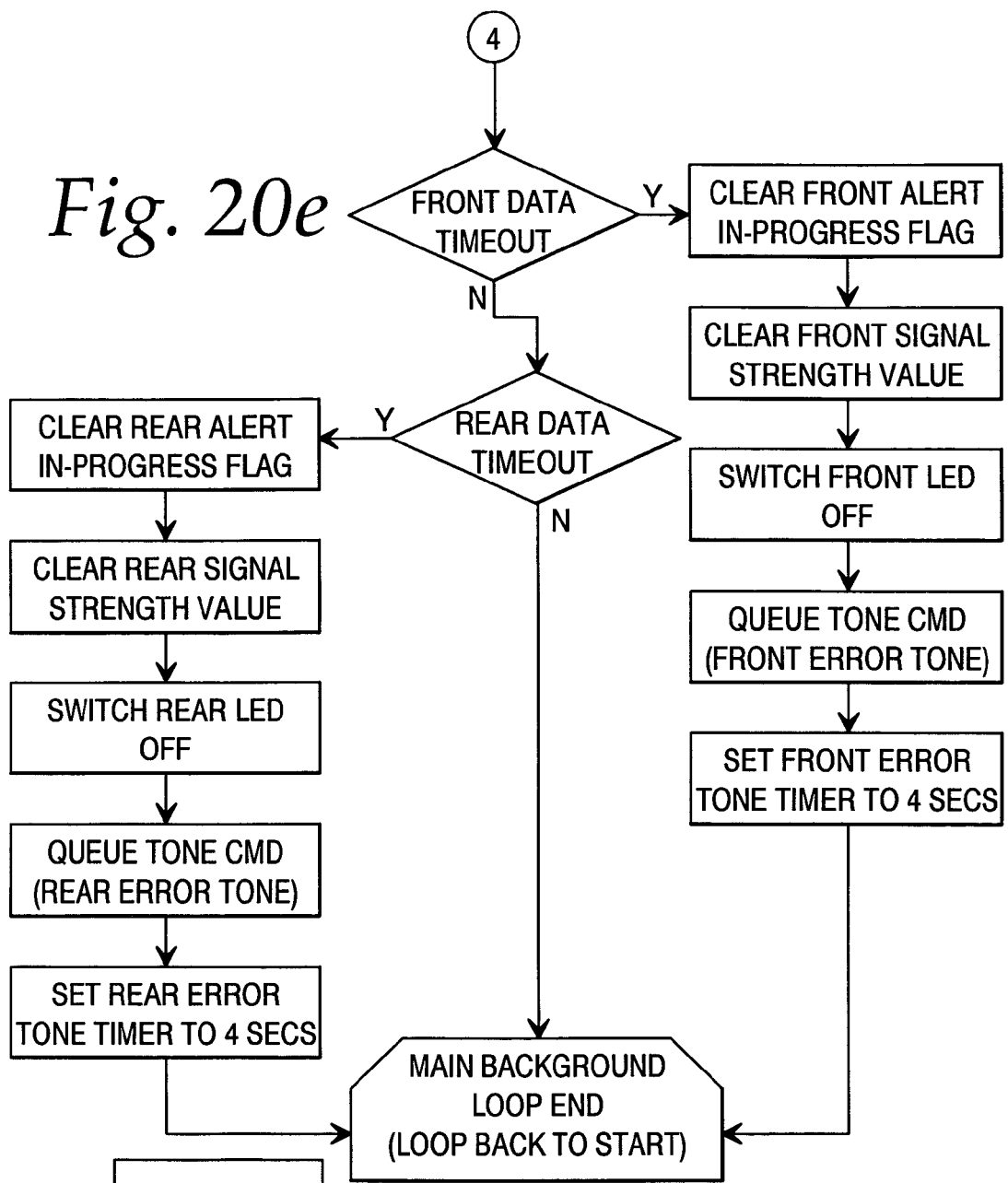

FIG. 20a-20c together comprise a schematic flow diagram of start-up main processing loop routine. The code for this routine is stored in U3, reference number 78, see FIG. 10a.

FIG. 21 is a schematic flow diagram of a host PIC initialization routine. The code for this routine is stored in U3, reference number 78, see FIG. 10a.

Figure 22A:
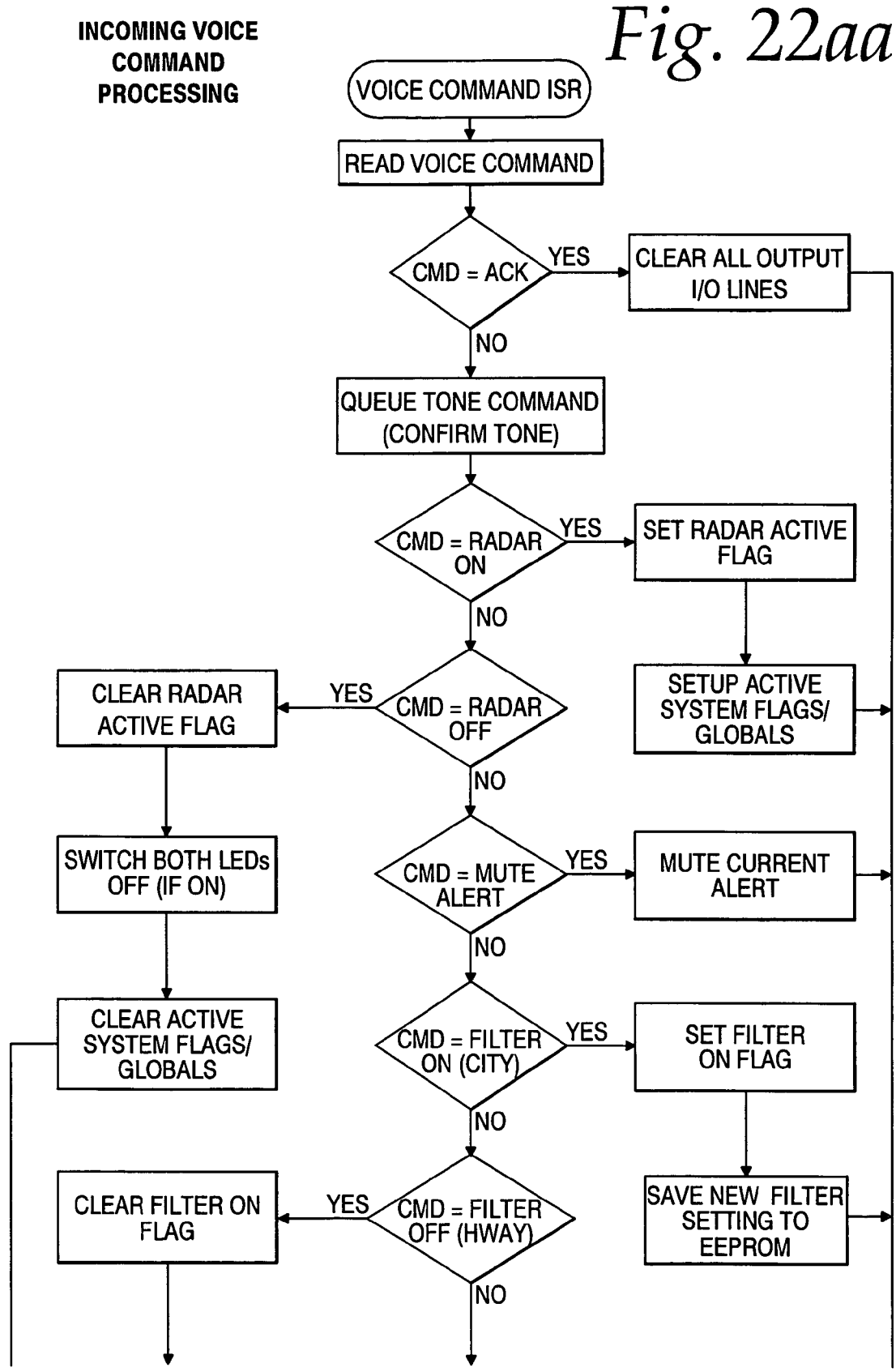
FIGS. 22aa, ab, ba, bb together comprise a schematic flow diagram of an incoming voice command processing routine.
Figure 22A:
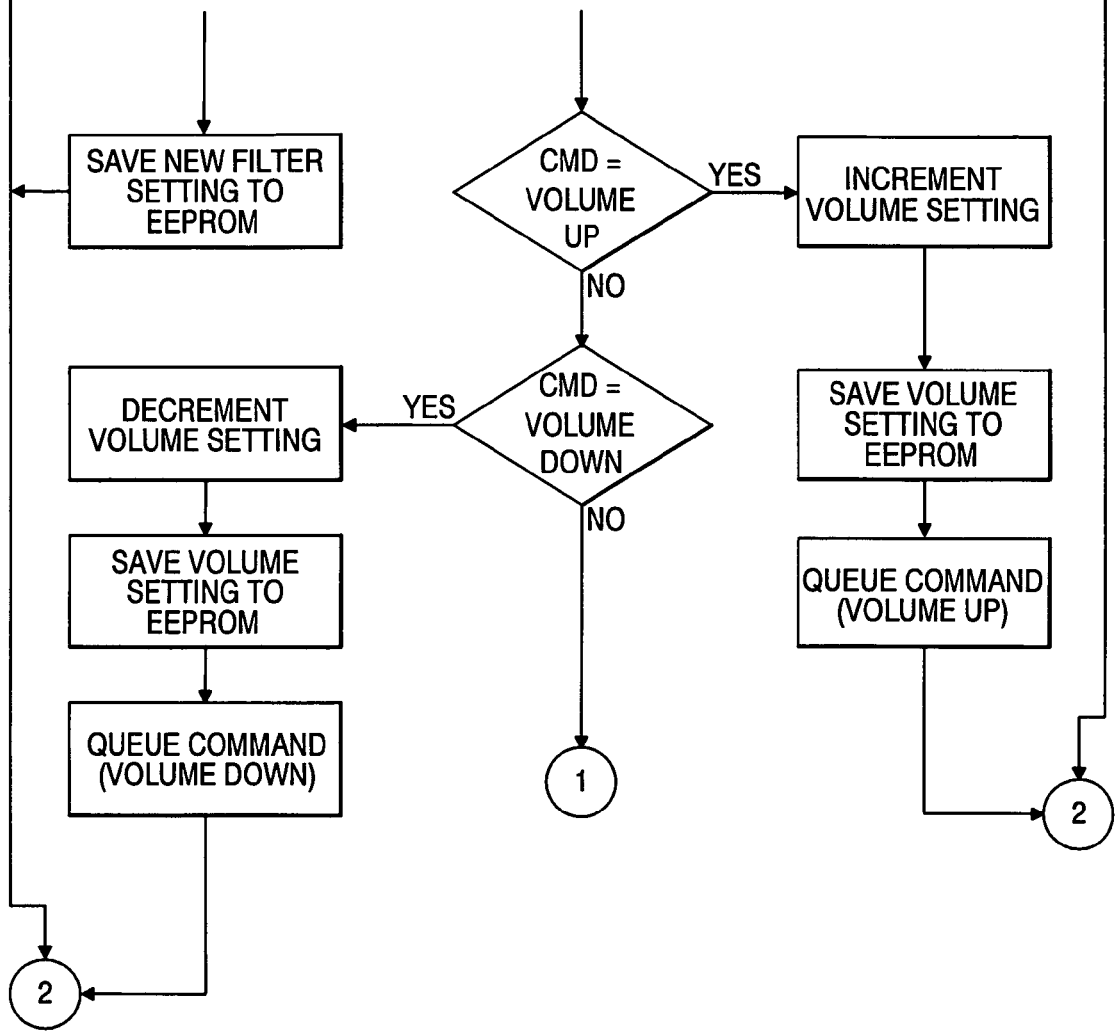
Figure 22B:
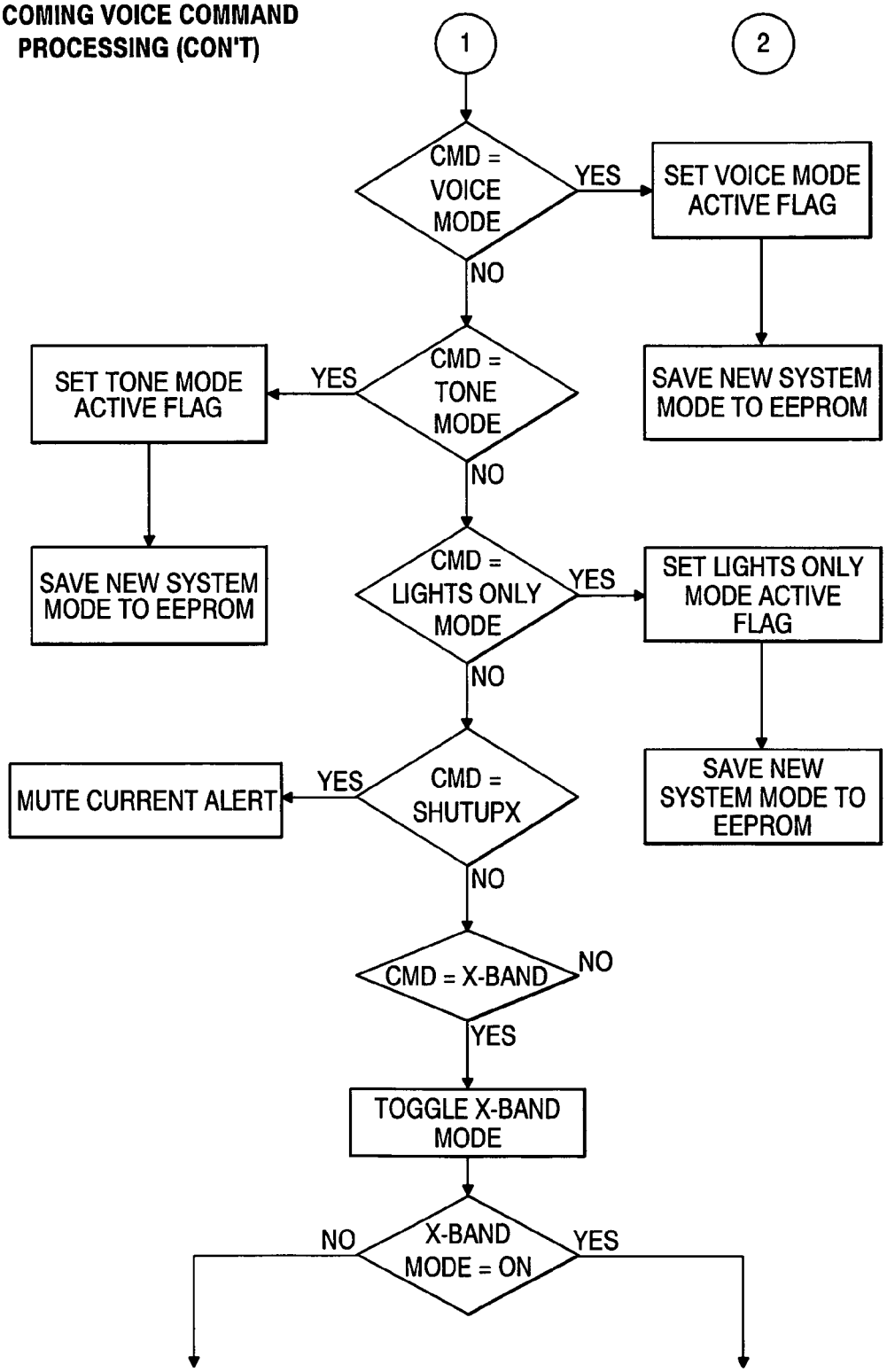

FIG. 22aa, ab, ba and bb together comprise a schematic flow diagram of an incoming voice command processing routine. The code for this routine is stored in U10, reference number 86, see FIG. 11c.

Figure 23:
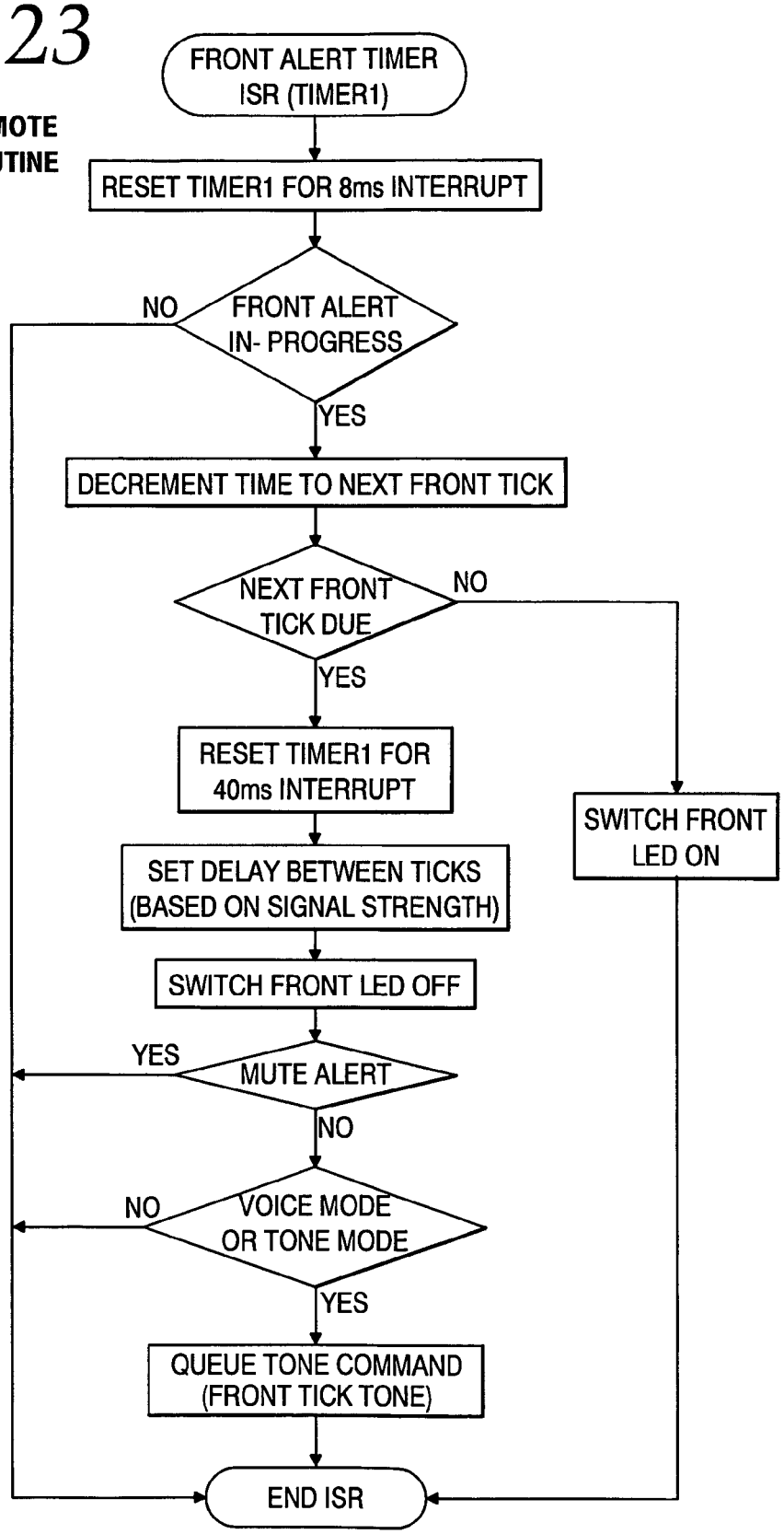
FIG. 23 is a schematic flow diagram a front remote alert routine.

FIG. 23 is a schematic flow diagram of a front remote alert routine. The code for this routine is stored in U3, reference number 78, see FIG. 10a.

Figure 24:
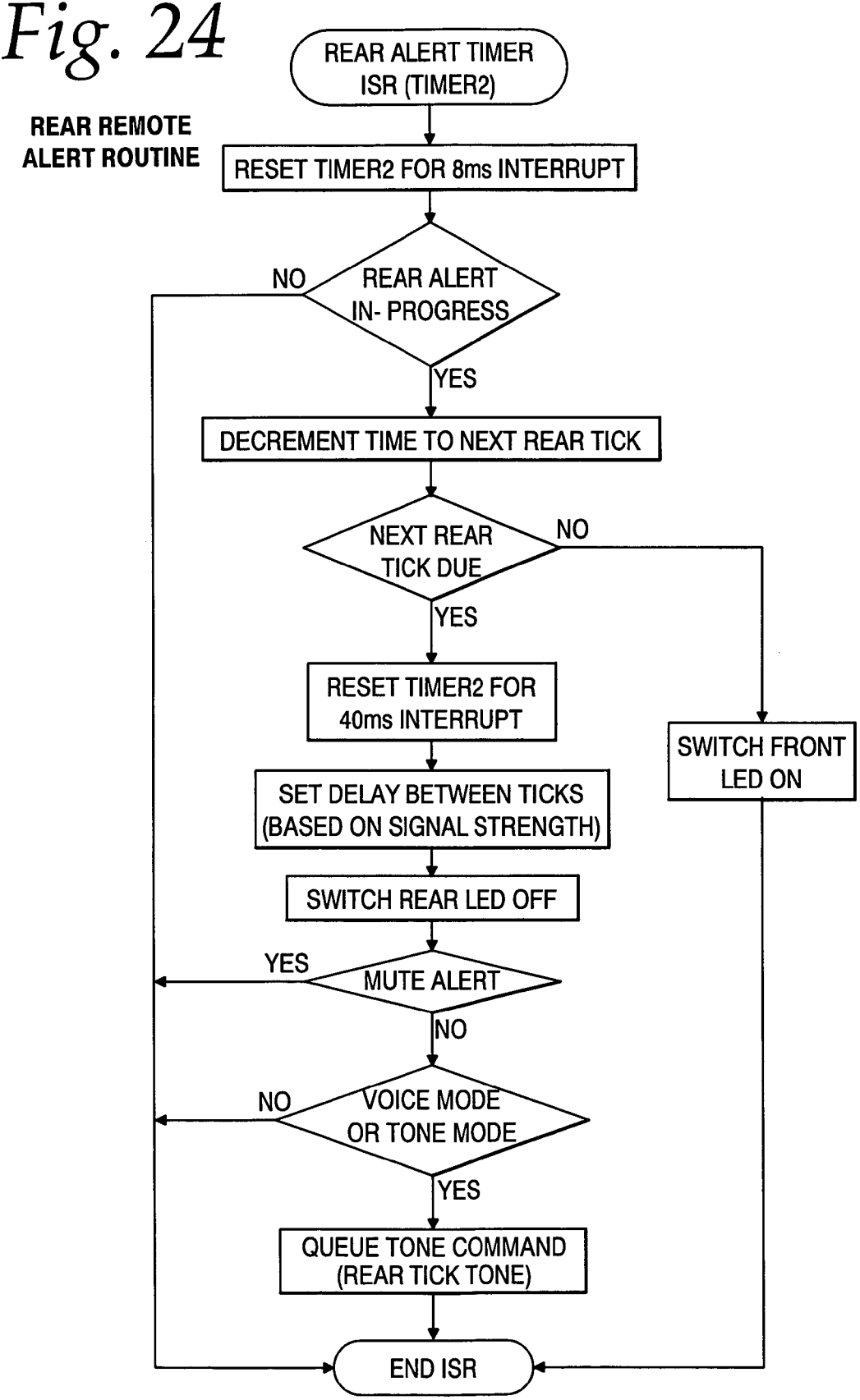
FIG. 24 is a schematic flow diagram of rear remote alert routine.

FIG. 24 is a schematic flow diagram of rear remote alert routine. The code for this routine is stored in U3, reference number 78, see FIG. 10a.

Figure 25A:
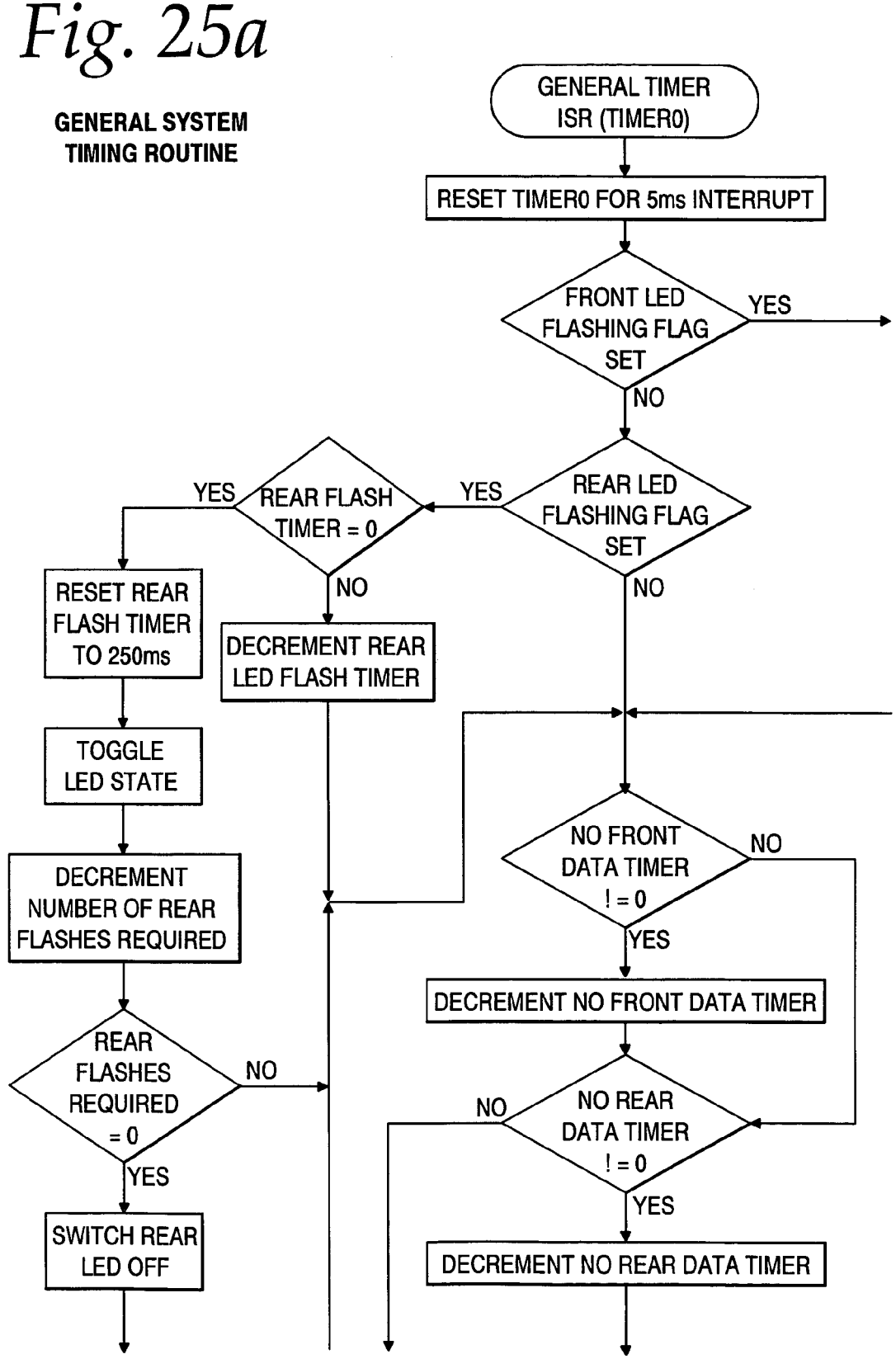
Figure 25B:
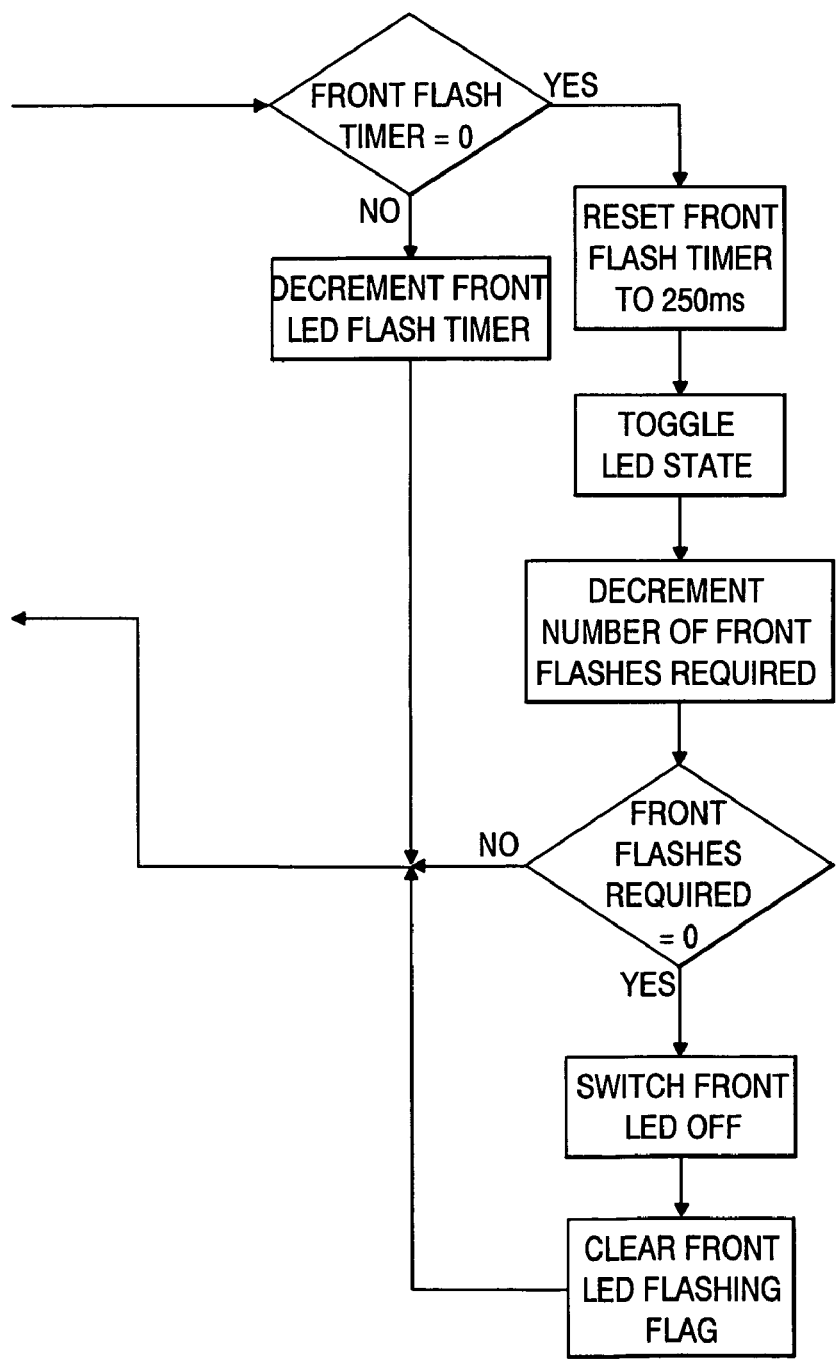

FIGS. 25a-c together comprise a schematic flow diagram of a general system timing routine. The code for this routine is stored in U3, reference number 78, see FIG. 10a.

Figure 26:
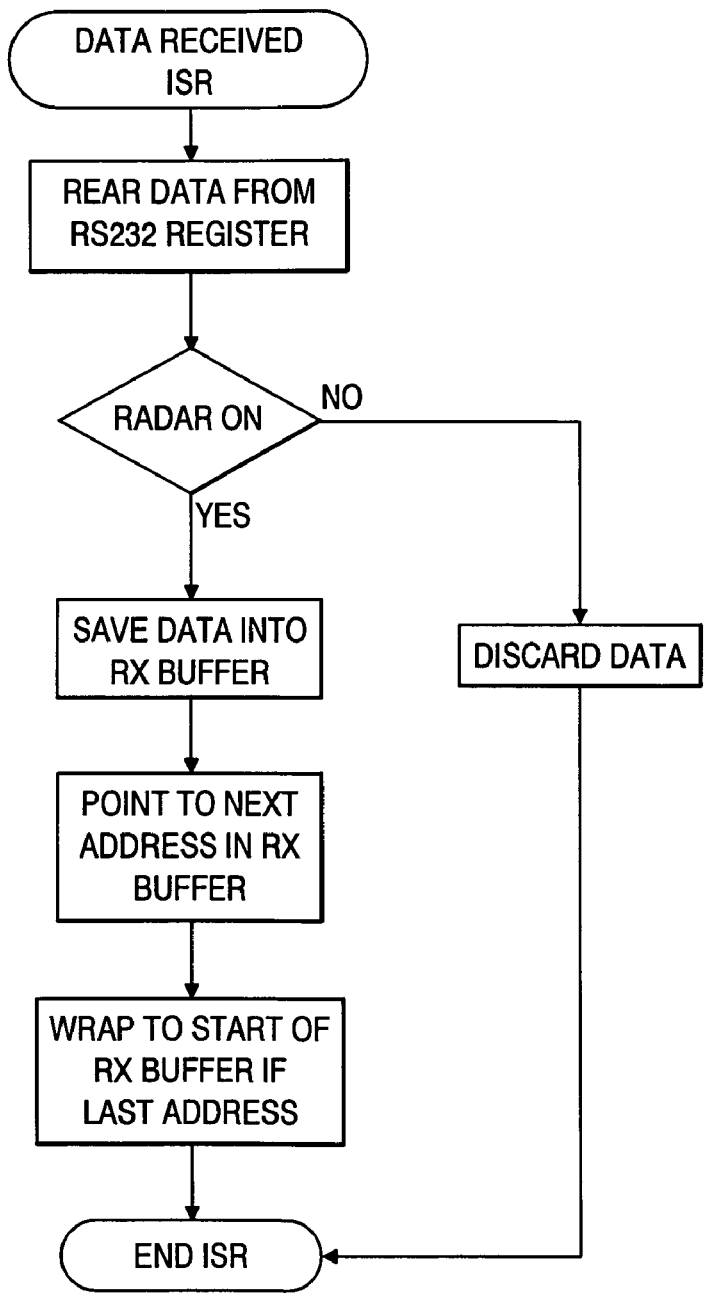
FIG. 26 is a schematic flow diagram of a remote data receiving routine.

FIG. 26 is a schematic flow diagram of a remote data receiving routine. The code for this routine is stored in U3, reference number 78, see FIG. 10a.

Figure 27A:
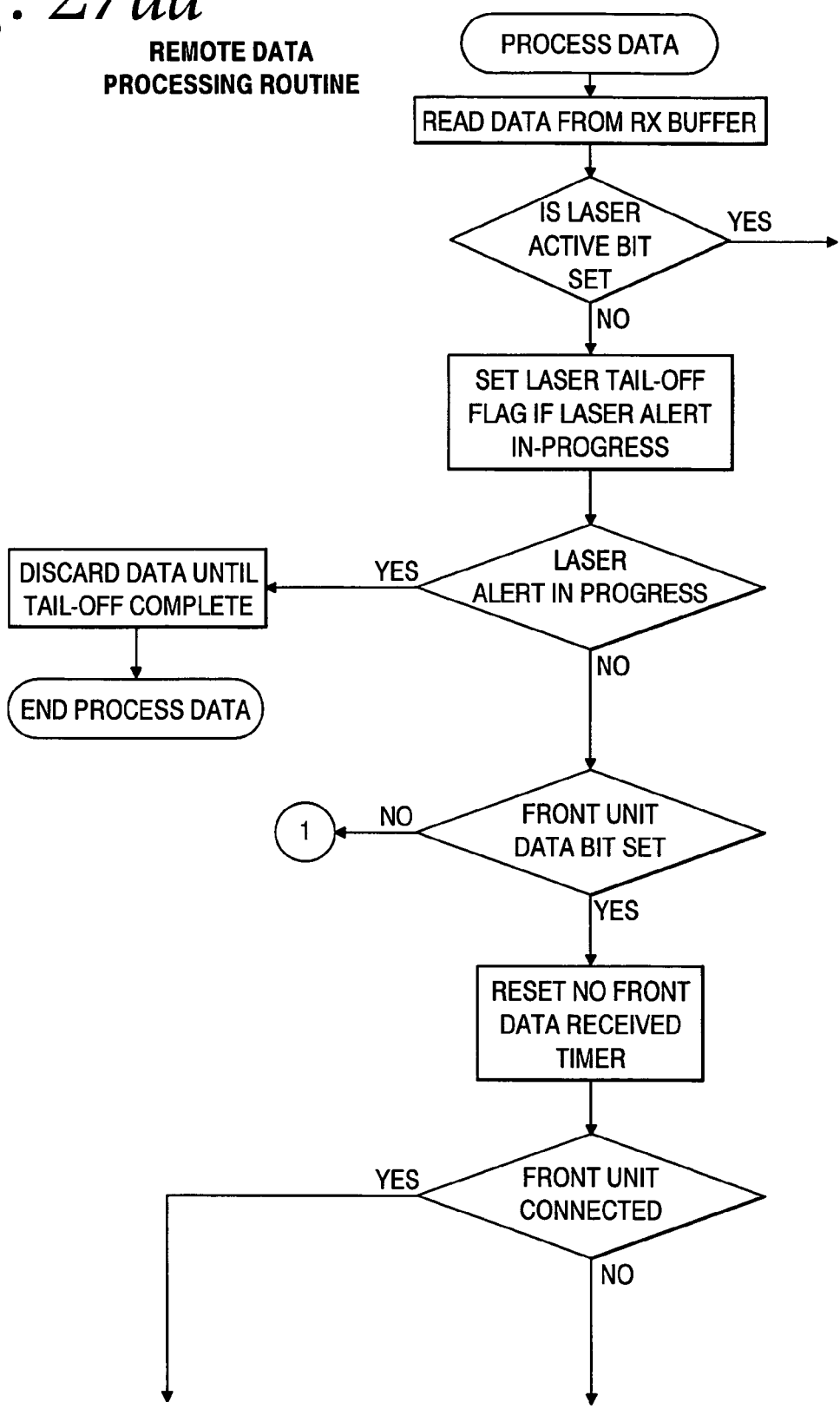
FIGS. 27aa-ad, ba, bb and ca-cd together comprise a schematic flow diagram of a remote data processing routing.
Figure 27A:
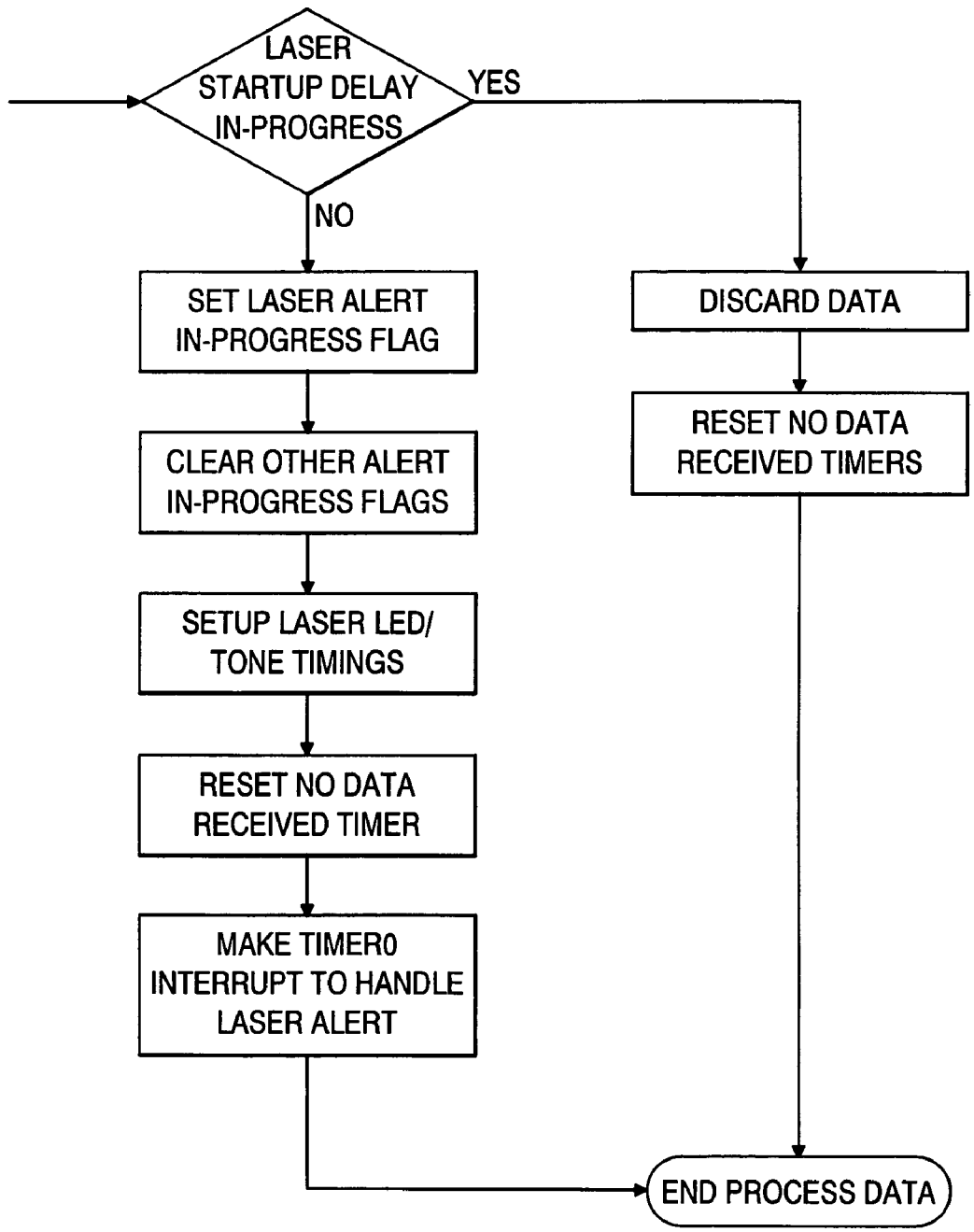
Figure 27A:
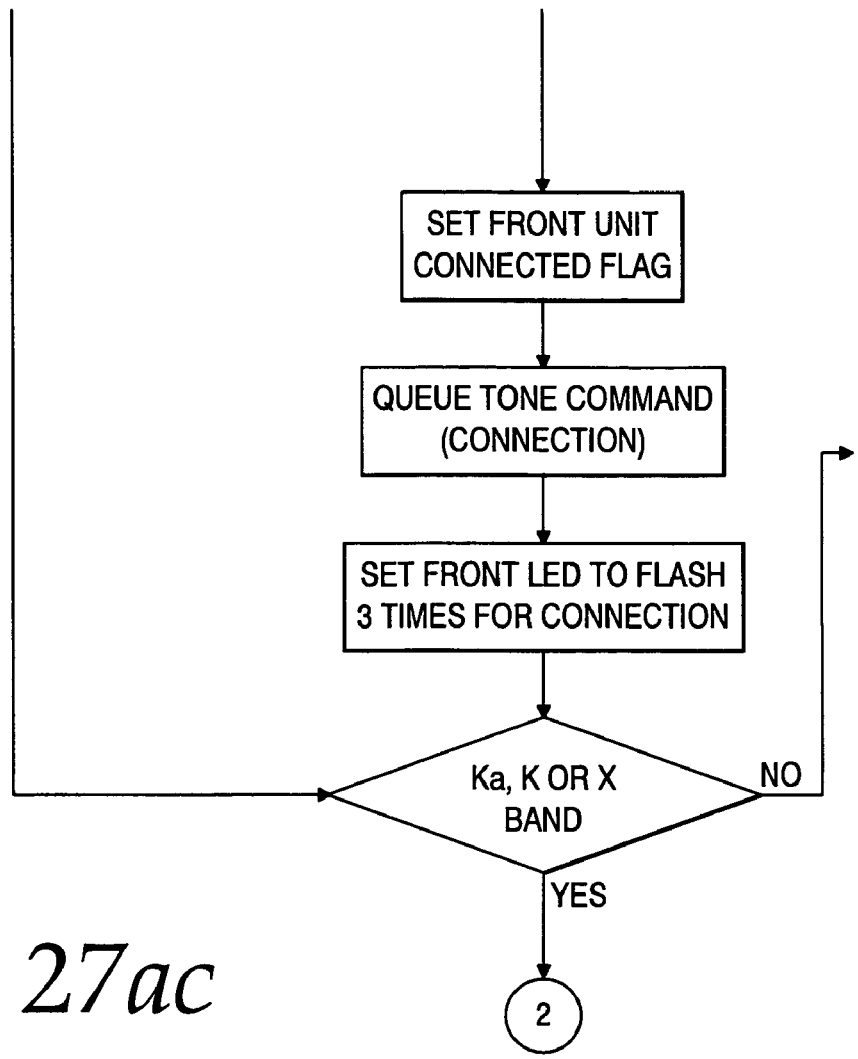
Figure 27A:
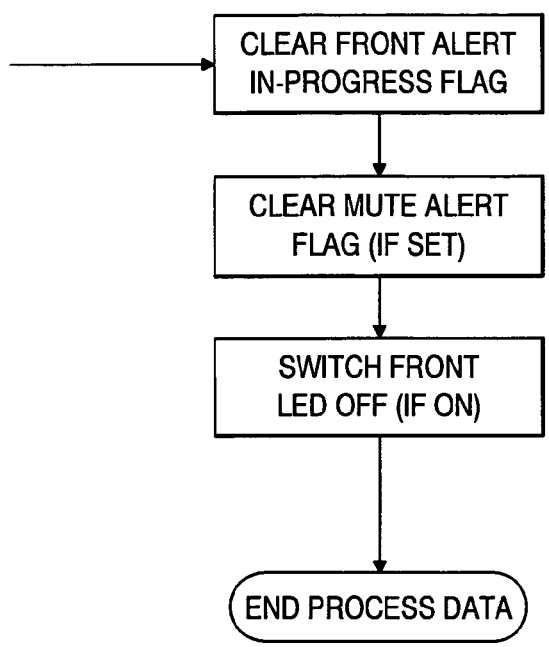
Figure 27B:
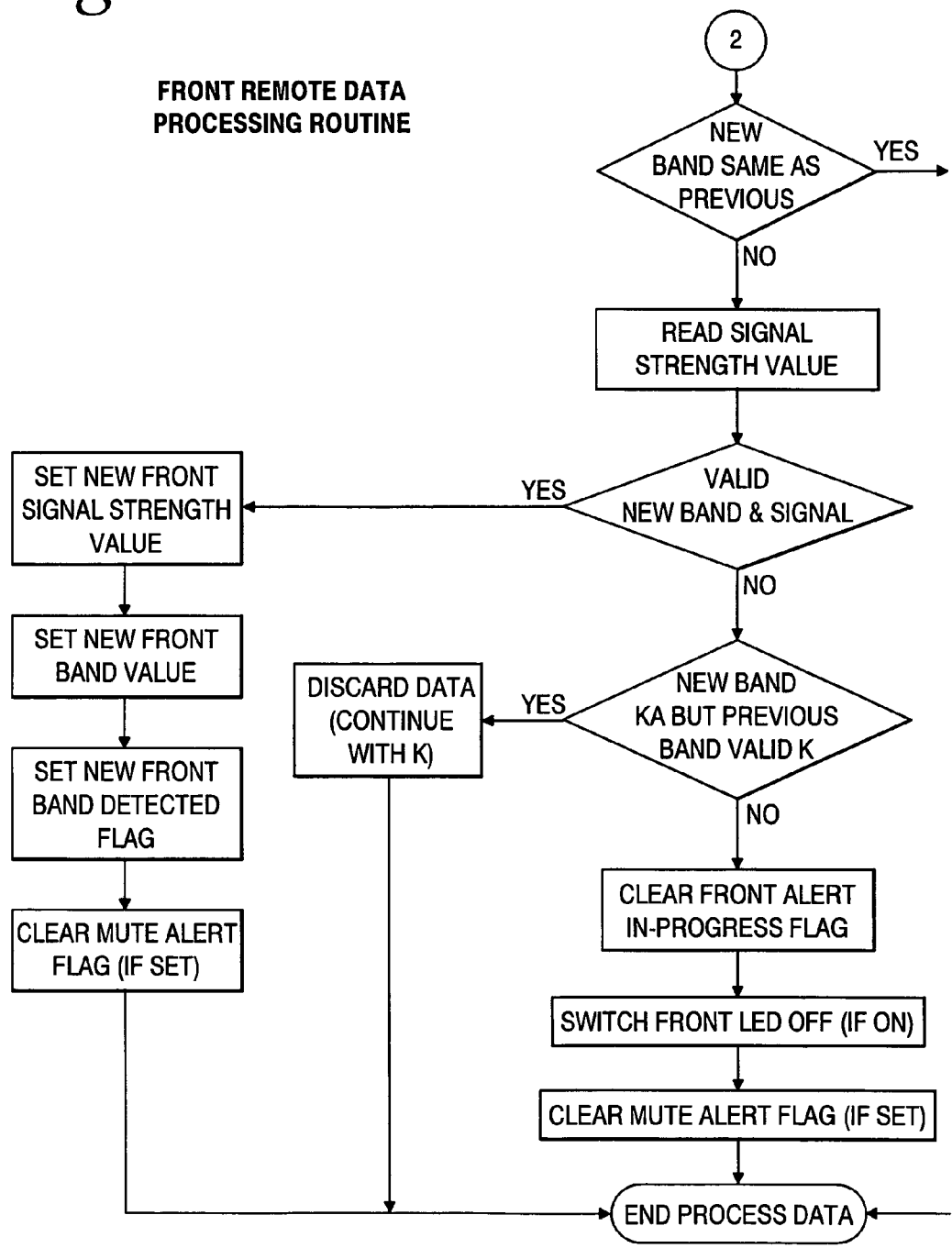
Figure 27B:
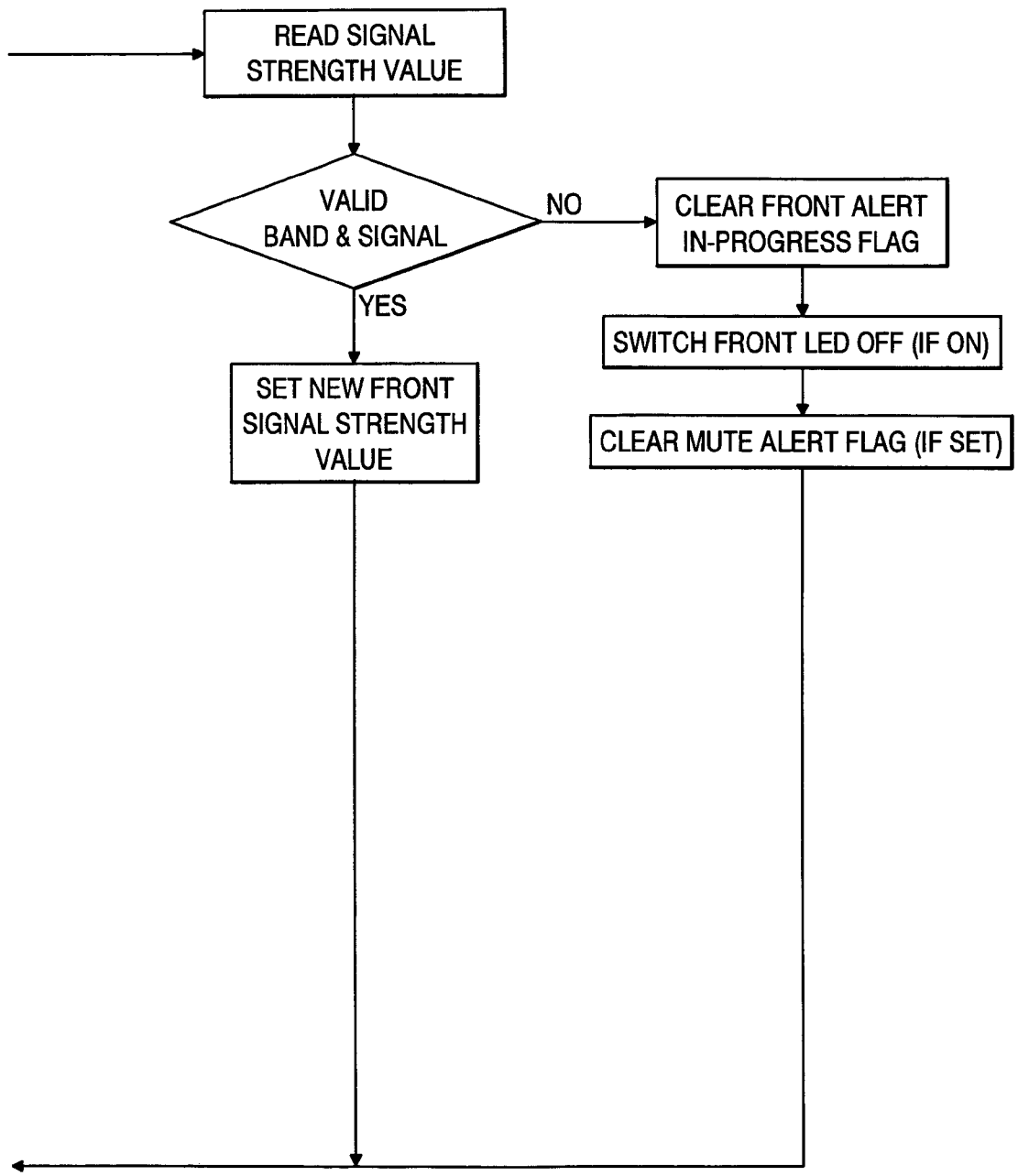
Figure 27C:
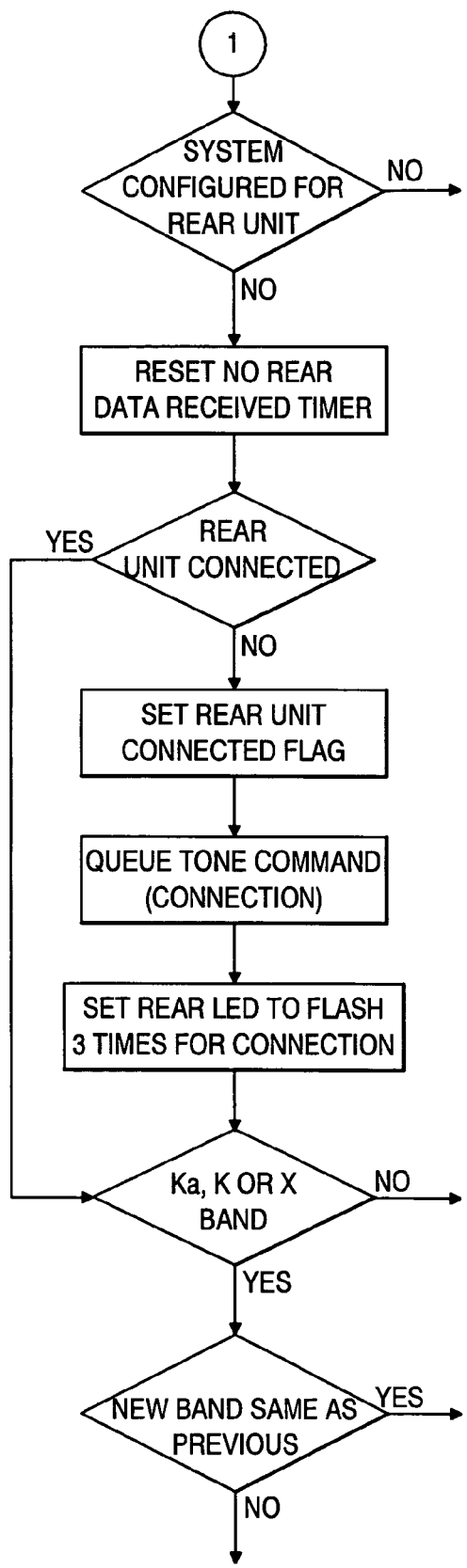
Figure 27C:
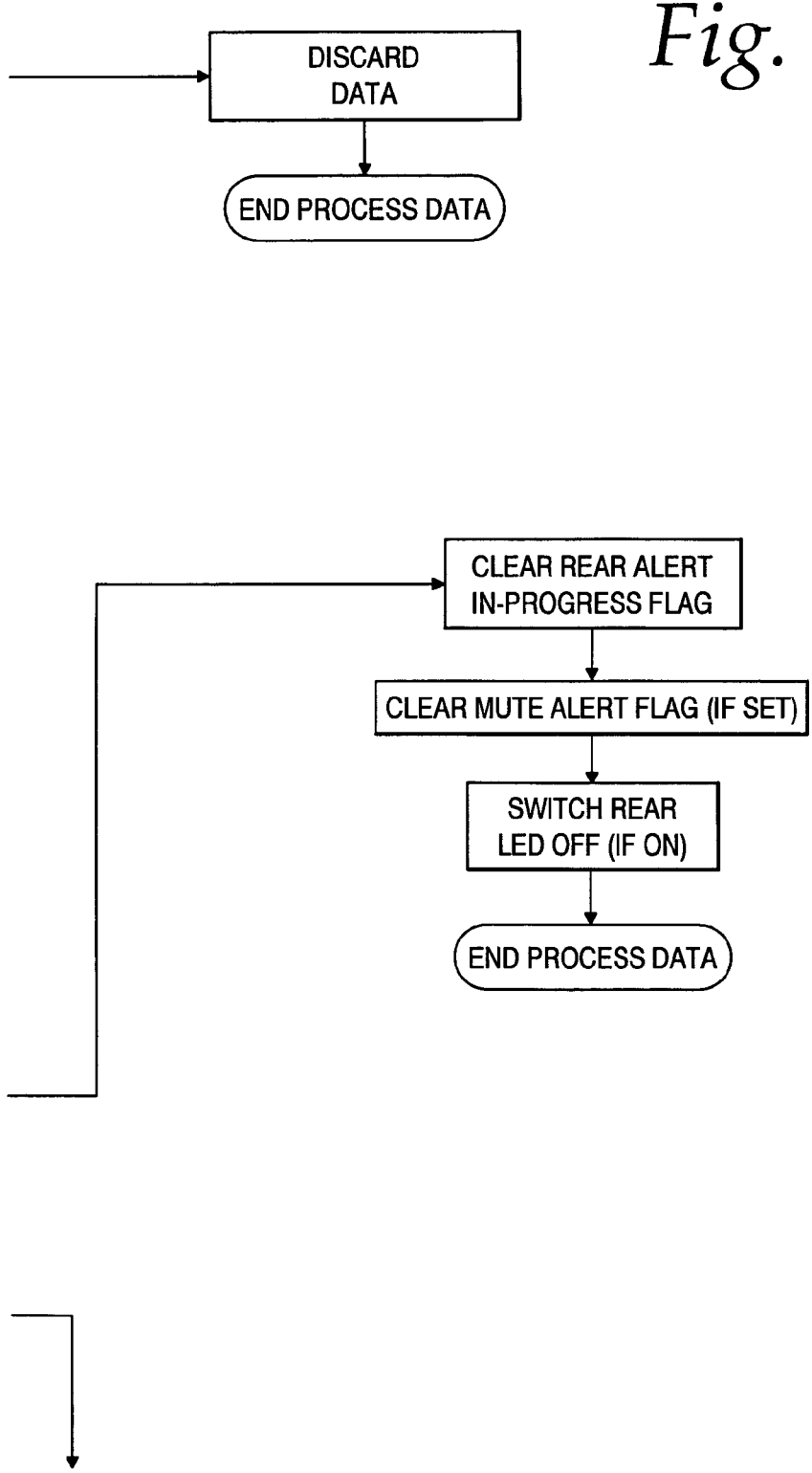
Figure 27C:
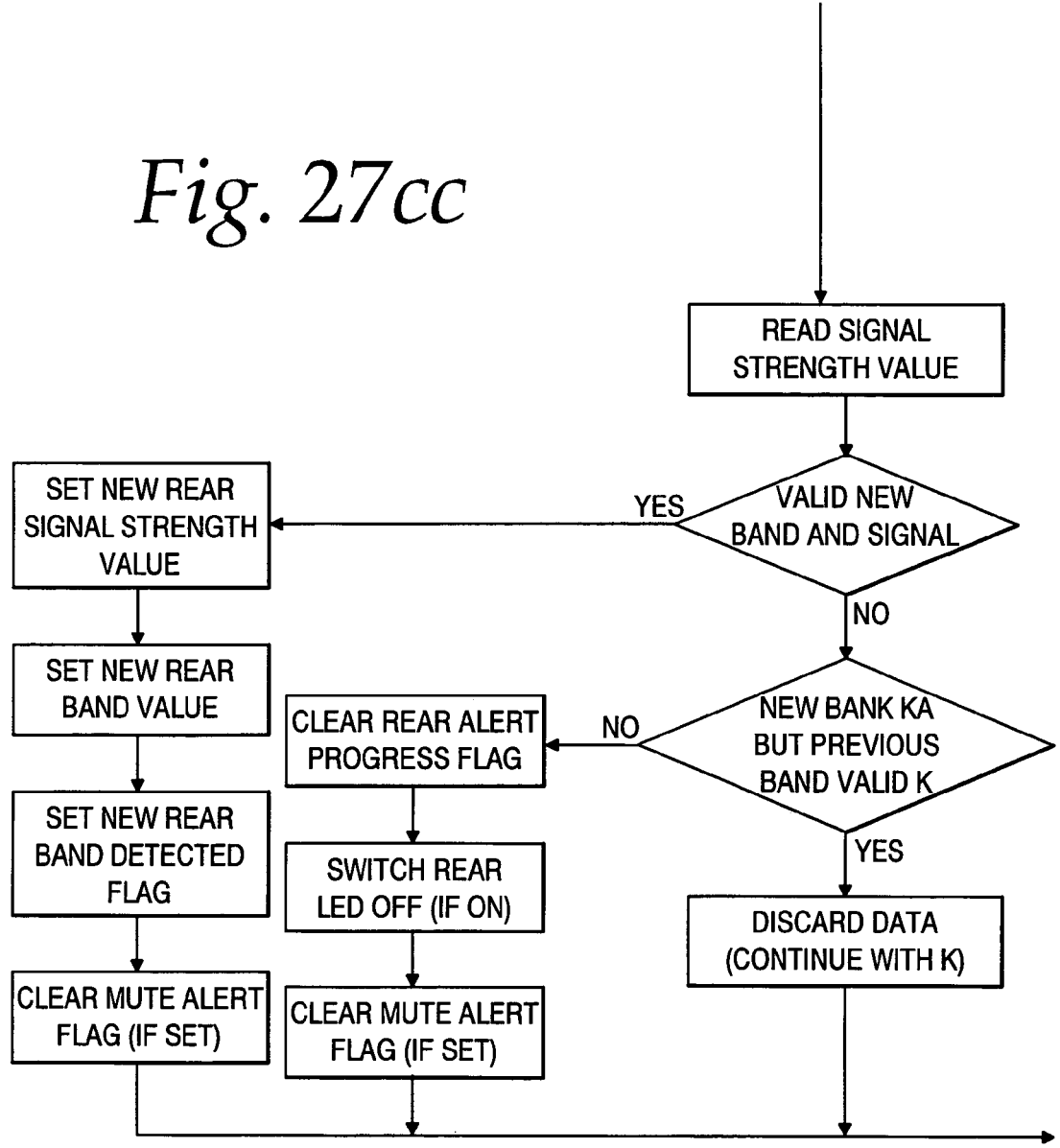

FIGS. 27aa, ab, ba, bb, and ca-cd together comprise a schematic flow diagram of a remote data processing routing. The code for this routine is stored in U3, reference number 78, see FIG. 10a.

Figure 28A:
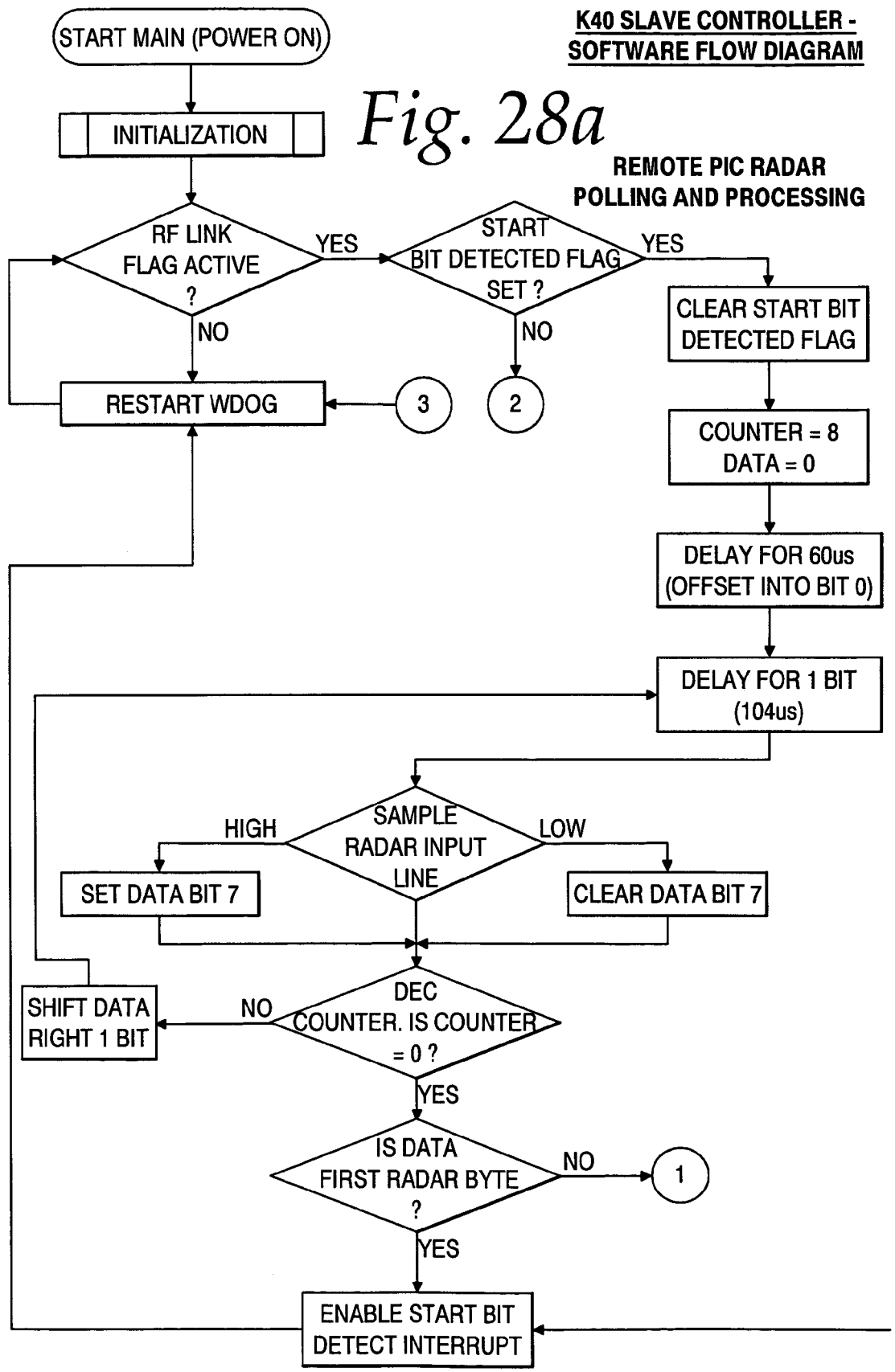
FIGS. 28a-28b together comprise a schematic flow diagram of remote PIC radar polling and processing routine.
Figure 28B:
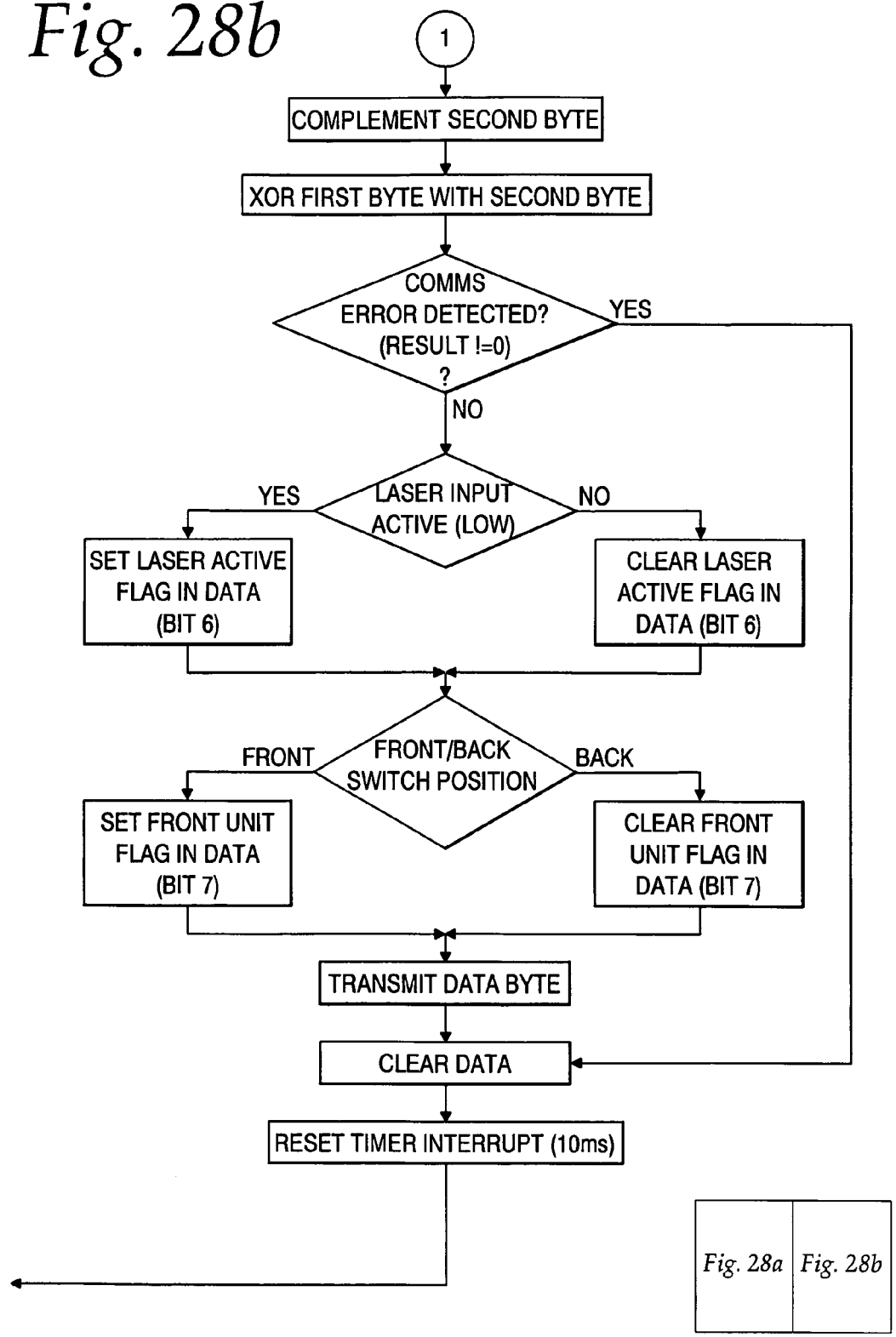

FIGS. 28a, b together comprise a schematic flow diagram of remote PIC radar polling and processing routine. The code for this routine is stored in U8, reference number 64, see FIG. 9c.

Figure 29:
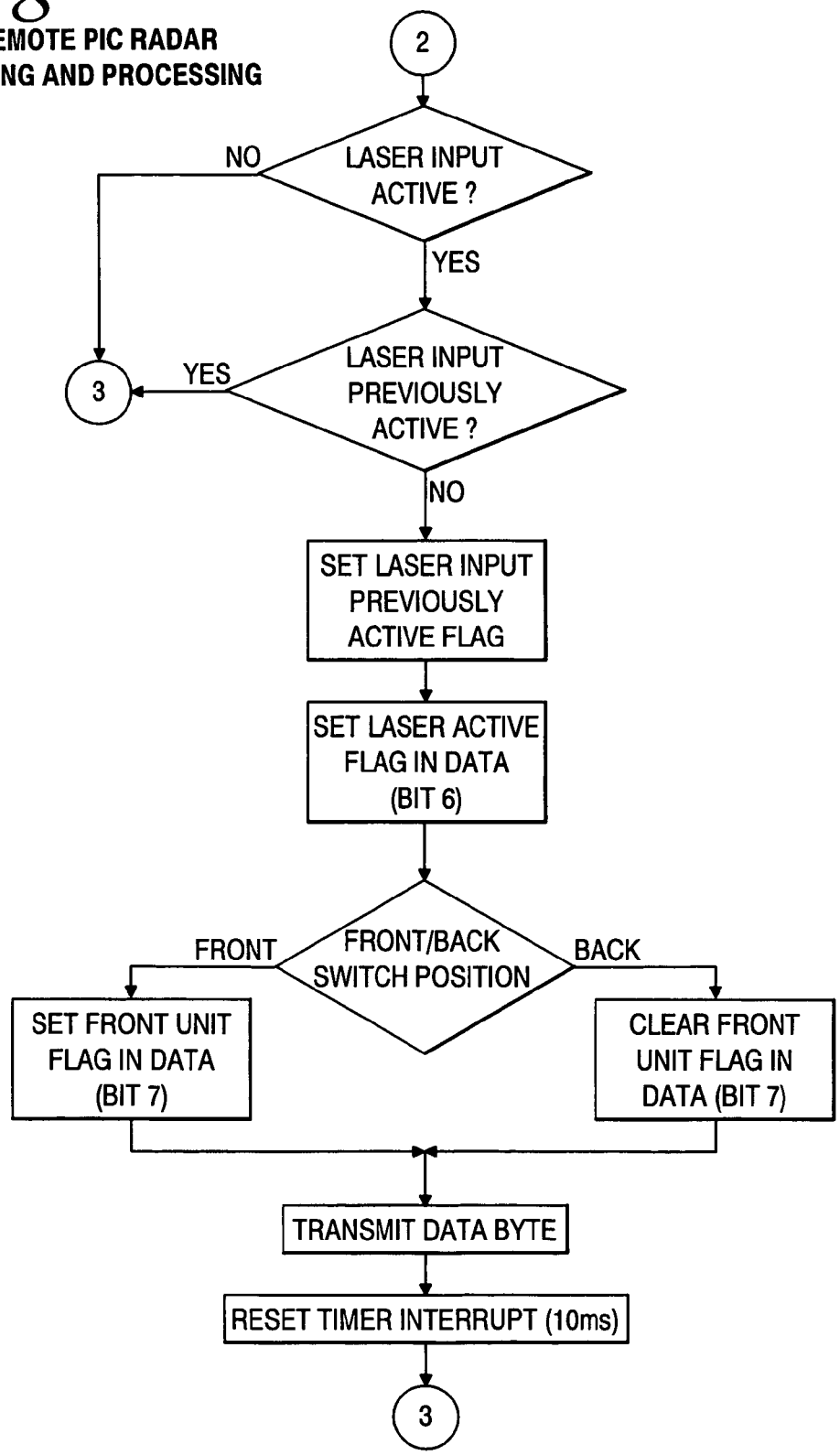
FIG. 29 is a schematic flow diagram of a remote PIC laser polling and processing routine.

FIG. 29 is a schematic flow diagram of a remote PIC laser polling and processing routine. The code for this routine is stored in U8, reference number 64, see FIG. 9c.

Figure 30:
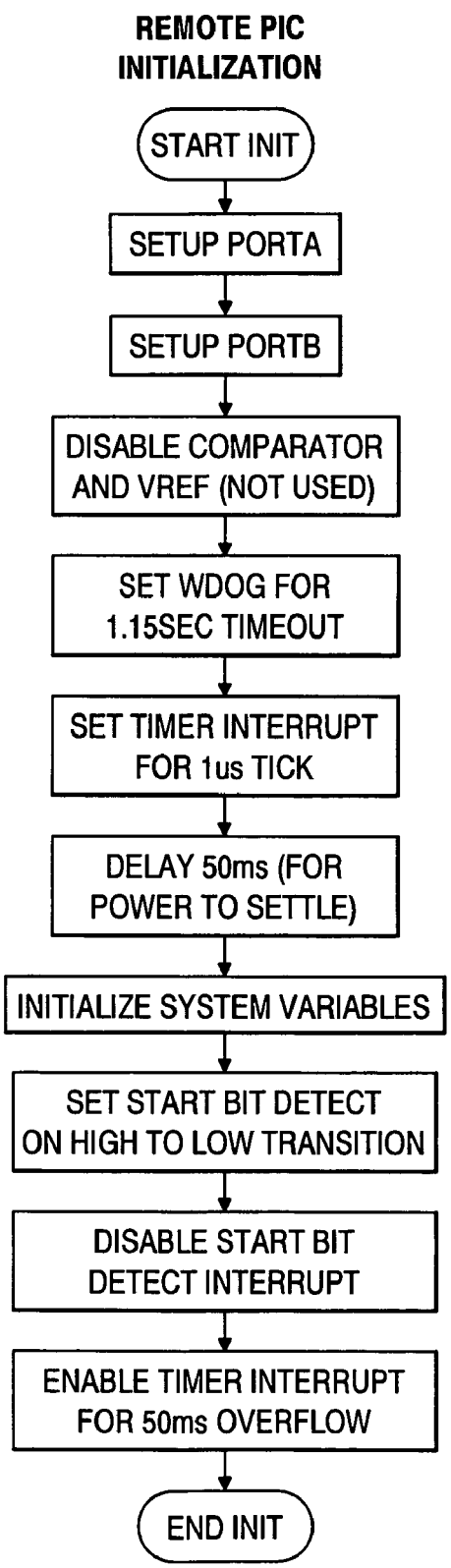
FIG. 30 is a schematic flow diagram of a remote PIC initialization routine.

FIG. 30 is a schematic flow diagram of a remote PIC initialization routine. The code for this routine is stored in U8, reference number 64, see FIG. 9c.

Figure 31A:
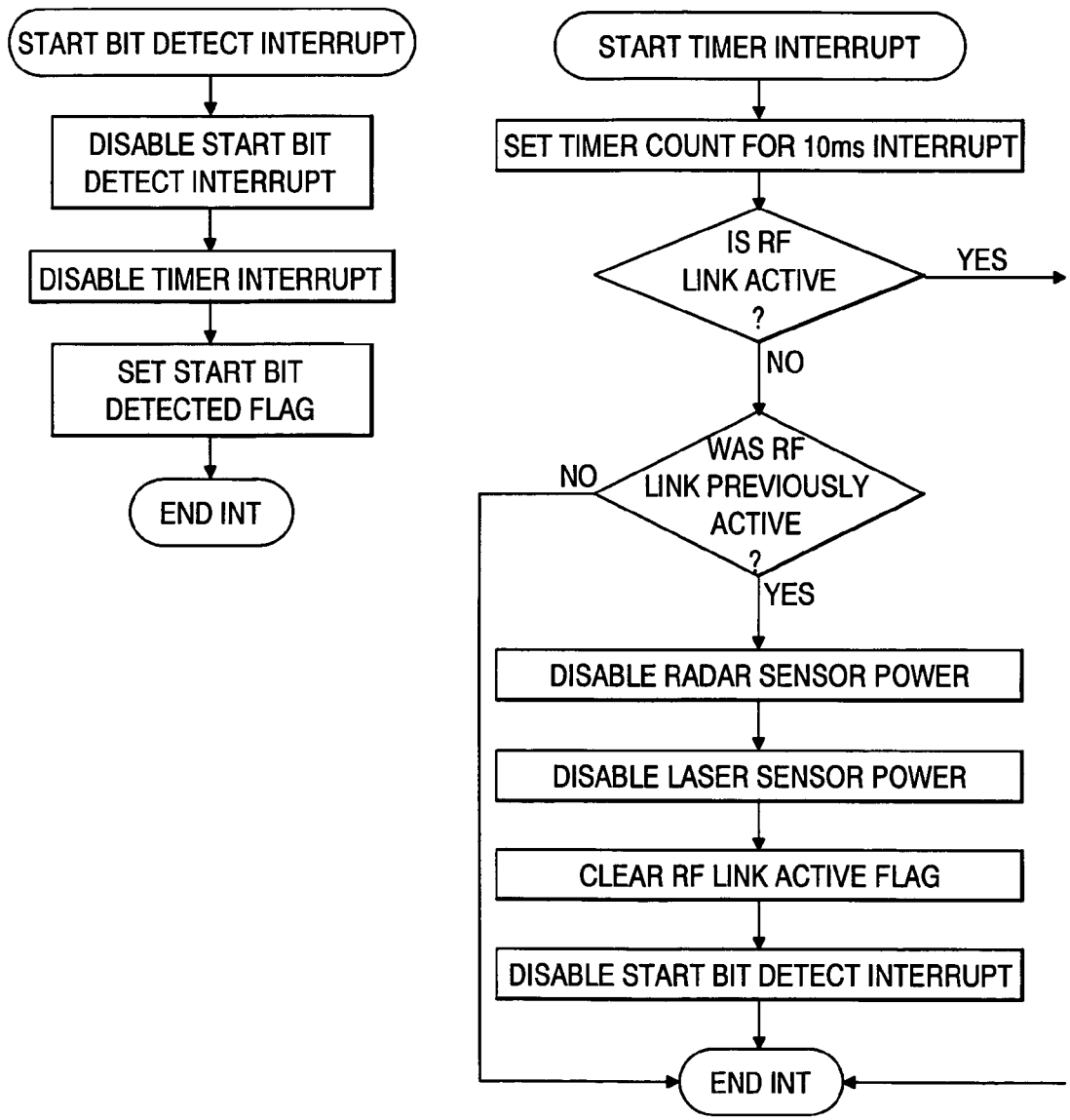
Figure 31B:
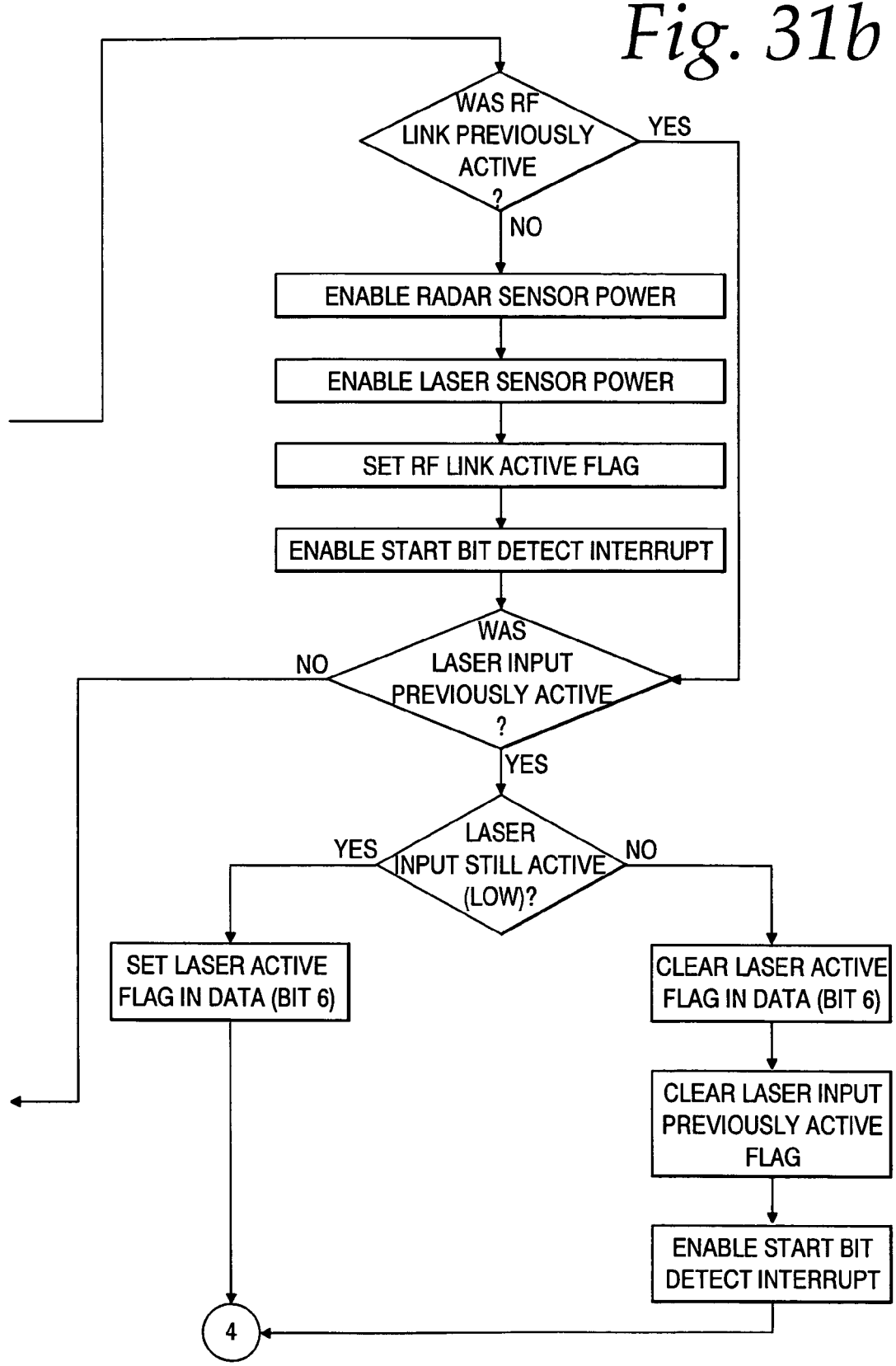

FIGS. 31a-c together comprise a schematic flow diagram of PIC interrupt service routines for low power and normal operation modes. The code for this routine is stored in U8, reference number 64, see FIG. 9c.

Referring now to FIG. 8a, a wireless control unit 130 is provided to allow a user to wirelessly communicate with the warning system, without requiring extensive modification to the interior of the user's vehicle. As will be seen herein, the wireless control unit 130 allows a user to input commands to the warning system and to receive status indications of various portions of the system. Preferably, the wireless control unit 130 is Bluetooth enabled, operating as a remote module communicating with the aforementioned Bluetooth system which includes, for example, the Bluetooth host module 76.

Figure 32:
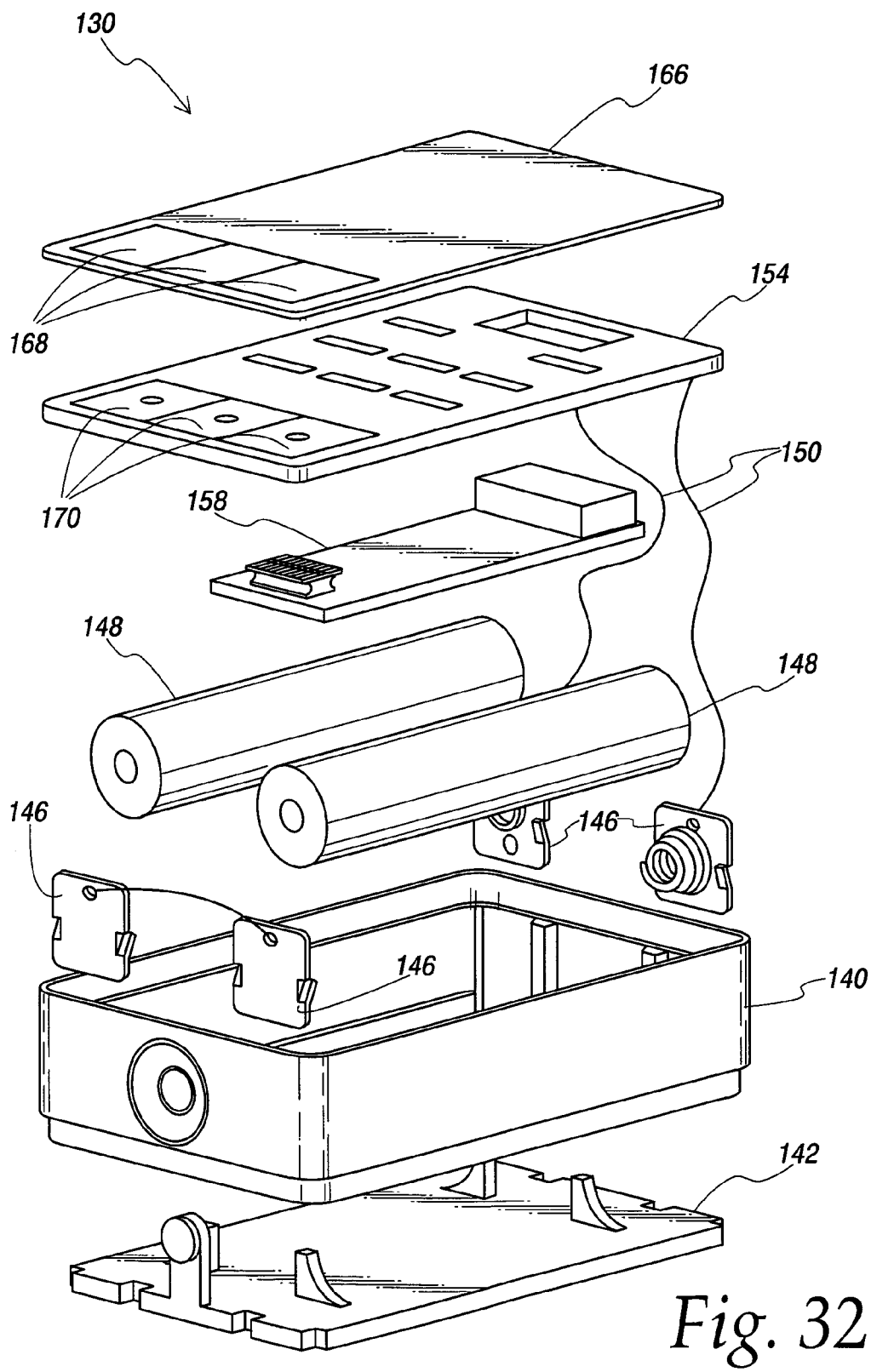
FIG. 32 is an exploded perspective view of the wireless control unit.

Referring now to FIG. 32, wireless control unit 130 includes a housing 140, enclosed at one end by a battery door 142. Disposed within housing 140 are a plurality of battery contacts 146 and a pair of batteries 148. Electrical leads 150 connect the batteries to a main printed circuit board 154 which is coupled to a lower, radio frequency (RF) printed circuit board 158 by connectors 160, 162 (see FIG. 33g). A graphic overlay member 166 includes a plurality of dome switches 168. The dome switches make electrical contact with contacts 170 carried on main printed circuit board 154, in a conventional manner.

Referring now to FIGS. 33a-33i, an electrical schematic diagram for circuitry carried on printed circuit boards 154, 158, is shown. A microprocessor 176 is carried on the lower, RF printed circuit board 154 and has connections coupled to connector 160. Microprocessor 176 is commercially available as part no. BC219159BN-E4, from CSR located in Cambridge, UK. Microprocessor 176 is connected to an antenna 180 for radio frequency communication with the Bluetooth host module 76 described above. Asynchronous communication with a microprocessor 184 carried on main printed circuit board 154 is made by leads 182 which connect terminals J10, J11 of microprocessor 176 to terminals 8 and 9 of microprocessor 184 via connectors 160, 162. Microprocessor 184 is commercially available as part no. PIC16LF627A-041/SS, from Microchip Technology of Chandler, Ariz. Also associated with microprocessor 176 is a crystal-controlled clock circuit 188 and a connector 190 to provide external control programming for the Bluetooth functions of microprocessor 176.

A Bluetooth enabler circuit 194 is coupled to terminal 7 of microprocessor 184 to enable its Bluetooth operations. Included in circuit 194 is a microprocessor, part no. MAX4795EUK. In effect, circuit 194 functions as an external electronic switch that provides power to the Bluetooth circuit carried on the lower, RF printed circuit board 158.

Figure 33D:
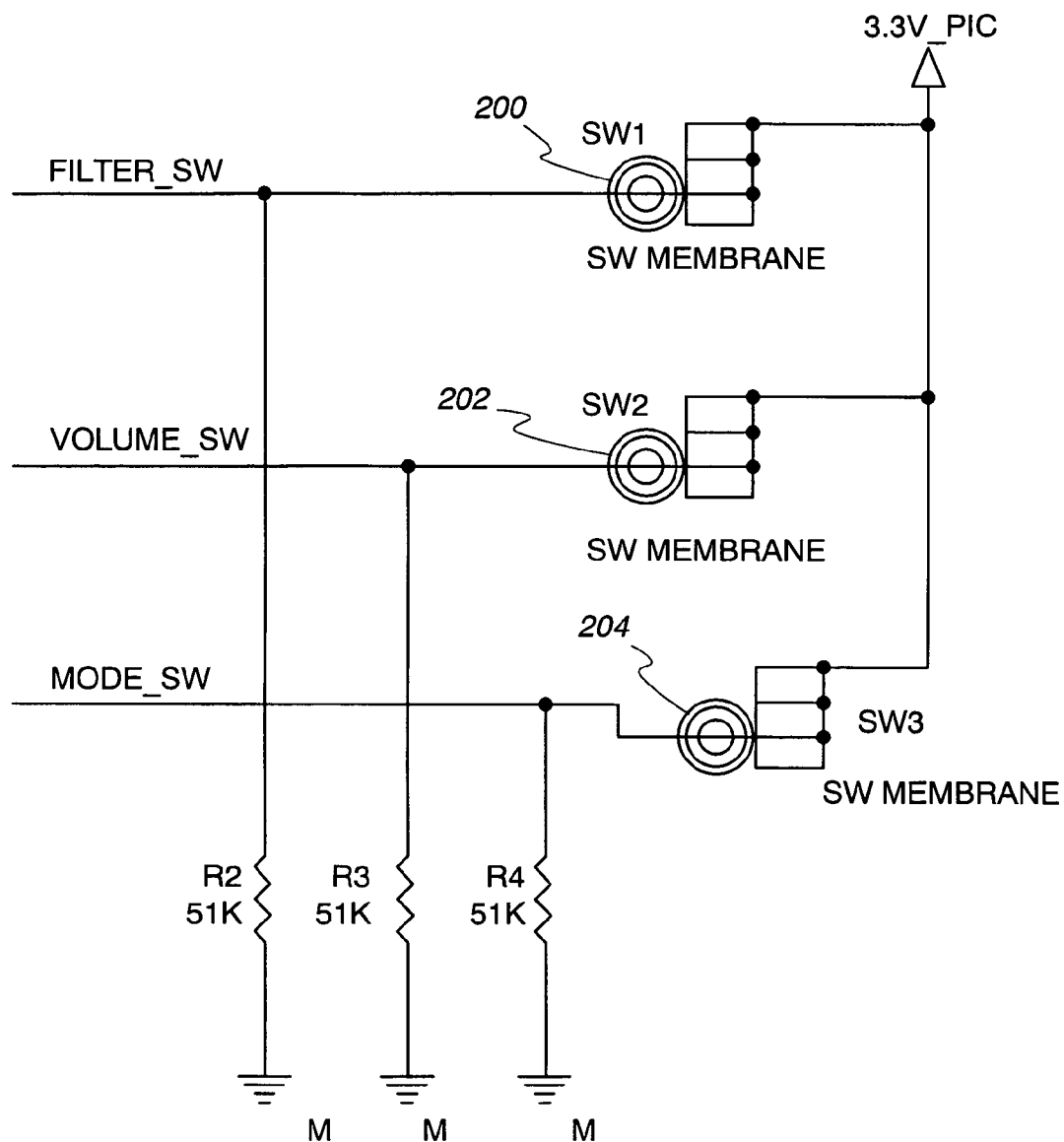
Figure 33E:
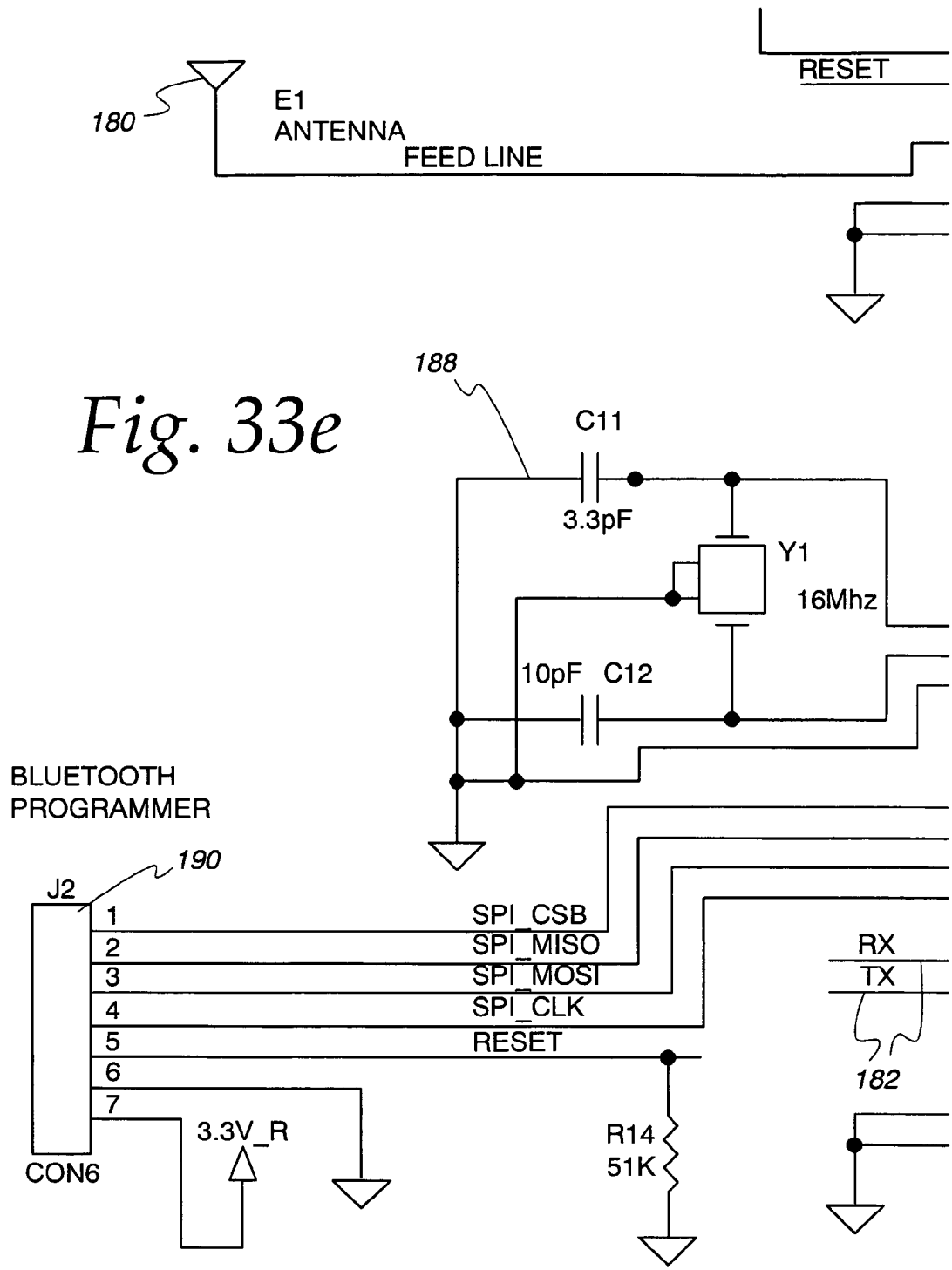
Figure 33F:
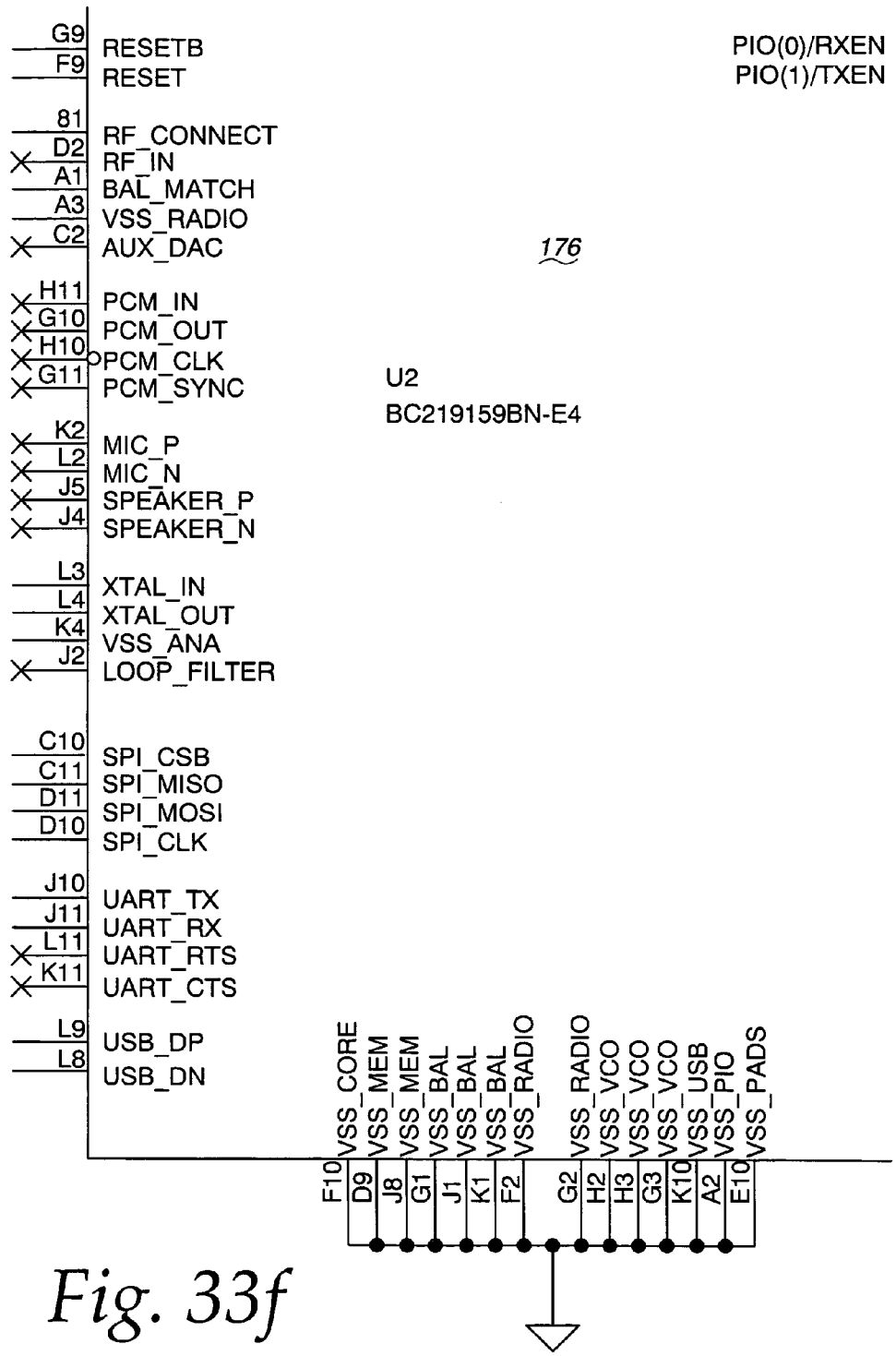
Figure 33G:
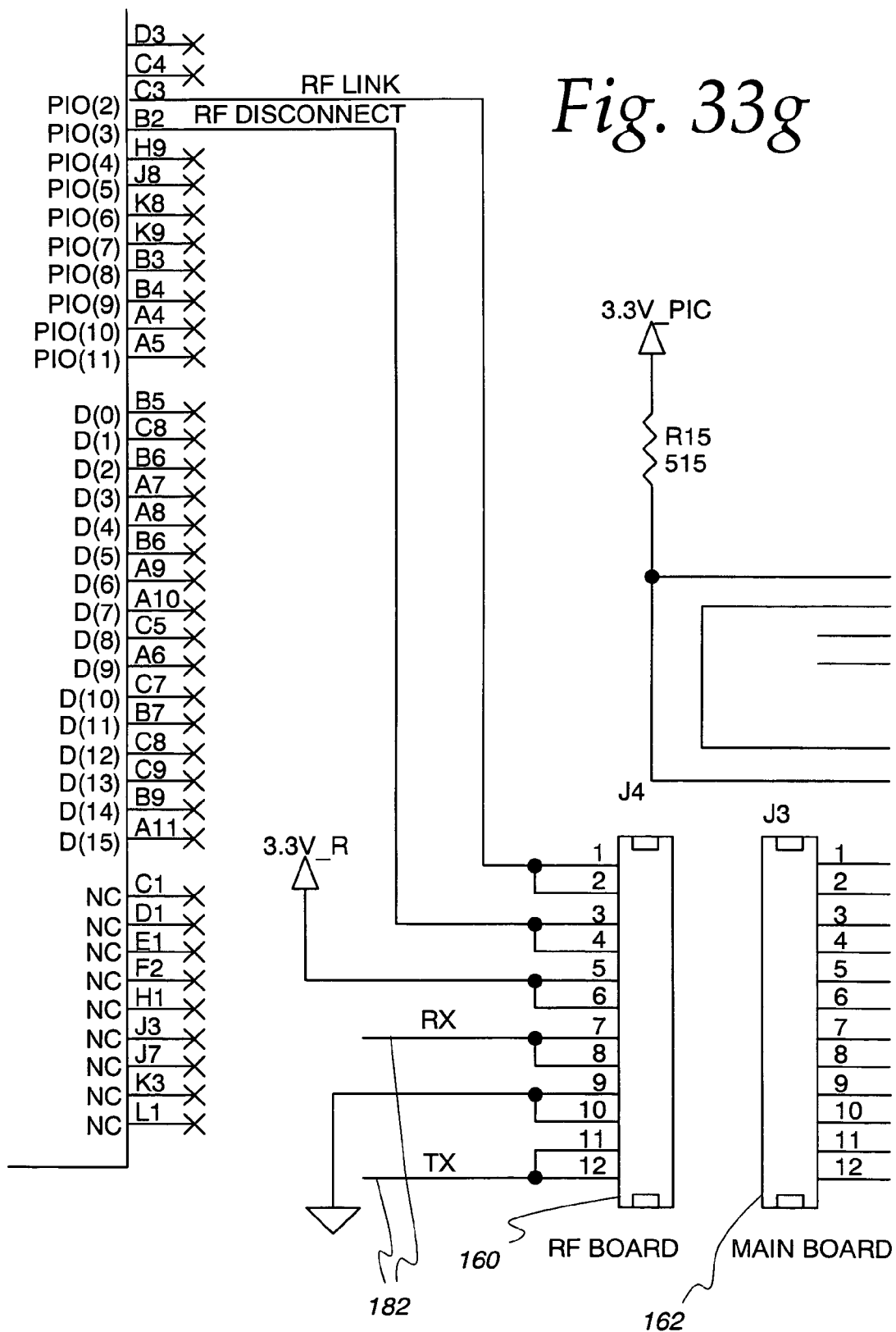
Figure 33H:
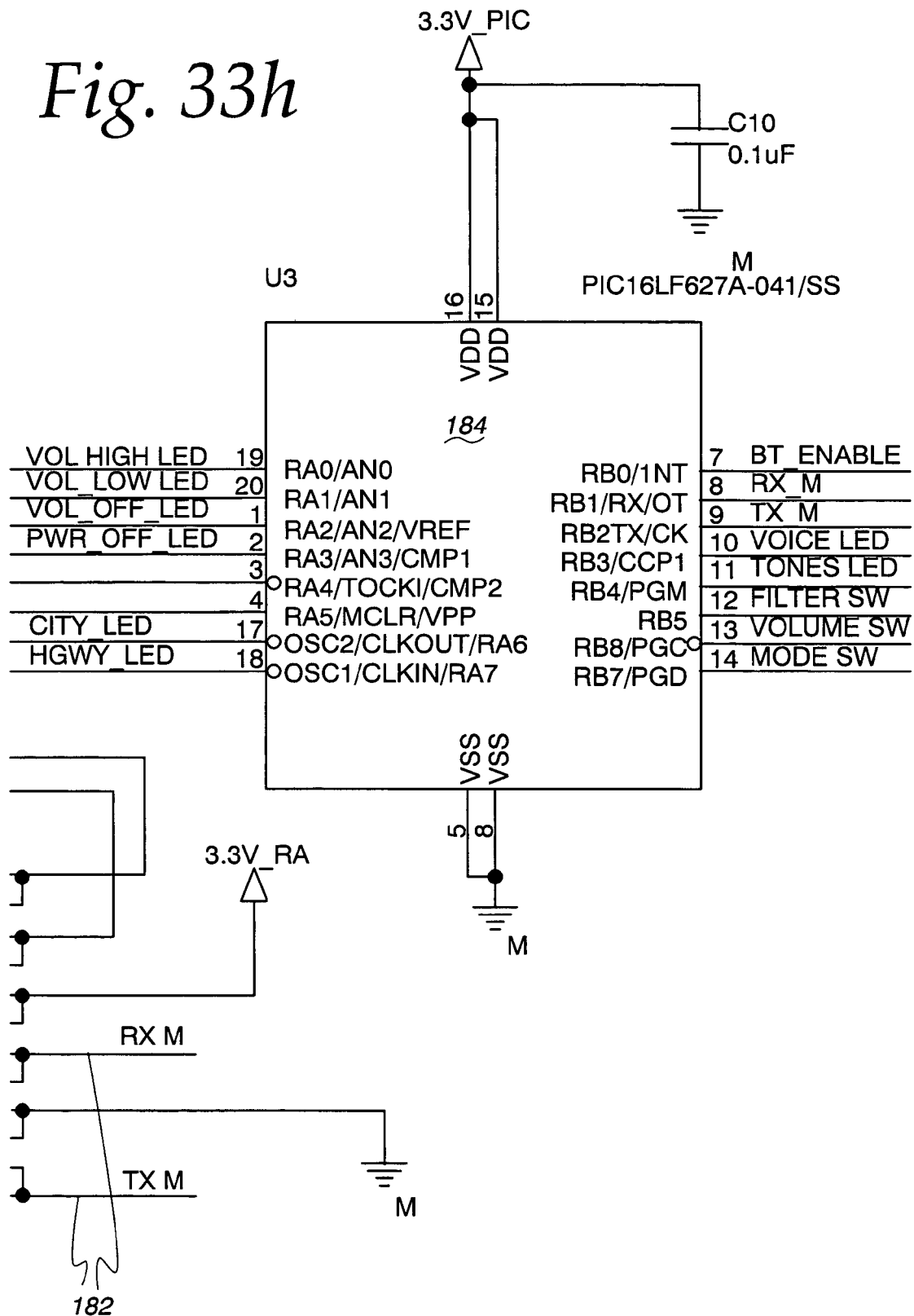
Figure 33I:
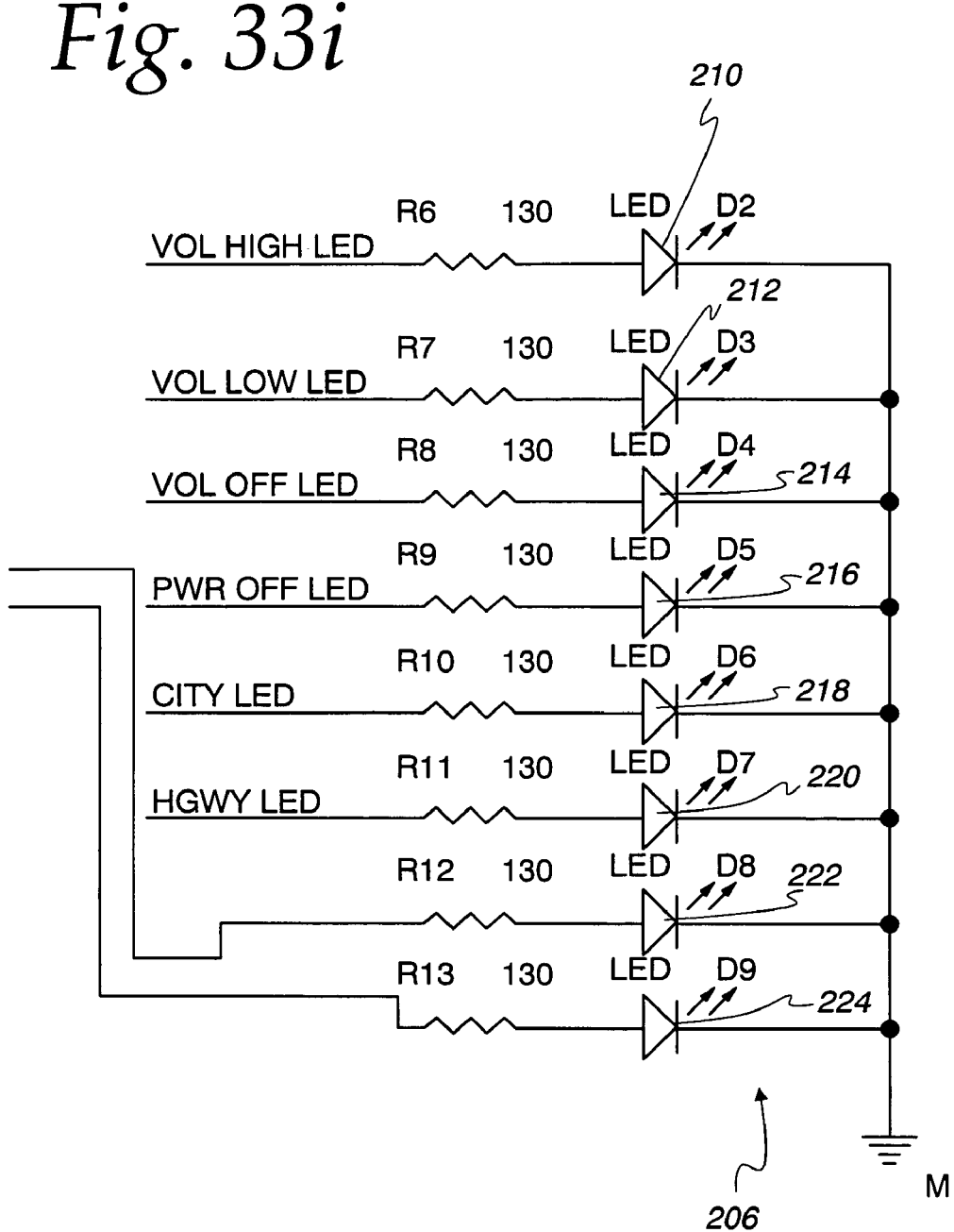

Referring to FIG. 33d, the main printed circuit board 154 is provided with three membrane switches, including a filter switch 200, a volume switch 202 and a mode switch 204. These switches are connected to terminals 12, 13 and 14 of microprocessor 184 and provide input control signals. Referring now to FIG. 33i, the main printed circuit board is also provided with a plurality of indicator lights arranged in a bank or array 206. The indicator lights preferably comprise light emitting diodes, although virtually any type of indicator can be used whether visual, audible or vibratory. LED 210, when illuminated, indicates high volume operation of the detection system, while LED's 212, 214 indicate a low volume and a volume off operation of the detector system. Indicator light 216 indicates that power to the detector system has been turned off, confirming to the user that the detector system is not emitting signals which might possibly be detected by outside observers. Indicator lights 218, 220 indicate familiar "city" and "highway" operation (i.e. low gain and high gain operation, respectively) of the detector system. Indicator lights 222, 224, are provided for optional functions such as voice control and audible "tones" outputs of the detector system.

The detector system of the preferred embodiment uses a wireless control link between wireless control unit 130 and Bluetooth host module 76. In the preferred embodiment, the wireless protocol is chosen to be a Bluetooth protocol although virtually any wireless protocol can be employed, as desired. The wireless control unit 130 is expected to be operated from within the vehicle passenger compartment to provide control over the detector system and to provide an indication of system status to the user. If desired, the wireless link can be replaced with a wired connection. Programming of microprocessor 60 (see FIG. 9*a*) and microprocessor 176 (see FIG. 33*f*) preferably includes an algorithm which provides current state recall, defined herein as the current operational mode of the overall detector system. According to one aspect of the present invention, the detector system employs current state recall which not only allows the wireless control unit 130 to consume very small amounts of power and to have an ultra small size, but which also requires a minimum amount of electronics to implement the overall system. For example, the current state recall operation of the detector system, in the preferred embodiment, requires only two micro controllers (microprocessor 184 of FIG. 33*h* and microprocessor 64 of FIG. 9*c*) and two Bluetooth transceivers (microprocessor 60 of FIG. 9*a* and microprocessor 176 of FIG. 33*f*).

Referring to FIG. 33*d*, upon the pressing any of the switches 200, 202, 204 the respective terminals of microprocessor 184 connected to the switches detects a voltage rise. In response, code associated with microprocessor 184 closes a circuit or switch internal to the microprocessor that outputs a command signal on terminal 7 which in turn is delivered to terminal 3 of the microprocessor of Bluetooth enabler circuit 194. The Bluetooth enabler circuit 194 responds by applying power to the Bluetooth circuit associated with microprocessor 176, enabling the microprocessor of the wireless control unit 130 to receive a status signal from host module 76, via the wireless Bluetooth link. The microprocessor 184 processes the incoming status signal and determines which of the appropriate indicator lights 210-224 should be illuminated to indicate visual status of system operation to the user. For example, concerning the current volume mode of the detector system, only one of the indicator lights 210, 212 and 214 should be illuminated at any one time to indicate only one of the three possible volume operating modes (i.e. volume high, volume low, or volume off). If the incoming status signal received from host module 76 by wireless control unit 130 indicates that system volume is turned off, microprocessor 184 would issue a signal to indicator light 214 to illuminate that indicator light. Similarly, only one of the indicator lights 218, 220 is expected to be illuminated at a particular time so as indicate to the user that the system is operating in city (low gain) mode or highway (high gain) mode.

Figure 34:
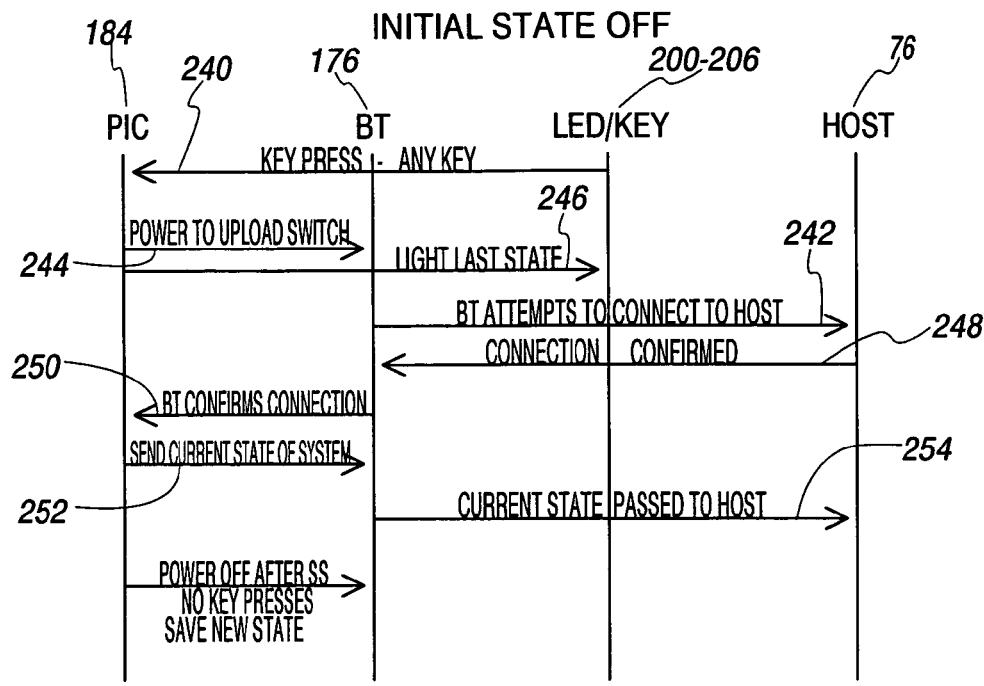
FIG. 34 is a first sequence diagram illustrating operation of the wireless control unit.

Referring now to FIG. 34 a sequence diagram indicating operation of the overall detector system is shown. In step 240, a key press or "any—key—down" is sensed by microprocessor 184. In response, the microprocessor sends a power up signal to the Bluetooth circuitry associated with microprocessor 176. As mentioned, a "Bluetooth enable" signal is sent to external solid-state switch circuit 194, through which power is applied to the Bluetooth portion of microprocessor 176. In step 246 the last state of the overall system is sent to the array of indicator lights. Upon powering up, the Bluetooth circuitry attempts to connect to the host module 76.

Upon a successful connection, the host Bluetooth module 76 (see FIG. 8*a*) syncs the RF link with the wireless remote 130 and confirms the connection using the standard Bluetooth connection protocols outlined in the Bluetooth standard, as indicated in step 248. At this time, the host module 76 sends a status signal to the Bluetooth module 176, using system status information stored in the host module memory. The Bluetooth module of the wireless control unit 130 then communicates to the microprocessor 184 that an RF link has been established between the wireless control unit 130 and host module 76, (as indicated in step 250) and passes the status signal information to microprocessor 184, updating or confirming the present system status to the wireless control unit 130. If desired, the indicator lights of the wireless control unit can be cleared upon an initial key press, with reception of the status signal from the host module determining the state of the indicator lights, rather than serving as a data update. At this point, a timed interval is initiated. In the preferred embodiment, the time interval has a 5-second duration, although virtually any duration can be employed. During the time interval each key press of the wireless control unit 130 is passed to the host module 76 as indicated at 254. Only key presses made during the timed interval, i.e. while the Bluetooth connection is active, are passed to the host module 76. If there is no key press activity during the time interval, the timer of the wireless control unit 130 expires, and microprocessor 184 triggers Bluetooth enable circuit 194 to open, thus breaking the Bluetooth connection with the host module 76. The microprocessor 184 then returns to a sleep mode drawing only a minimal amount of current from the small power system, preferably the batteries 148.

Figure 35:
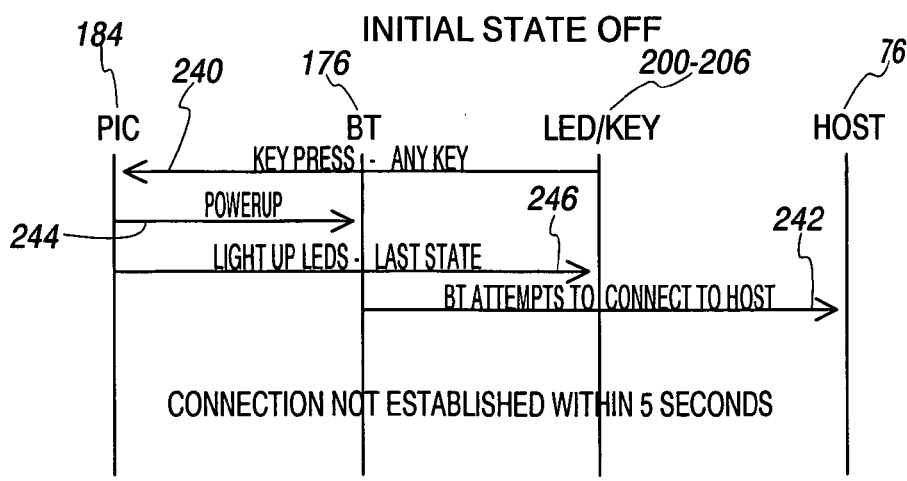
FIG. 35 is a second sequence diagram illustrating operation of the wireless control unit.

Referring to FIG. 35 if Bluetooth connection between host 76 and wireless control unit 130 is not established within 5 seconds, the wireless control unit 130 sends a command to Bluetooth enable circuit 194 to open a Bluetooth transmission link and to enter a sleep mode.

As mentioned, the preferred embodiment employs Bluetooth protocols between the wireless control unit 130 and the host module 76, to allow the host module to communicate with the wireless control unit as if it were another remote sensor of the system. Although less preferable, other, mixed protocols can be employed, if desired, with different protocols used for the remote sensors and for the wireless remote unit 130.

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated by the following claims.

We claim:

1. A communication system for a vehicle traveling over a road surface and having a front end, a forward compartment, a passenger compartment, a wall dividing the forward compartment and the passenger compartment, and a rear end;
   a detector at the front end for sensing speed detection signals impinging on said vehicle, to monitor the speed of said vehicle or a nearby vehicle and to generate an output signal in response thereto;
   a radio frequency transmitter adjacent the front end for receiving said detector output signal and for transmitting a transmit signal indicative of said speed detection signals in response thereto directed toward said road surface so as to be deflected toward the passenger compartment;

a receiver adjacent said wall, either in said front compartment or in said passenger compartment, for receiving said transmit signal from the road surface and for outputting an annunciator signal in response thereto; and an annunciator in said passenger compartment, coupled to said receiver to receive said annunciator signal and for outputting an annunciator indication in response thereto.

2. The communication system according to claim 1 wherein said detector comprises a front detector, said transmitter comprises a front transmitter, said transmit signal comprises a front transmit signal and said annunciator comprises a front annunciator, said communication system further comprising:

a rear detector at the rear end for sensing speed detection signals impinging on said vehicle, to monitor the speed of said vehicle or a nearby vehicle and to generate an output signal in response thereto;

a radio frequency rear transmitter adjacent the rear end for receiving said rear detector output signal and for transmitting a rear transmit signal indicative of said speed detection signals in response thereto directed toward said road surface so as to be deflected toward the passenger compartment; and wherein said receiver receives said front and said rear transmit signals from the road surface and outputs at least one annunciator signal in response thereto.

3. The communication system according to claim 1 wherein the annunciator is integrated with the receiver.

4. The communication system according to claim 1 wherein the annunciator is remote from the receiver.

5. The communication system according to claim 1 wherein the annunciator emits a light output.

6. The communication system according to claim 1 wherein the receiver is located in the passenger compartment.

7. The communication system according to claim 1 wherein the detector is enclosed in a first housing, and the radio frequency transmitter is enclosed in a second housing attached to the first housing.

8. The communication system according to claim 7 wherein the first housing has first and second opposed ends and the detector includes an antenna for receiving speed detection signals, the antenna located at the first end of the first housing and the second housing attached to the second end of the first housing.

9. The communication system according to claim 1 further comprising a wireless remote unit wirelessly coupled to the receiver to obtain therefrom indication of operating status of the receiver.

10. The communication system according to claim 9 wherein said wireless remote unit controls operation of the annunciator.

11. The communication system according to claim 10 wherein said annunciator includes an audio speaker and said wireless remote unit controls the volume output of said audio speaker.

12. The communication system according to claim 10 wherein said annunciator includes an indicator light and said wireless control unit controls the intensity of the light output of the indicator light.

13. The communication system according to claim 2 further comprising a wireless remote unit wirelessly coupled to the receiver to obtain therefrom indication of operating status of the front and the rear transmitters.

14. The communication system according to claim 13 wherein indication of the operating status of the front transmitter is separate from indication of the operating status of the rear transmitter.

15. The communication system according to claim 13 wherein said wireless remote unit controls operation of the front and the rear annunciators.

16. The communication system according to claim 1 further comprising a wireless remote unit wirelessly coupled to the transmitter and to the receiver to enable and disable operation thereof.

17. A communication system for a vehicle traveling over a road surface and having a front end, a forward compartment, a passenger compartment, a wall dividing the forward compartment and the passenger compartment, and a rear end;

a detector at the front end for sensing speed detection signals impinging on said vehicle, to monitor the speed of said vehicle or a nearby vehicle and to generate an output signal in response thereto;

a radio frequency transmitter adjacent the front end for receiving said detector output signal and for transmitting a transmit signal indicative of said speed detection signals in response thereto;

a receiver adjacent said wall, either in said front compartment or in said passenger compartment, for receiving said transmit signal and for outputting an annunciator signal in response thereto; and an annunciator in said passenger compartment, coupled to said receiver to receive said annunciator signal and for outputting an annunciator indication in response thereto.

18. The communication system according to claim 17 wherein said detector comprises a front detector, said transmitter comprises a front transmitter, said transmit signal comprises a front transmit signal and said annunciator comprises a front annunciator, said communication system further comprising a rear detector at the rear end for sensing speed detection signals impinging on said vehicle, to monitor the speed of said vehicle or a nearby vehicle and to generate an output signal in response thereto;

a radio frequency rear transmitter adjacent the rear end for receiving said rear detector output signal and for transmitting a rear transmit signal indicative of said speed detection signals in response thereto; and wherein said receiver receives said front and said rear transmit signals and outputs at least one annunciator signal in response thereto.

19. A communication system for a vehicle traveling over a road surface and having a front end, a forward compartment, a passenger compartment, a wall dividing the forward compartment and the passenger compartment, a rear end and wiring from the front and rear ends to the passenger compartment carrying signals unrelated to monitoring of the speed of the vehicle;

a detector at the front end for sensing speed detection signals impinging on said vehicle, to monitor the speed of said vehicle or a nearby vehicle and to generate an output signal in response thereto;

a radio frequency injector adjacent the front end for receiving said detector output signal and for injecting a transmit signal indicative of said speed detection signals in response thereto on said wiring for delivery to said passenger compartment;

a receiver operatively associated with said wiring for receiving said transmit signal and for outputting an annunciator signal in response thereto; and an annunciator in said passenger compartment, coupled to said receiver to receive said annunciator signal and for outputting an annunciator indication in response thereto.

20. The communication system according to claim 19, wherein said detector comprises a front detector, said injector comprises a front injector, said transmit signal comprises a front transmit signal and said annunciator comprises a front annunciator, said communication system further comprising:

a rear detector at the rear end for sensing speed detection signals impinging on said vehicle, to monitor the speed of said vehicle or a nearby vehicle and to generate a rear output signal in response thereto;

a radio frequency rear injector adjacent the rear end for receiving said rear detector output signal and for injecting a rear transmit signal indicative of said speed detection signals in response thereto on said wiring for delivery to said passenger compartment; and wherein the detector receives said front and said rear transmit signals and outputs at least one annunciator signal in response thereto.

* * * * *